United States Patent [19]
Fielder

[11] Patent Number: 5,222,189
[45] Date of Patent: Jun. 22, 1993

[54] LOW TIME-DELAY TRANSFORM CODER, DECODER, AND ENCODER/DECODER FOR HIGH-QUALITY AUDIO

[75] Inventor: Loius D. Fielder, Millbrae, Calif.

[73] Assignee: Dolby Laboratories Licensing Corporation, San Francisco, Calif.

[21] Appl. No.: 582,956

[22] PCT Filed: Jan. 29, 1990

[86] PCT No.: PCT/US90/00507
§ 371 Date: Sep. 26, 1990
§ 102(e) Date: Sep. 26, 1990

Related U.S. Application Data

[63] Continuation-in-part of Ser. No. 458,894, Dec. 29, 1989, and a continuation-in-part of Ser. No. 439,868, Nov. 20, 1989, abandoned, and a continuation-in-part of Ser. No. 303,714, Jan. 27, 1989, abandoned.

[51] Int. Cl.[5] .............................................. G01L 9/00
[52] U.S. Cl. ......................................... 395/2; 381/30; 381/31
[58] Field of Search .................................. 381/29–40; 395/2

[56] References Cited

U.S. PATENT DOCUMENTS

| | | | |
|---|---|---|---|
| 4,216,354 | 8/1980 | Esteban et al. | 381/31 |
| 4,455,649 | 6/1984 | Esteban et al. | 381/31 |
| 4,703,480 | 10/1987 | Westall et al. | 381/30 |
| 4,790,016 | 12/1988 | Mazor et al. | 381/36 |
| 4,914,701 | 4/1990 | Zibman | 381/36 |
| 5,109,417 | 4/1992 | Fielder et al. | 381/36 |
| 5,115,240 | 4/1992 | Fujiwara et al. | 381/37 |

FOREIGN PATENT DOCUMENTS

| | | |
|---|---|---|
| 0176243 | 4/1986 | European Pat. Off. . |
| 0193143 | 9/1986 | European Pat. Off. . |
| 0217017 | 4/1987 | European Pat. Off. . |
| 0289080 | 11/1988 | European Pat. Off. . |
| 3440613 | 4/1986 | Fed. Rep. of Germany . |
| 3639753 | 9/1988 | Fed. Rep. of Germany . |
| 87/00723 | 11/1987 | PCT Int'l Appl. . |
| 8903574 | 4/1989 | World Int. Prop. O. . |

OTHER PUBLICATIONS

D. Esteban, C. Galand, "32 KBPS CCITT Compatible Split Band Coding Scheme," *IEEE Int. Conf. on Acoust., Speech, and Signal Proc.*, 1978, pp. 320-325.

(List continued on next page.)

*Primary Examiner*—David D. Knepper
*Attorney, Agent, or Firm*—Thomas A. Gallagher; David N. Lathrop

[57] ABSTRACT

A low bit-rate (192 kBits per second) transform encoder/decoder system (44.1 kHz or 48 kHz sampling rate) for high-quality music applications employs short time-domain sample blocks (128 samples/block) so that the system signal propagation delay is short enough for real-time aural feedback to a human operator. Carefully designed pairs of analysis/synthesis windows are used to achieve sufficient transform frequency selectivity despite the use of short sample blocks. A synthesis window in the decoder has characteristics such that the product of its response and that of an analysis window in the encoder produces a composite response which sums to unity for two adjacent overlapped sample blocks. Adjacent time-domain signal samples blocks are overlapped and added to cancel the effects of the analysis and synthesis windows. A technique is provided for deriving suitable analysis/synthesis window pairs. In the encoder, a discrete transform having a function equivalent to the alternate application of a modified Discrete Cosine Transform and a modified Discrete Sine Transform according to the Time Domain Aliasing Cancellation technique or, alternatively, a Discrete Fourier Transform is used to generate frequency-domain transform coefficients. The transform coefficients are nonuniformly quantized by assigning a fixed number of bits and a variable number of bits determined adaptively based on psychoacoustic masking. A technique is described for assigning the fixed bit and adaptive bit allocations. The transmission of side information regarding adaptively allocated bits is not required. Error codes and protected data may be scattered throughout formatted frame outputs from the encoder in order to reduce sensitivity to noise bursts.

158 Claims, 24 Drawing Sheets

OTHER PUBLICATIONS

Lee, "Effects of Delayed Speech Feedback," *J. Acoust. Soc. Am.*, vol. 22, Nov., 1950, pp. 824-826.

Cooley, Tukey, "An Algorithm for the Machine Calculation of Complex Fourier Series," *Math. Comput.*, vol. 19, 1965, pp. 297-301.

Parks, McClellan, "Chebyshev Approximation for Nonrecursive Digital Filters with Linear Phase," *IEEE Trans.*, vol. CT-19, Mar. 1972, pp. 189-194.

Brigham, *The Fast Fourier Transform*, Englewood Cliffs, NJ: Prenctice-Hall, Inc., 1974, pp. 166-169.

Lee, Lipschutz, "Floating-Point Encoding for Transcription of High-Fidelity Audio Signals," *J. Audio Eng. Soc.*, vol. 25, May, 1977, pp. 266-272.

Harris, "On the Use of Windows for Harmonic Analysis with the Discrete Fourier Transform," *Proc. IEEE, vol. 66, Jan., 1978, pp. 51-83*.

Tribolet, Crochiere, "Frequency Domain Coding of Speech," *IEEE Trans. Acoust., Speech, and Signal Proc.*, vol. ASSP-27, Oct., 1979, pp. 512-530.

Crochiere, "A Weighted Overlap-Add Method of Short-Time Fourier Analysis/Synthesis," *IEEE Trans.*, vol. ASSP-28, Feb., 1980, pp. 99-102.

S. Prakash, V. V. Rao, "Fixed-Point Error Analysis of Radix-4 FFT," *Signal Processing*, vol. 3, Apr., 1981, pp. 123-133.

Brandenburg, Schramm, "A 16 Bit Adaptive Transform Coder for Real-Time Processing of Sound Signals", *Signal Processing II*, 1983, pp. 359-362.

Smith, *Digital Transmission Systems*, New York, NY: Van Nostrand Reinhold Co., 1985, pp. 228-236.

Fielder, "Pre- and Postemphasis Techniques as Applied to Audio Recording Systems," *J. Audio Eng. Soc.*, vol. 33, 1985, pp. 649-657.

Press, Flannery, Teukolsky, Vetterling, *Numerical Recipes: The Art of Scientific Computing*, New York: Cambridge University Press, 1986, pp. 254-259.

Peterson, Weldon, *Error-Correcting Codes*, Cambridge, Mass: The M.I.T. Press, 1986, pp. 269-309, 361-362.

Princen, Bradley, "Analysis/Synthesis Filter Bank Design Based on Time Domain Aliasing Cancellation," *IEEE Trans.*, vol. ASSP-34, Oct., 1986, pp. 1153-1161.

Stoll, Theile, "New Digital Sound Transmission Methods—How is Sound Quality Assessed," *Report, 14th Meeting of Audio Engineers*, Munich, Nov., 1986.

Brandenburg, "OCF—A New Coding Algorithm for High Quality Sound Signals," *IEEE Int. Conf. on Acoust., Speech, and Signal Proc.*, 1987, pp. 141-144.

Johnson, Bradley, "Adaptive Transform Coding Incorporating Time Domain Aliasing Cancellation," *Speech Communications.*, vol. 6, 1987, pp. 299-308.

Fielder, "Evaluation of the Audible Distortion and Noise Produced by Digital Audio Converters," *J. Audio Eng. Soc.*, vol. 35, Jul., 1987, pp. 517-534.

*Audio Engineering Handbook*, K. B. Benson ed., San Francisco: McGraw-Hill, 1988, pp. 1.40-1.42, 4.8-4.10.

Johnston, "Transform Coding of Audio Signals Using Perceptual Noise Criteria," *IEEE J. on Selected Areas in Comm.*, vol. 6, Feb., 1988, pp. 314-323.

Brandenburg, Kapust, et al., "Real-Time Implementation of Low Complexity Transform Coding", *AES Preprint* 2581, 84th Convention, Paris, 1988.

Lookabaugh, "Variable Rate and Adaptive Frequency Domain Vector Quantization of Speech," PhD Dissertation, Stanford University, Jun., 1988, pp. 166-182.

Brandenburg, Kapust, et al., "Low Bit Rate Codecs for Audio Signals Implementation in Real Time," *AES Preprint* 2707, 85th Convention, Nov., 1988.

Brandenburg, Seitzer, "OCF: Coding High Quality Audio with Data Rates of 64 kBit/Sec," *AES Preprint* 2723, 85th Convention, Los Angeles, Nov., 1988.

Feiten, "Spectral Properties of Audio Signals and Masking with Aspect to Bit Data Reduction," *AES Preprint* 2795, 86th Convention, Hamburg, Mar., 1989.

Edler, "Coding of Audio Signals with Overlapping Block Transform and Adaptive Window Functions," *Frequenz*, vol. 43, No. 9, 1989, pp. 252-256.

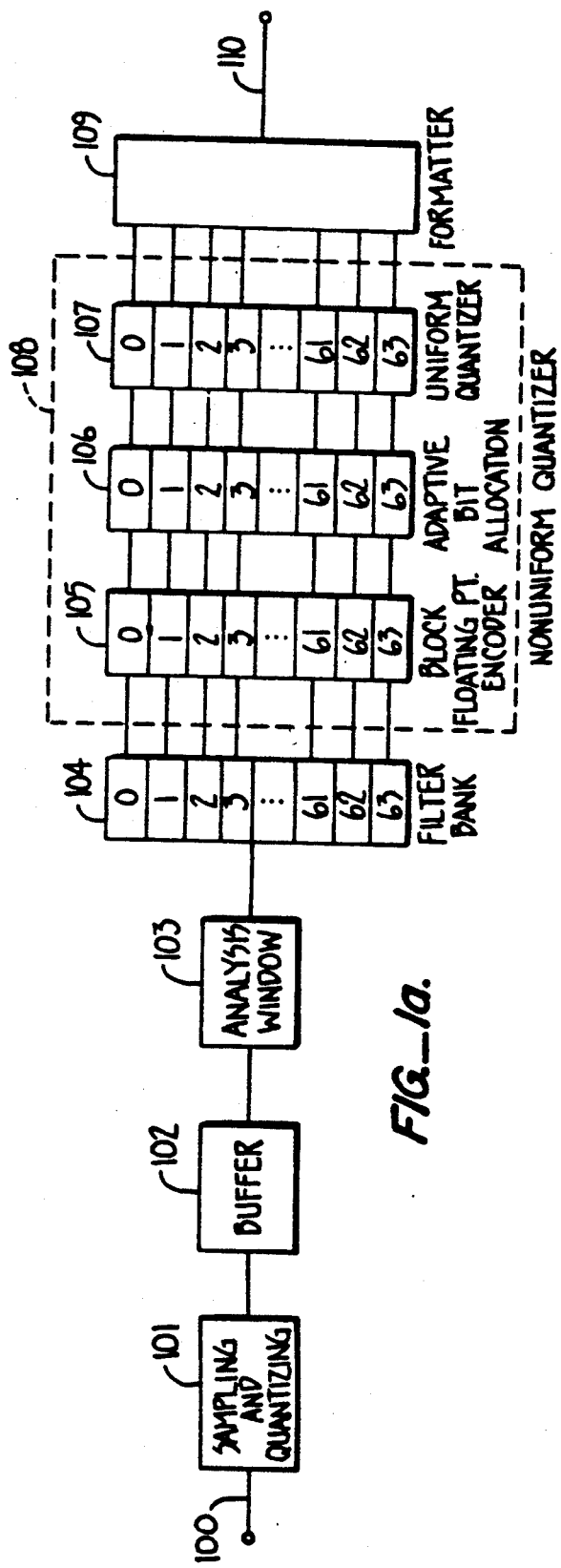
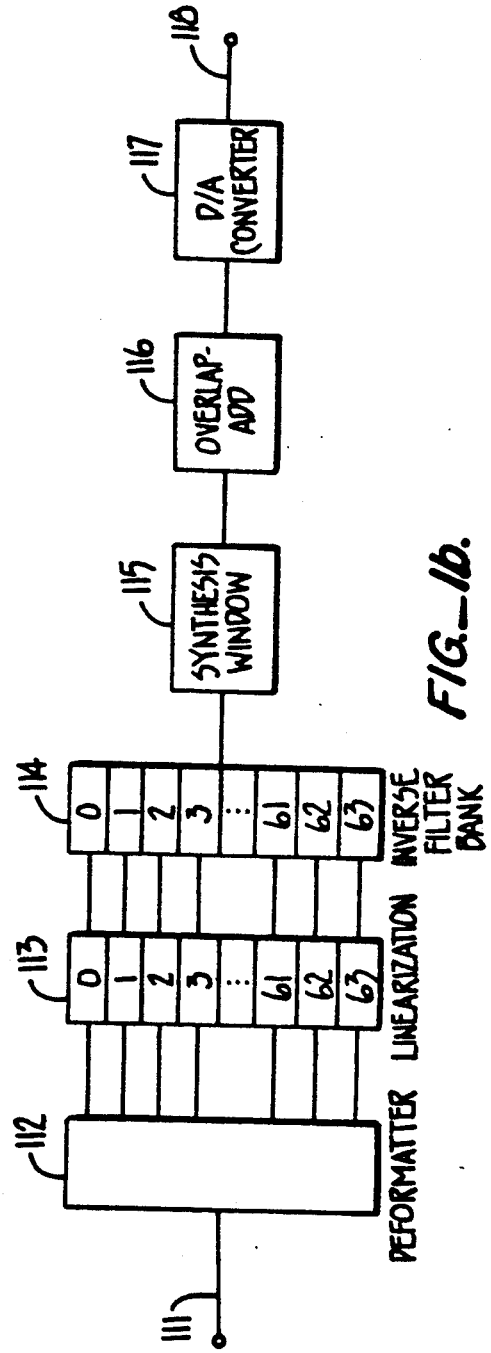
FIG.—1a.
FIG.—1b.

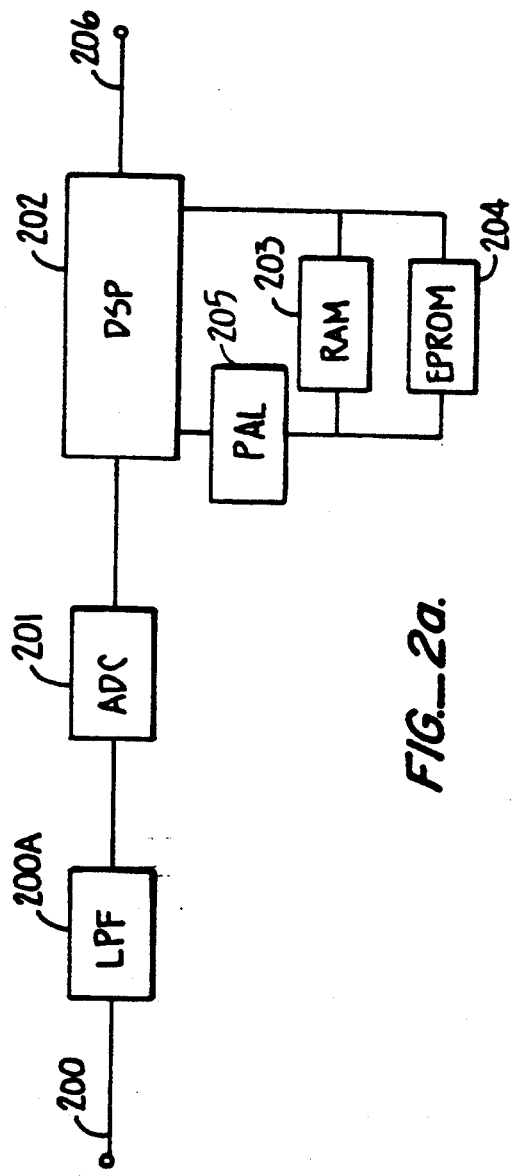
FIG._2a.
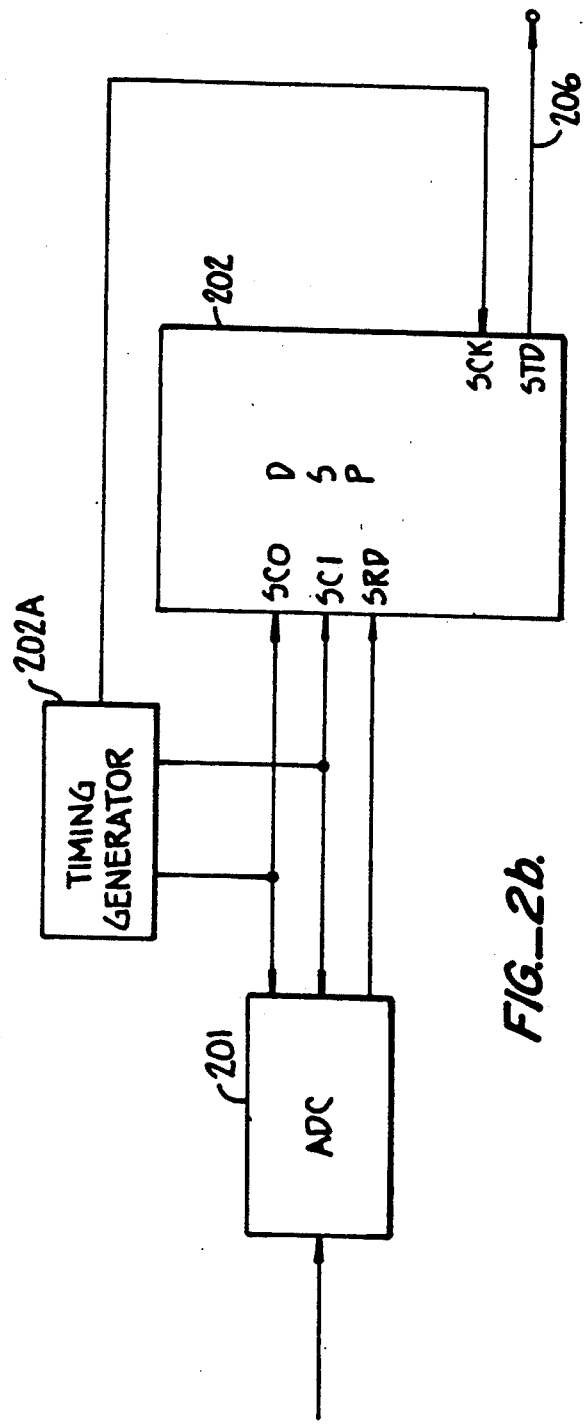
FIG._2b.

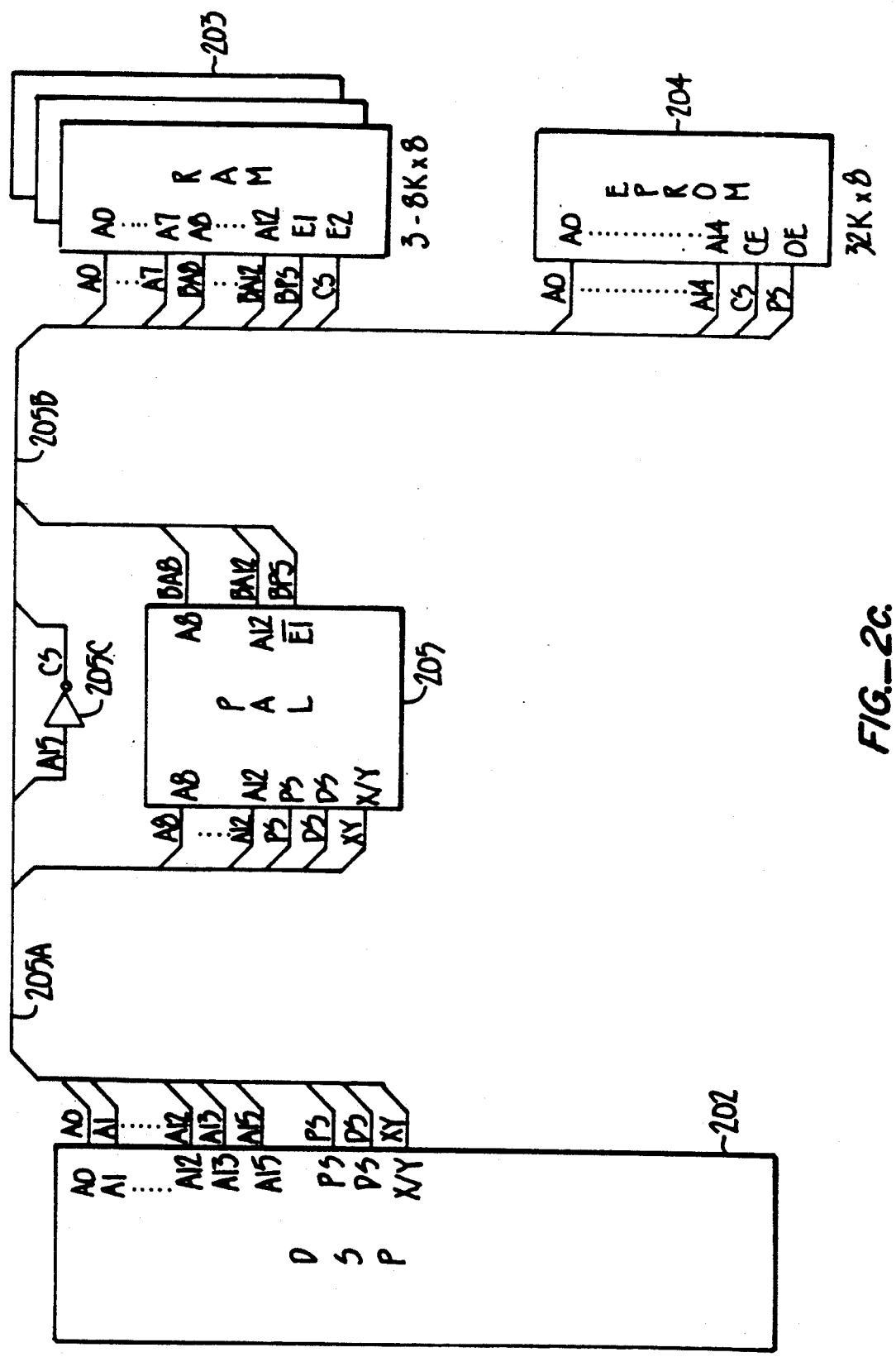
FIG.—2C.

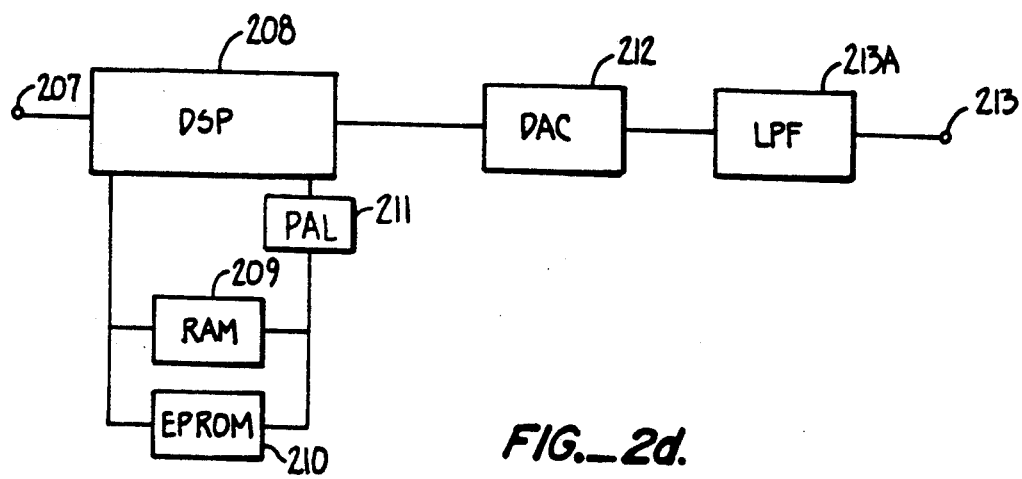
FIG._2d.
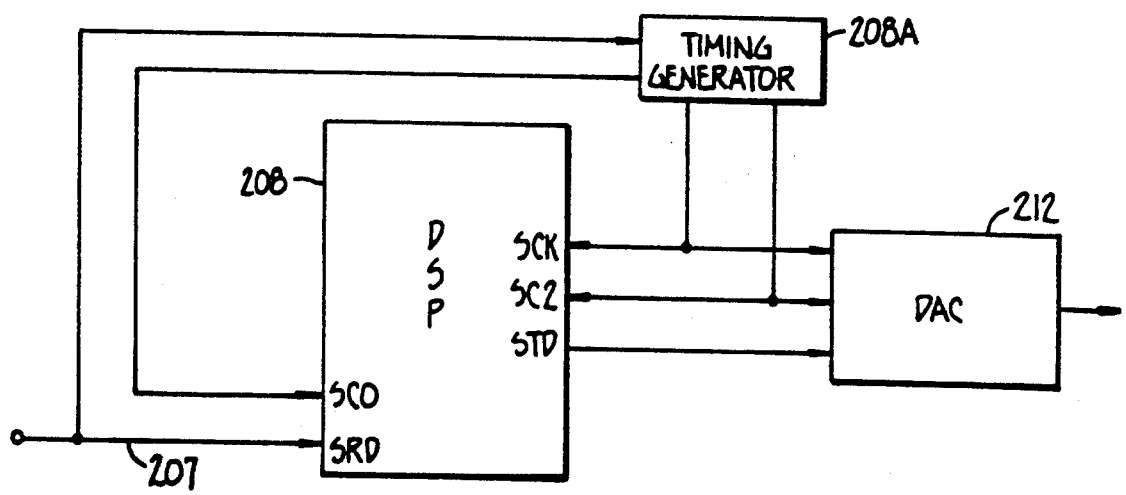
FIG._2e.

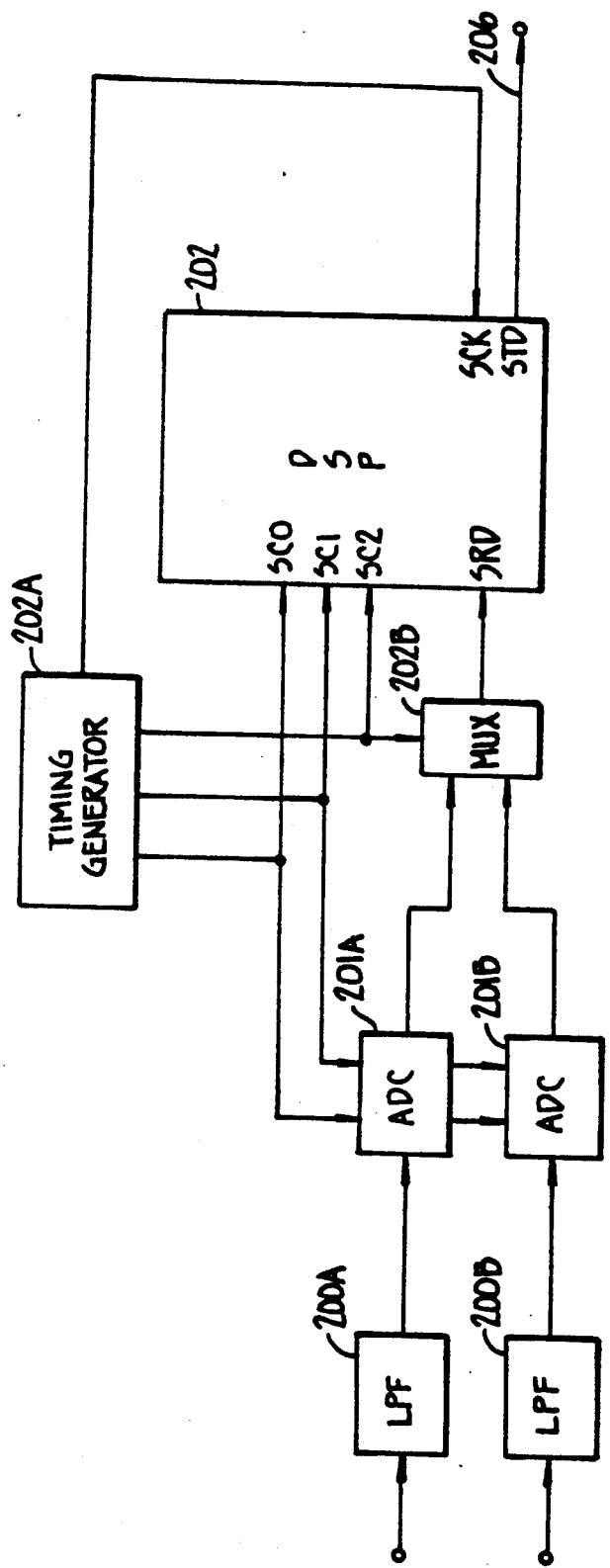
FIG._3a.

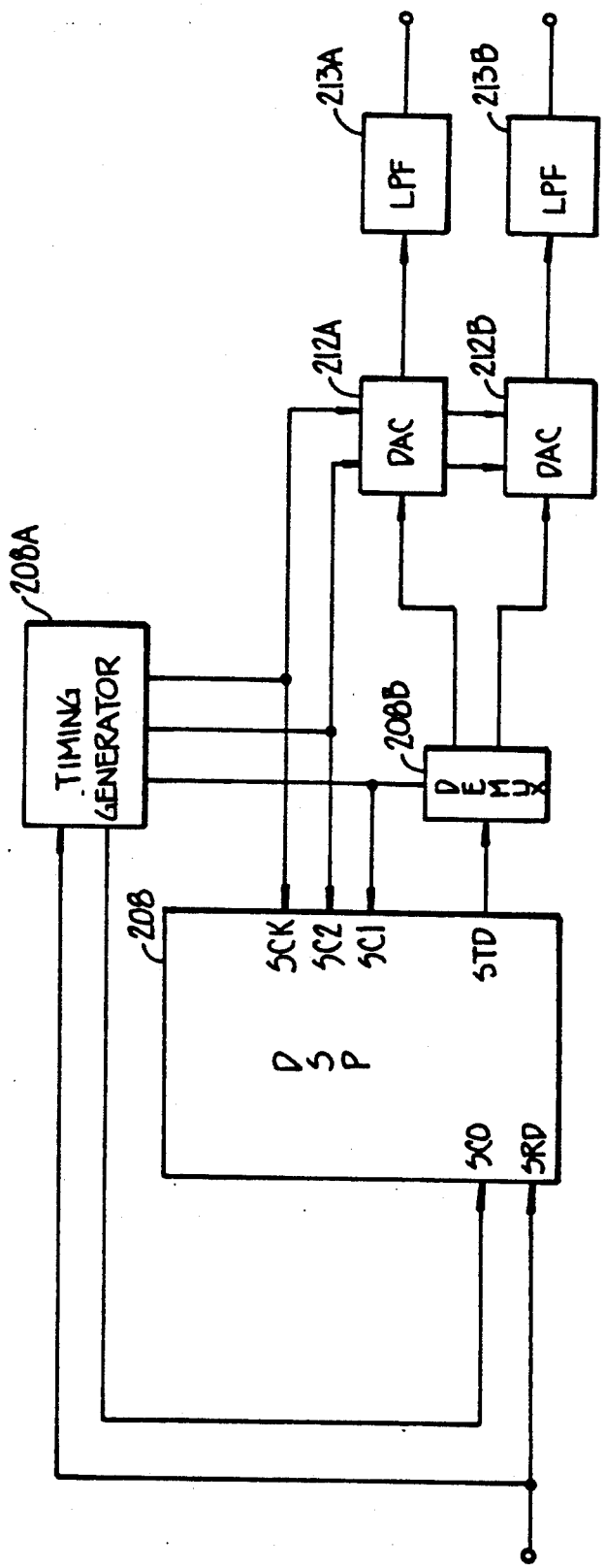
FIG._3b.

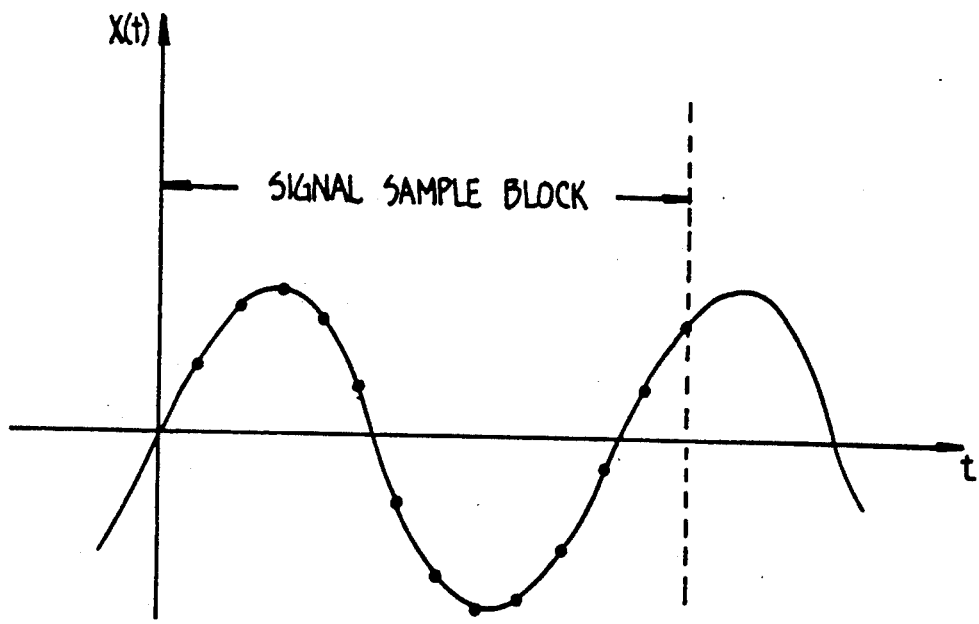
FIG._4.
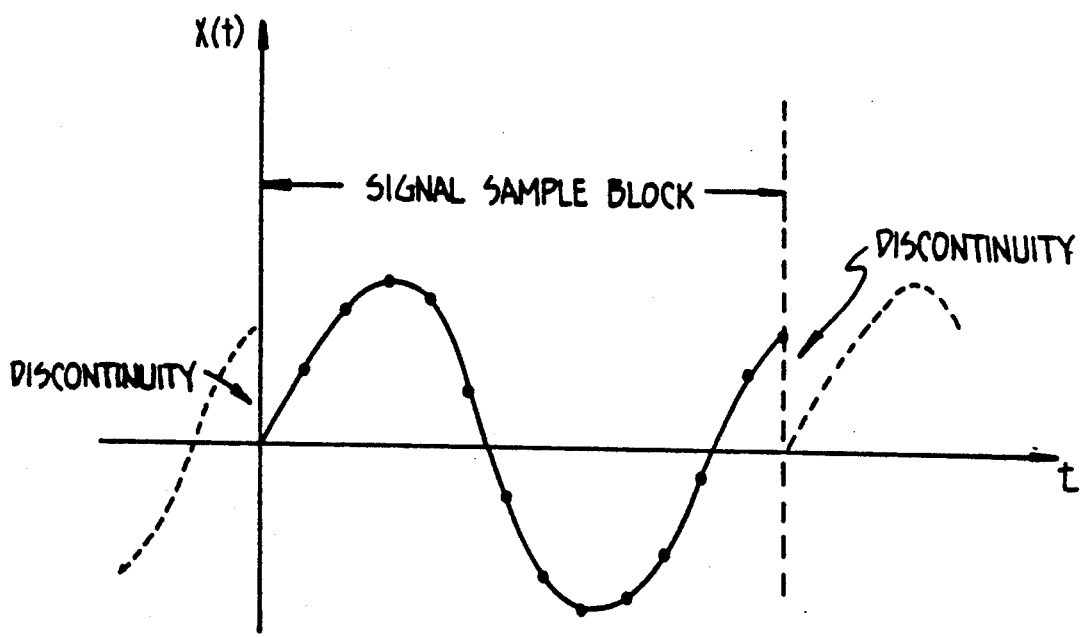
FIG._5.

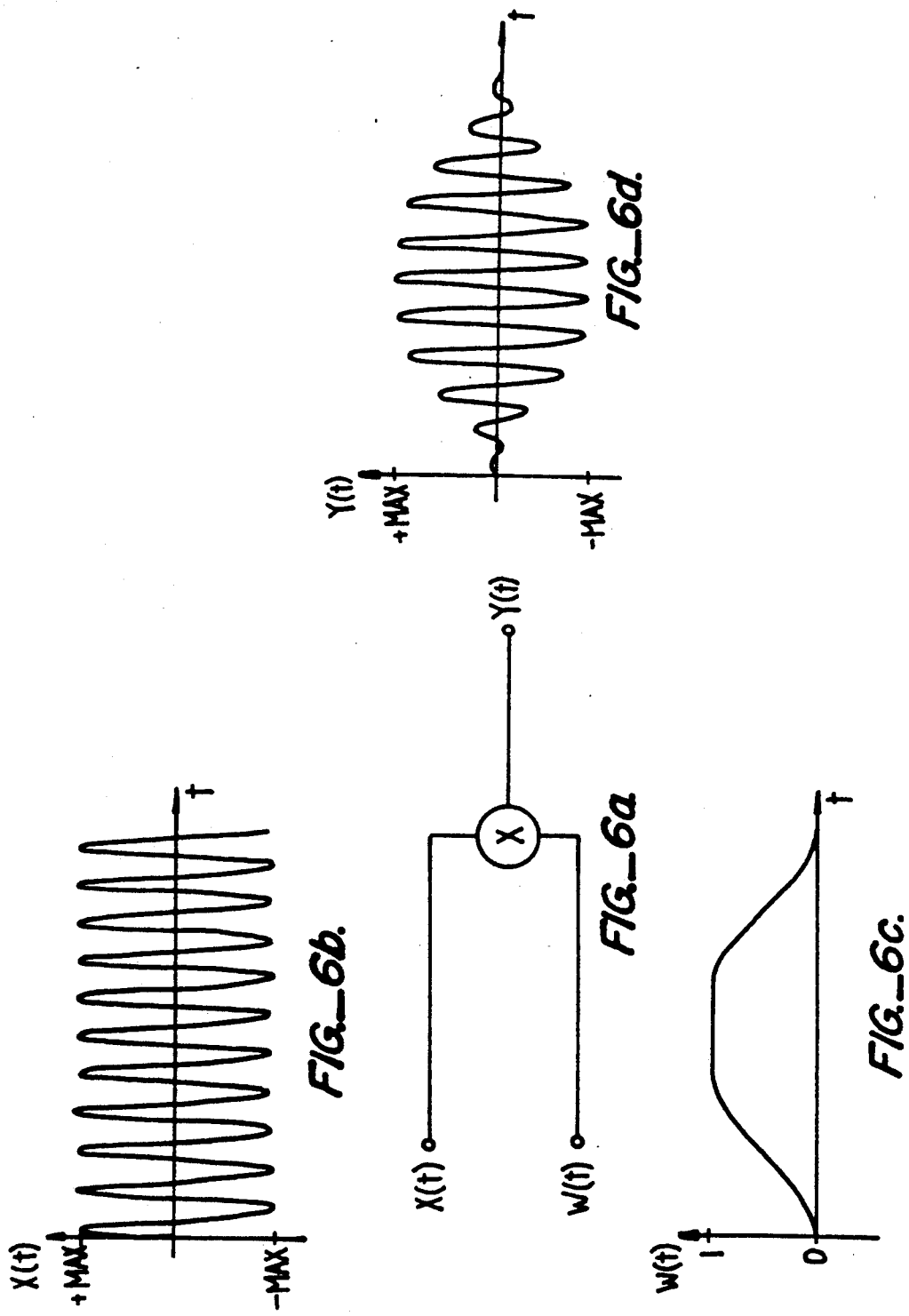

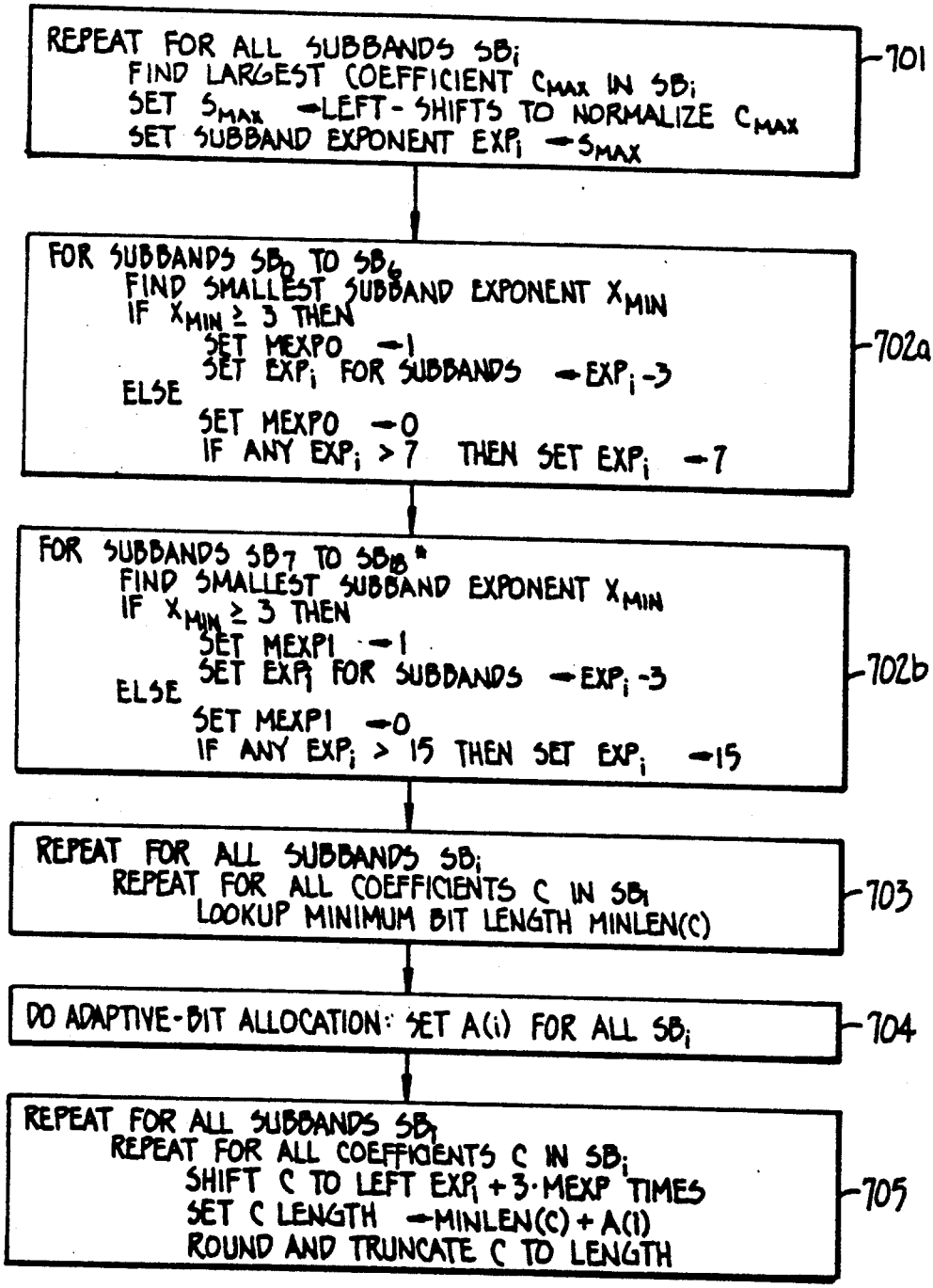
*THE 20 kHz CODER USES SUBBANDS $SB_7$ TO $SB_{20}$.
FIG._7.

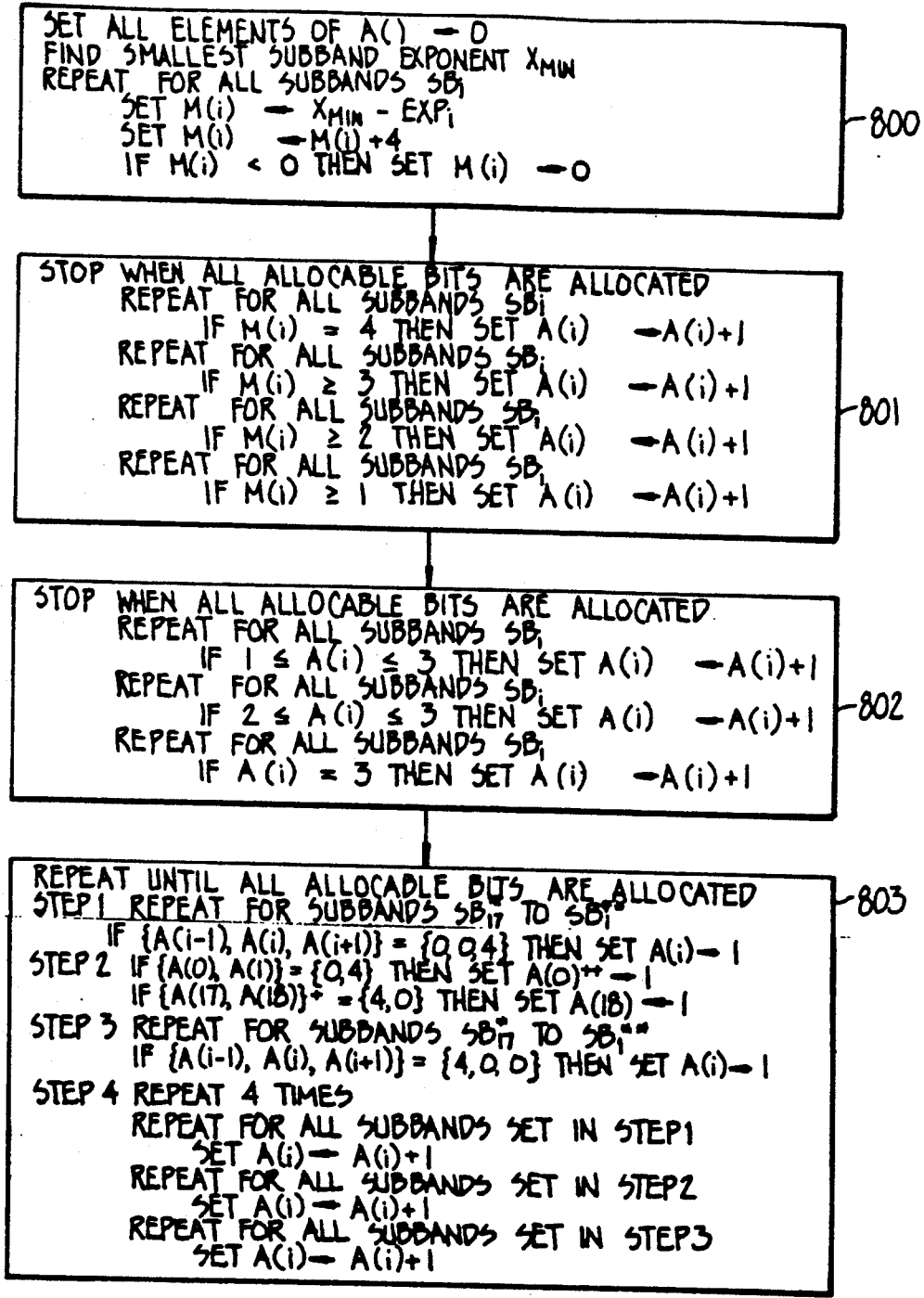
FIG._8

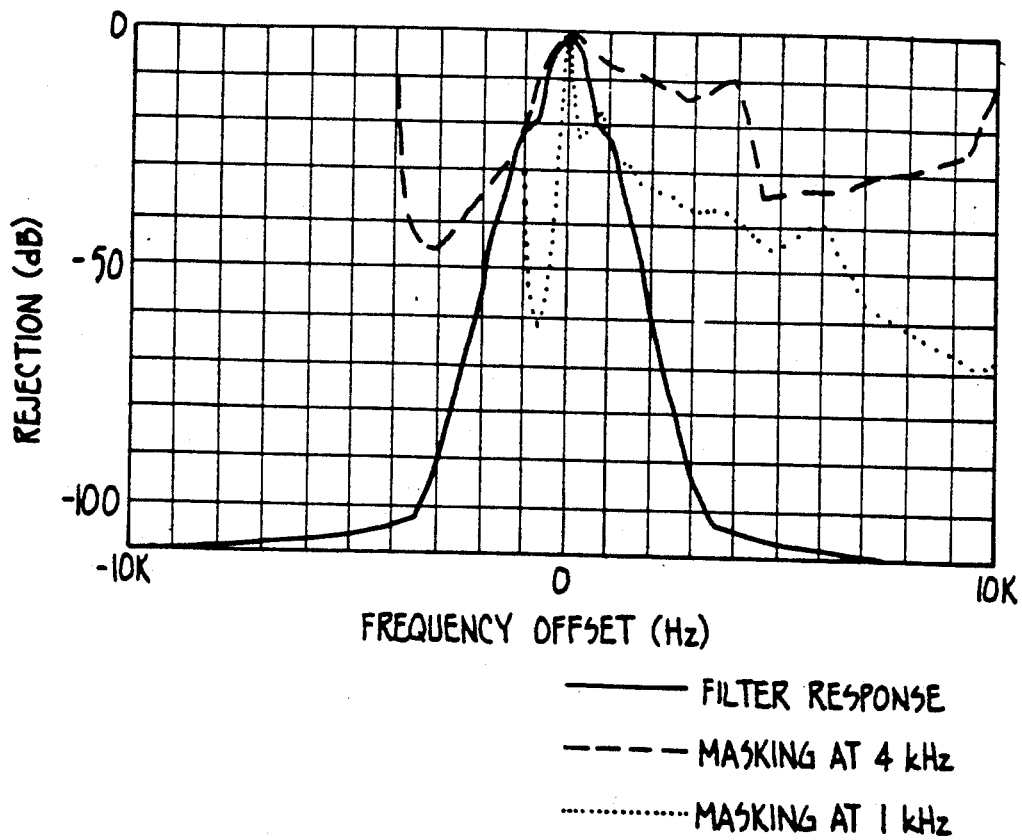
FIG._9.
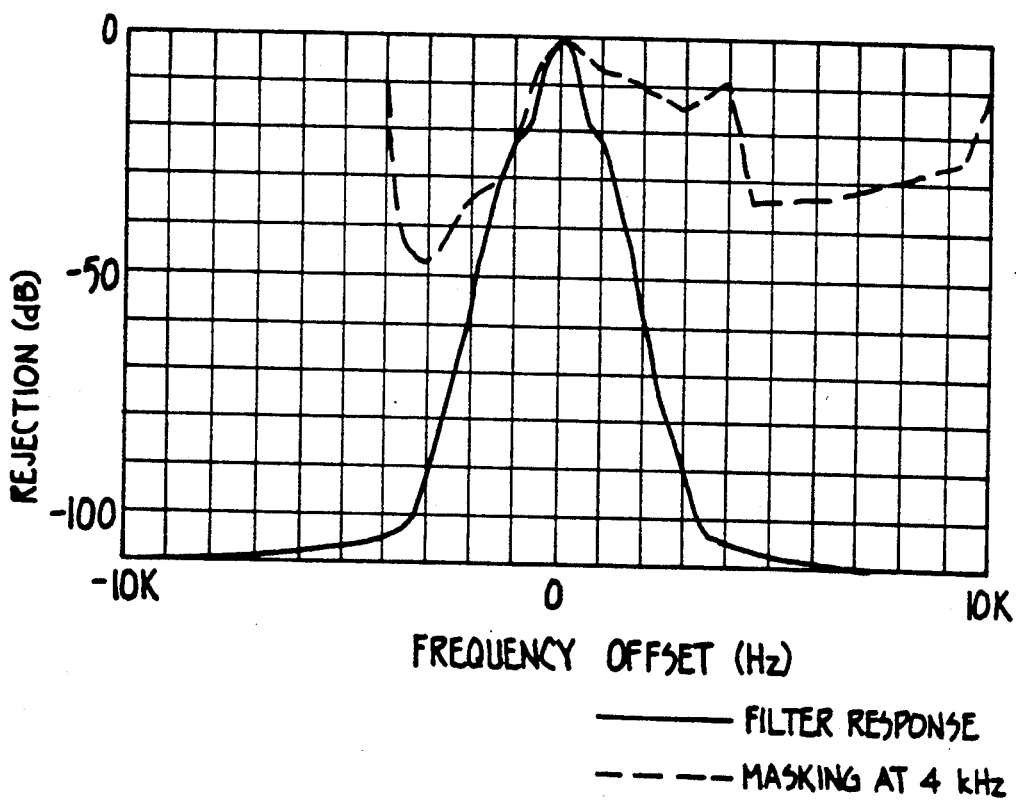
FIG._10.

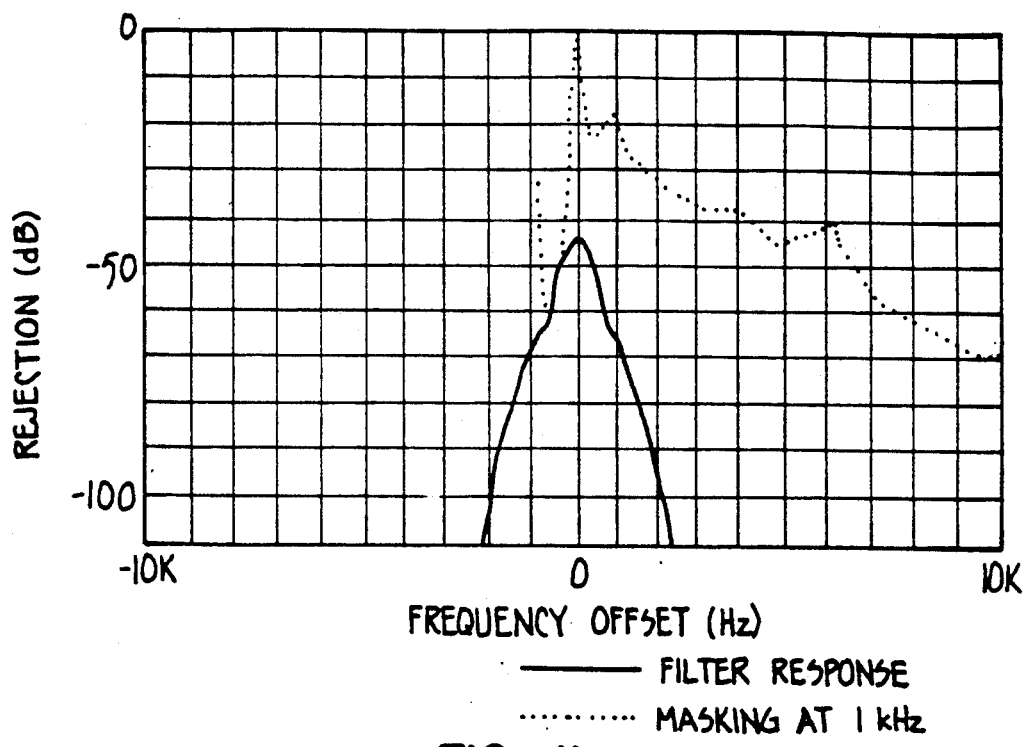
FIG._11.

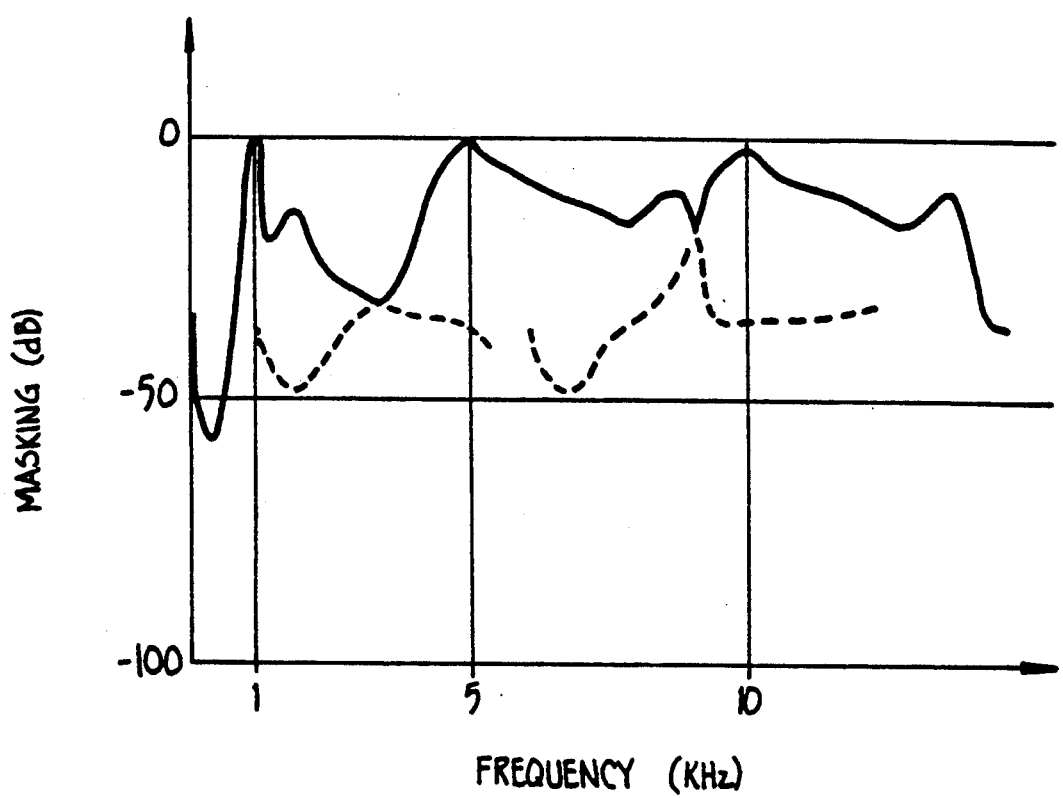
FIG._12.

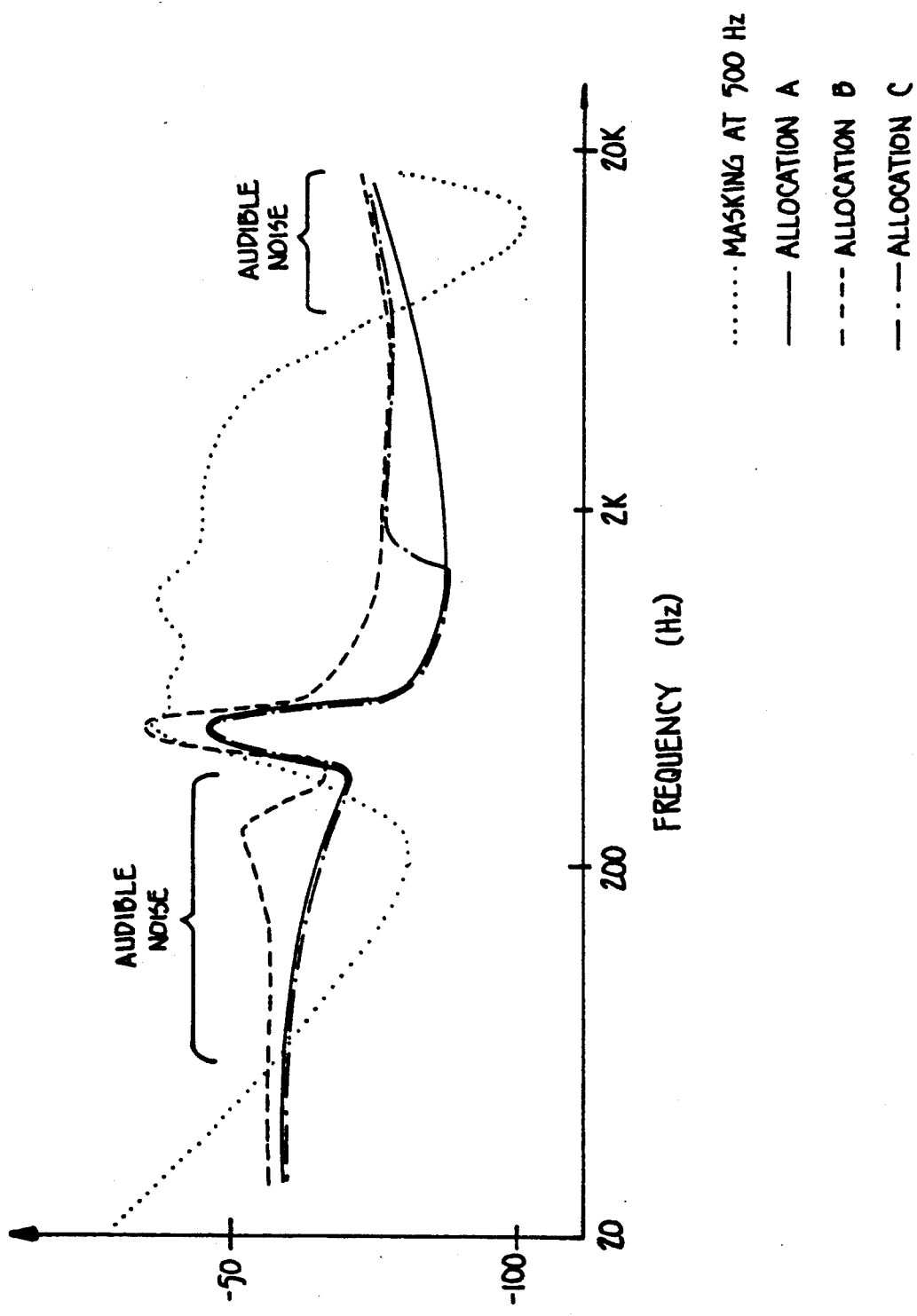
FIG_13.

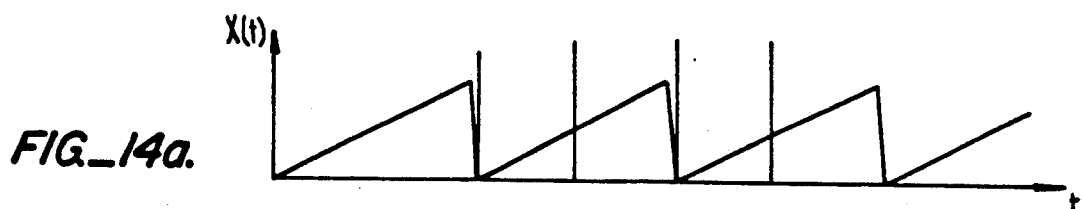
FIG._14a.
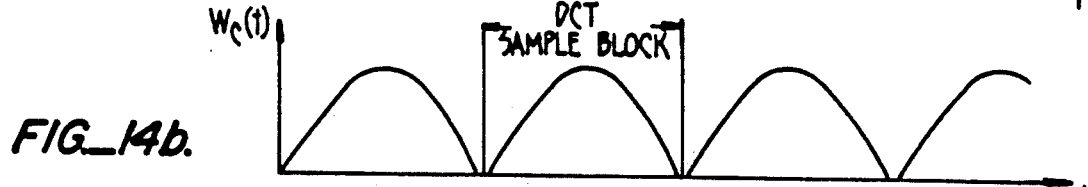
FIG._14b.
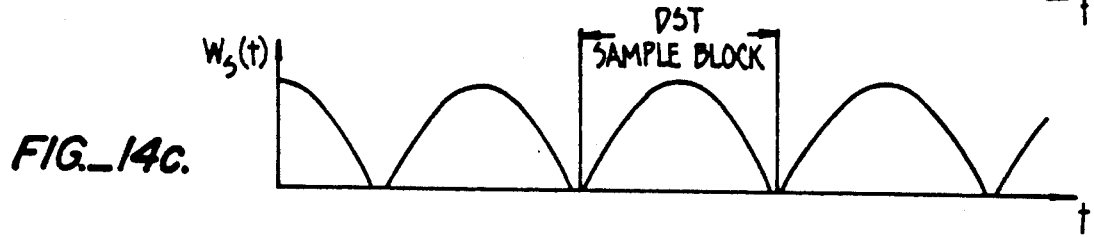
FIG._14c.
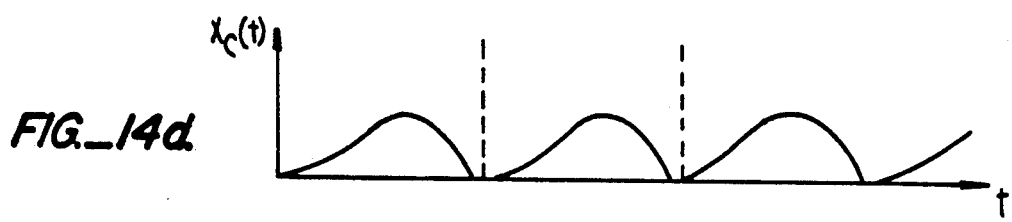
FIG._14d.
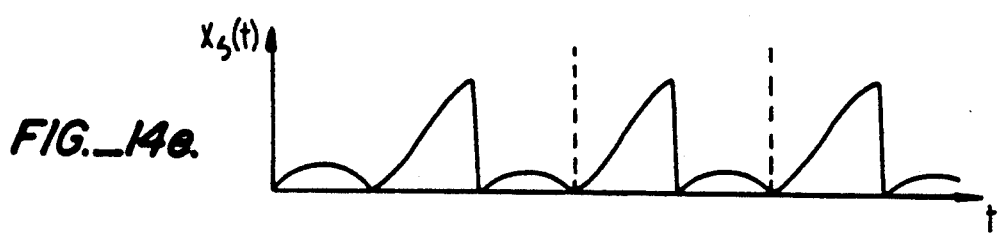
FIG._14e.

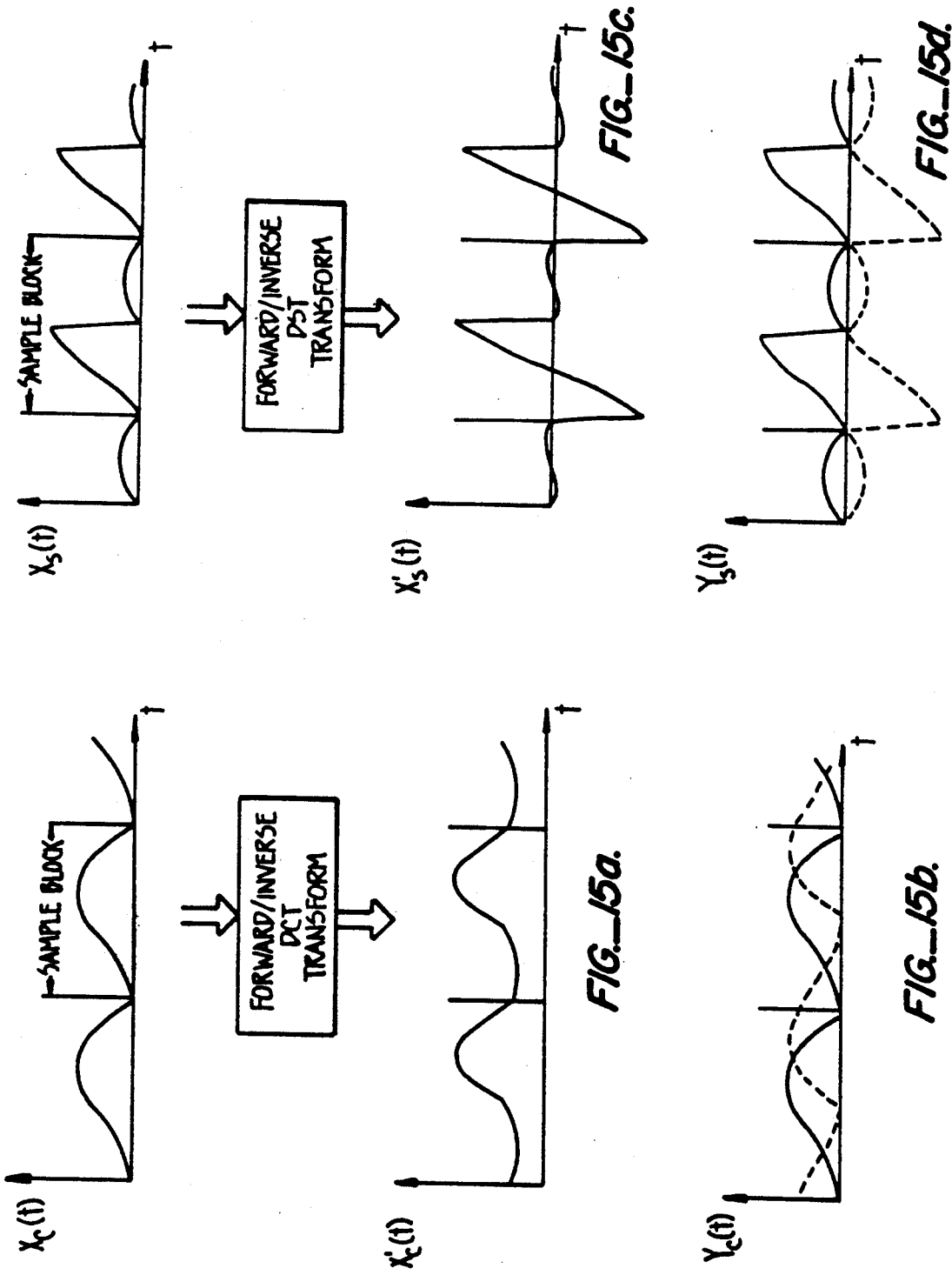

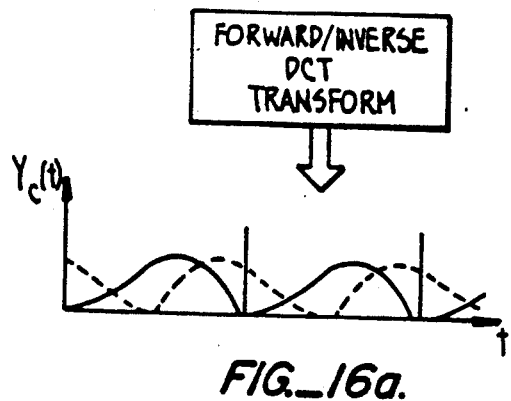
FIG._16a.
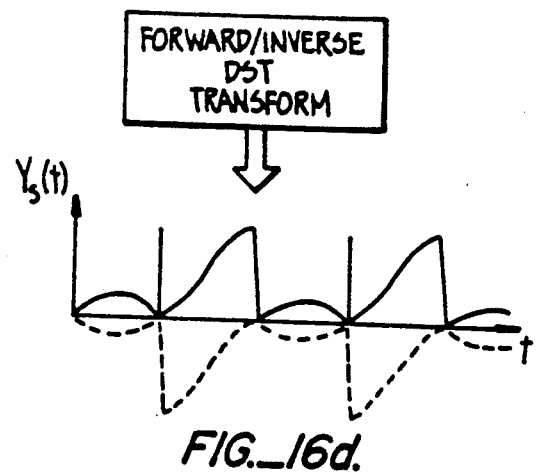
FIG._16d.
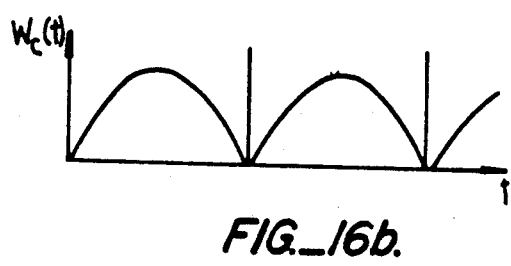
FIG._16b.
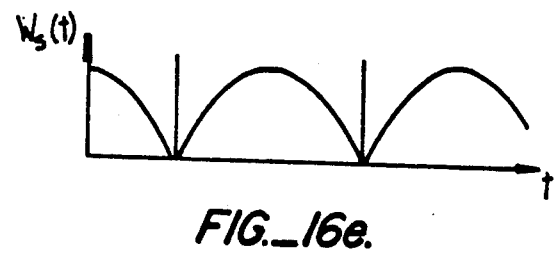
FIG._16e.
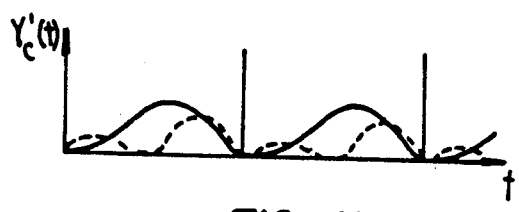
FIG._16c.
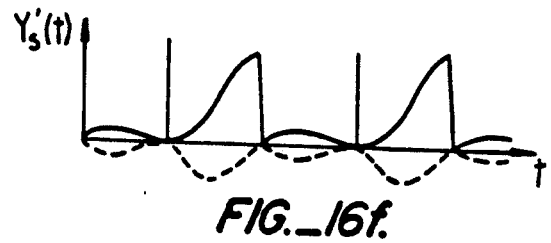
FIG._16f.
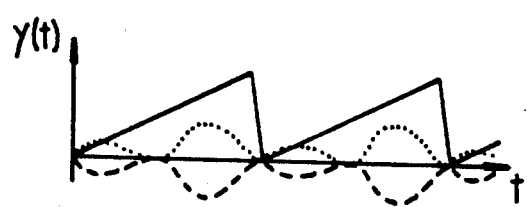
FIG._16g.

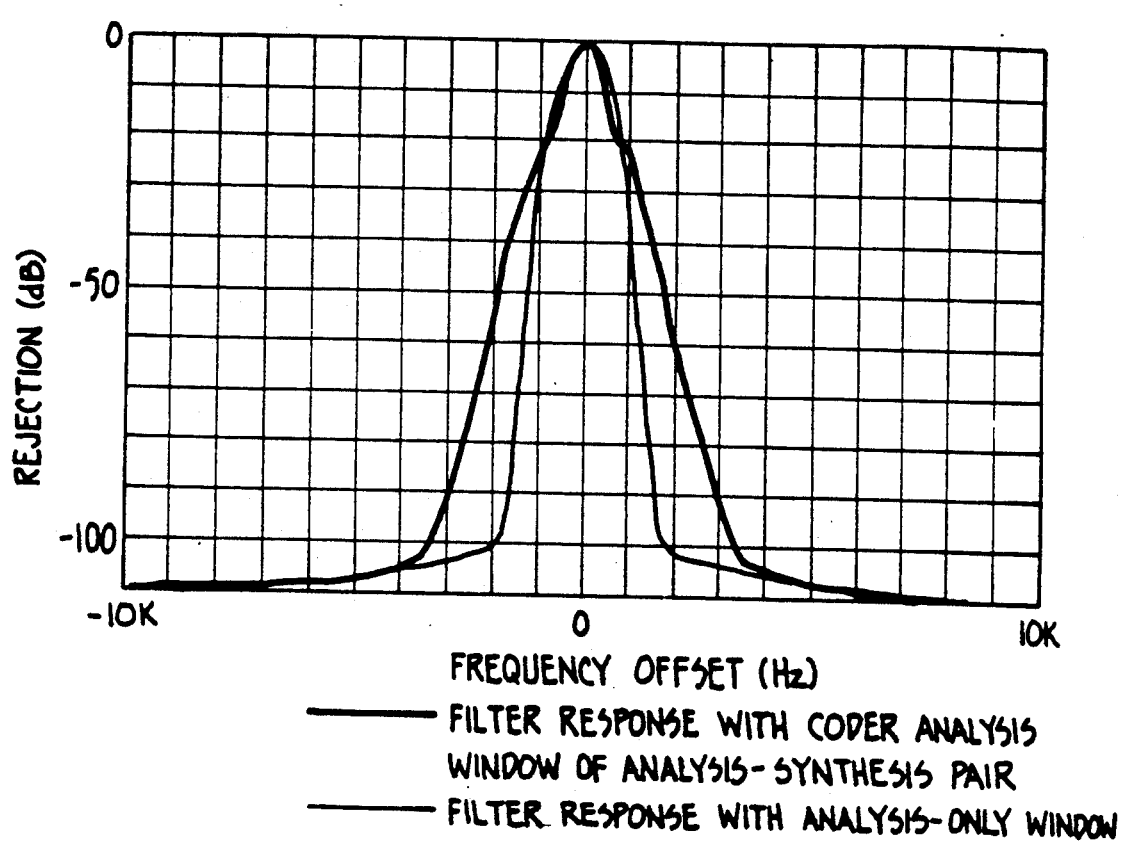
FIG_17.

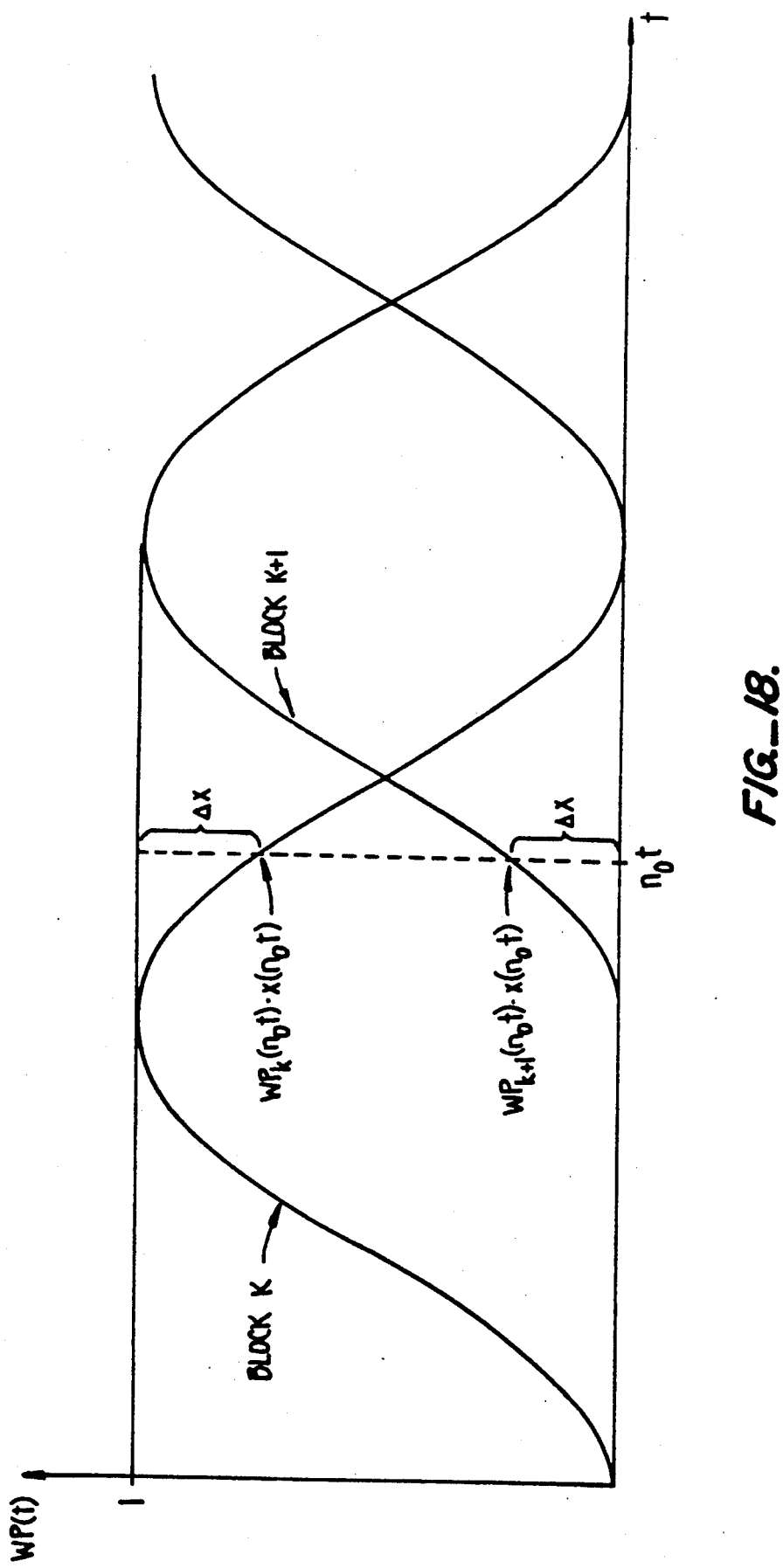
FIG._18.

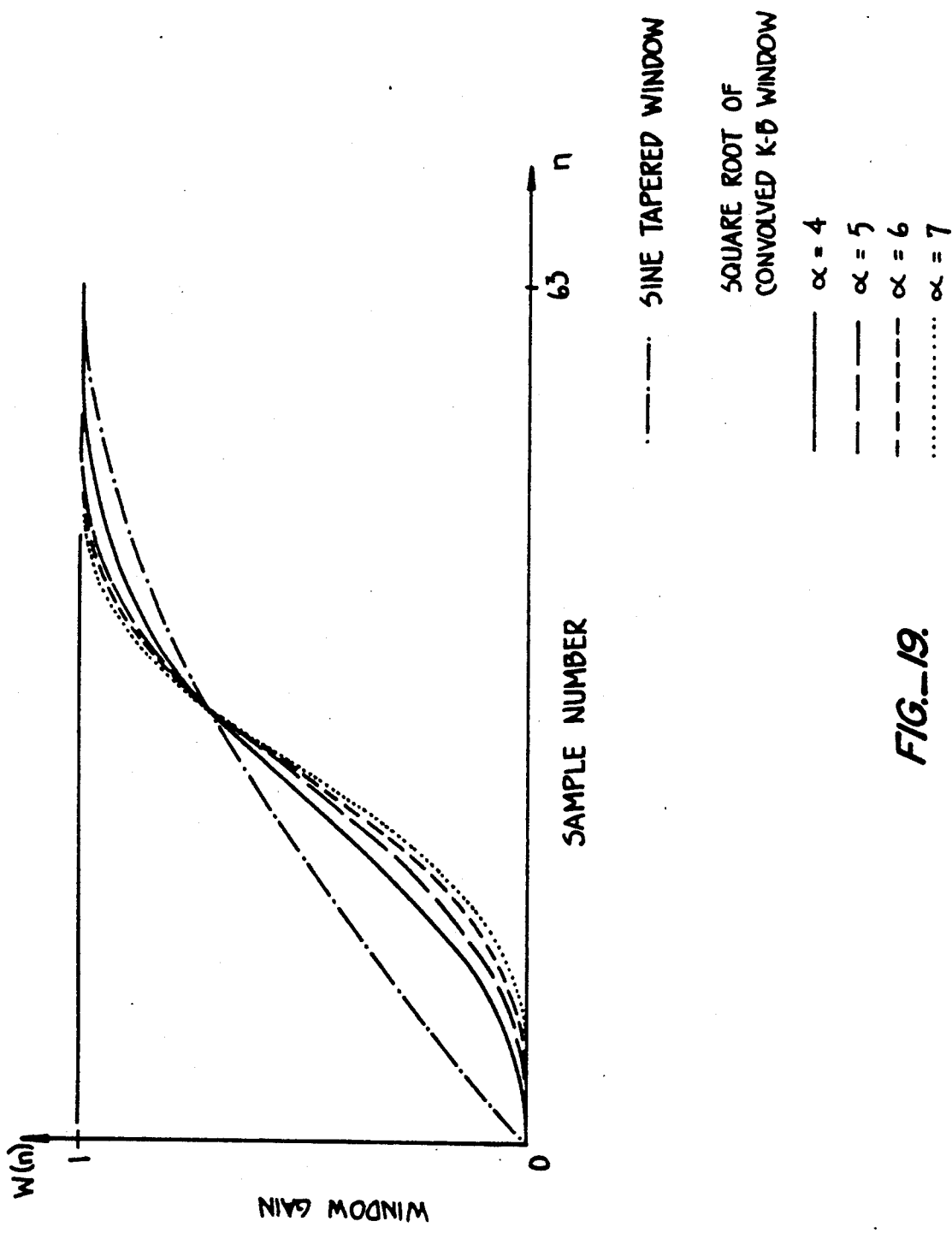
FIG._19.

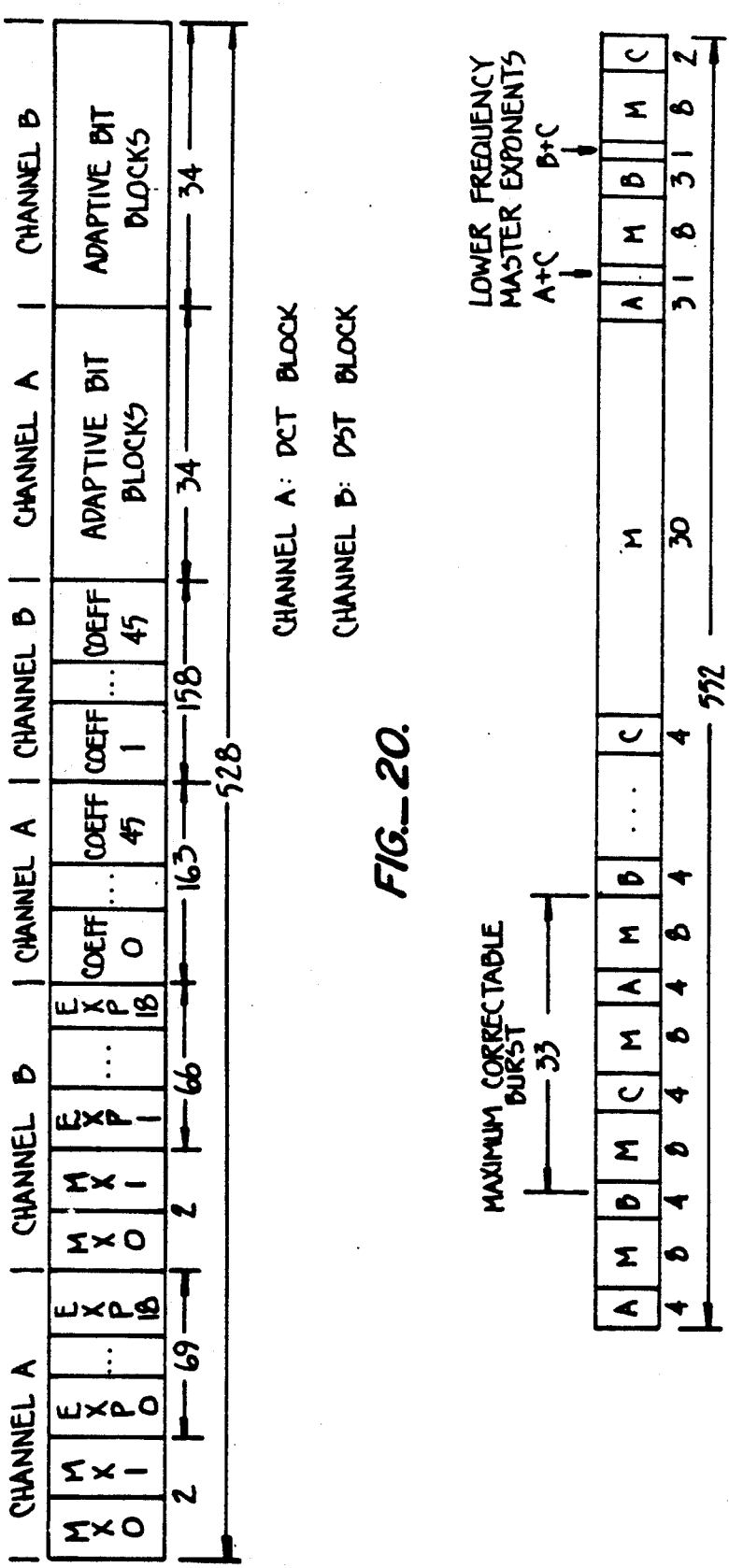
FIG._20.
FIG._21.

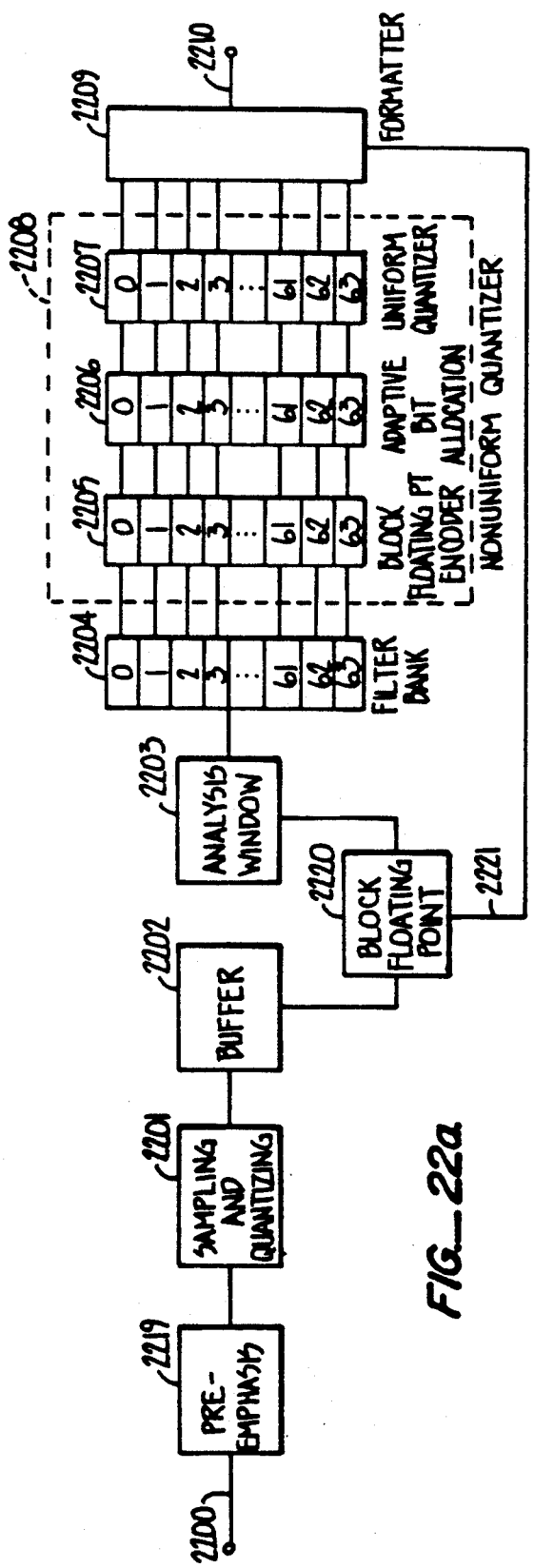
FIG._22a.
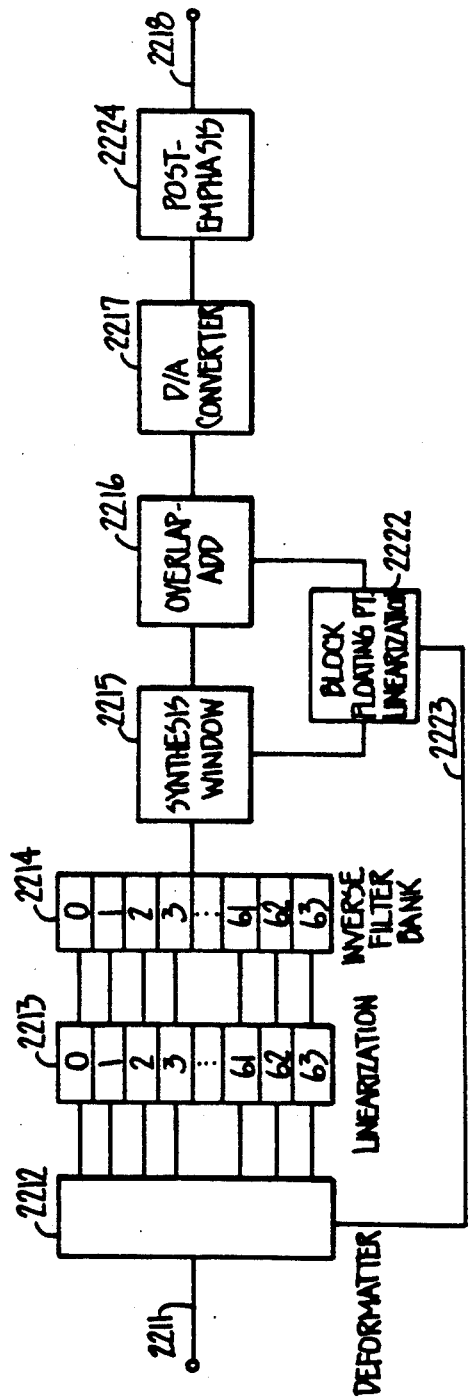
FIG._22b.

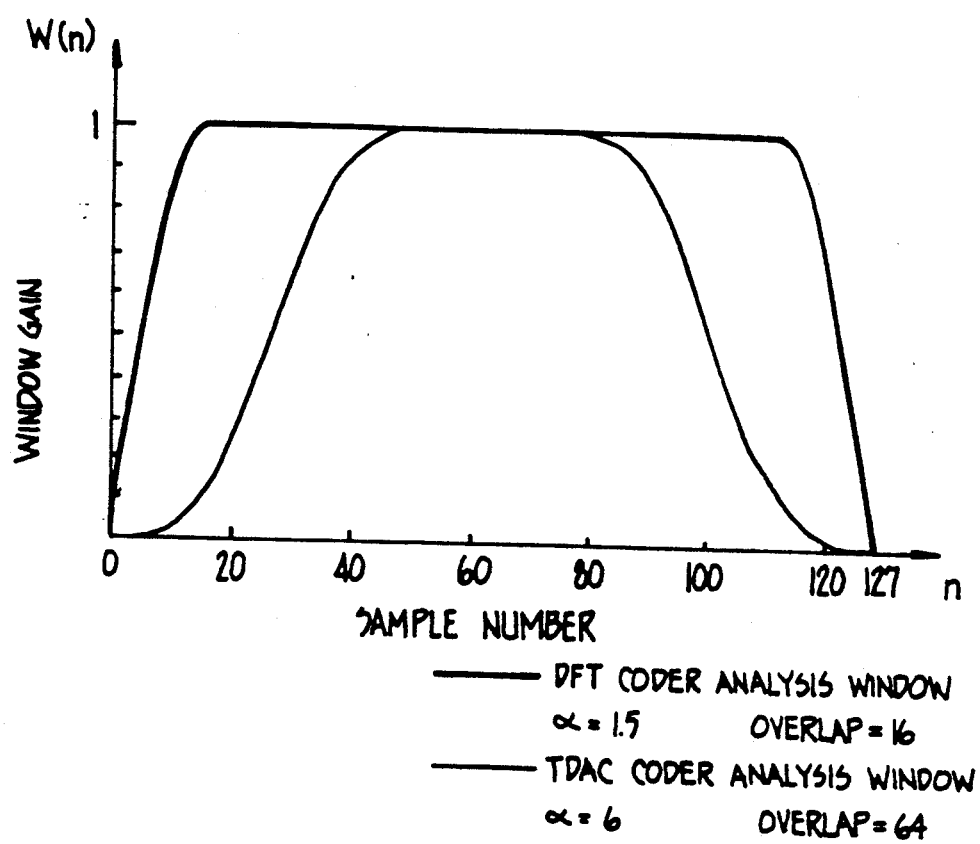
FIG._23.
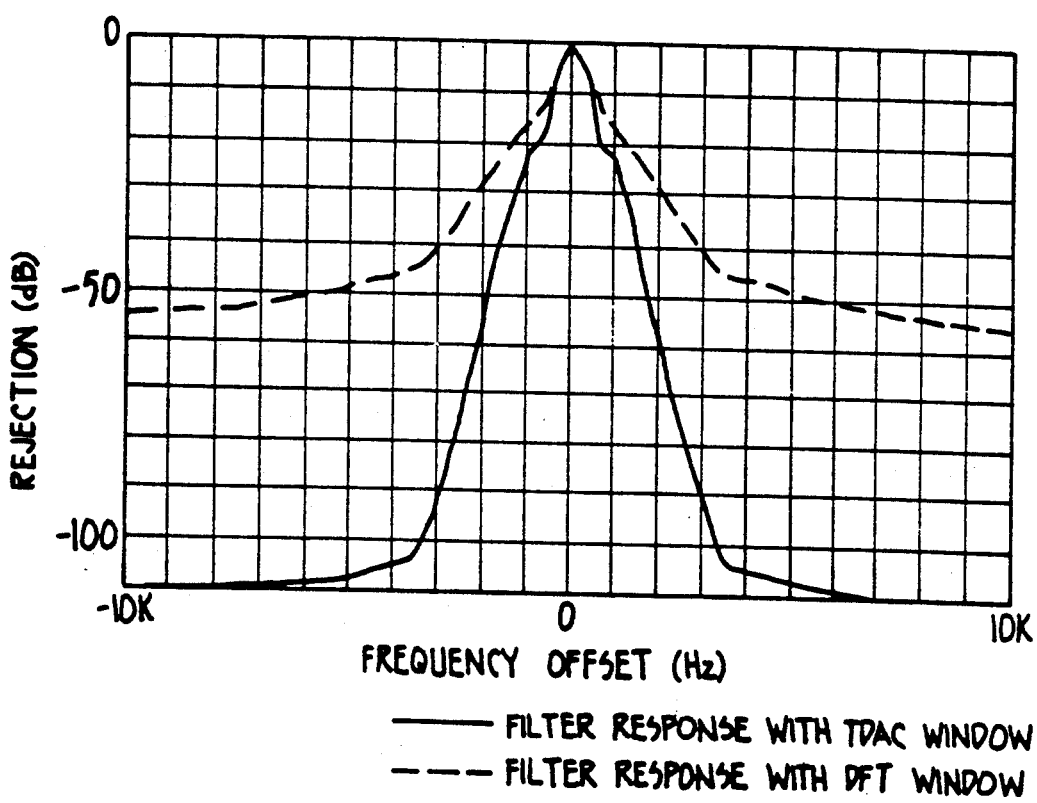
FIG._24.

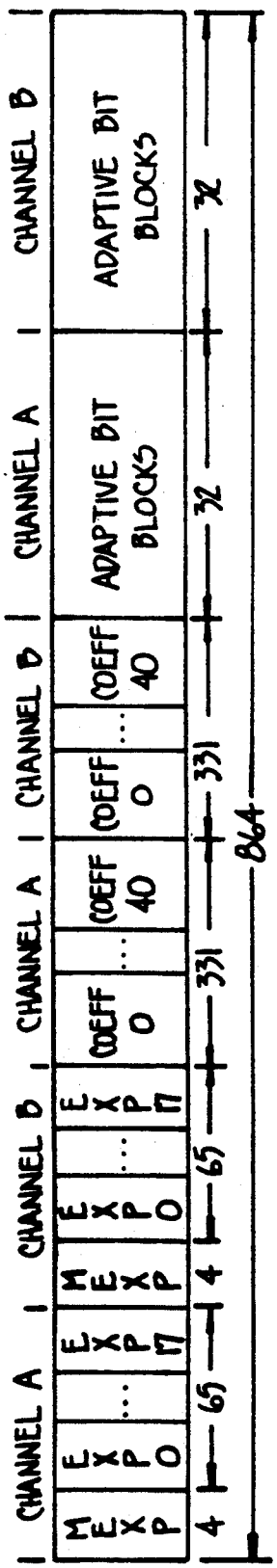
FIG._25.
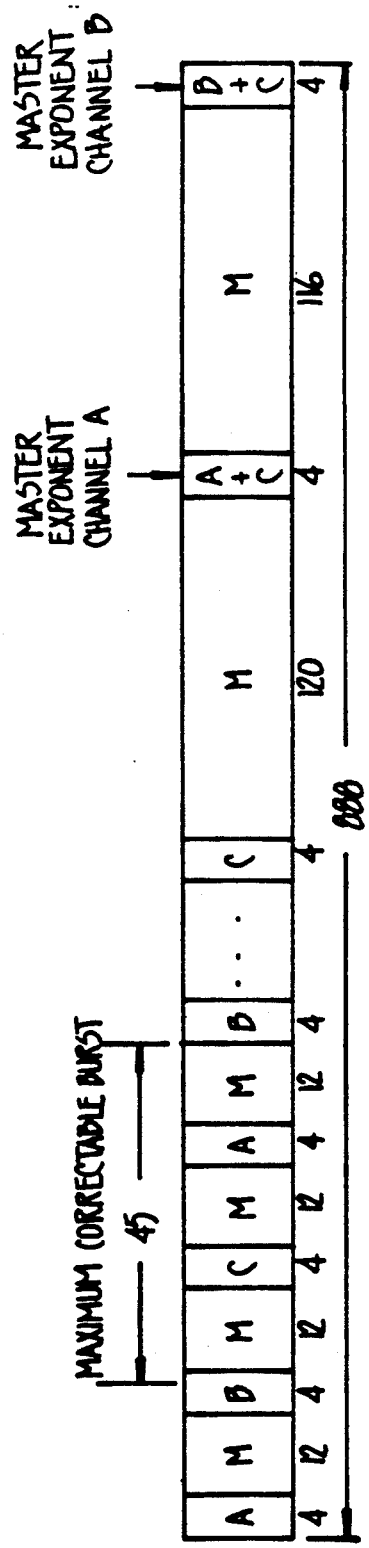
FIG._26.
A = DATA AND ERROR CHECK BITS FOR R-S CODE #1
B = DATA AND ERROR CHECK BITS FOR R-S CODE #2
C = DATA AND ERROR CHECK BITS FOR R-S CODE #3
M = UNPROTECTED PARTS OF TRANSFORM COEFFICIENT CODE WORDS AND ADAPTIVE BIT BLOCKS

LOW TIME-DELAY TRANSFORM CODER, DECODER, AND ENCODER/DECODER FOR HIGH-QUALITY AUDIO

CROSS-REFERENCE TO RELATED APPLICATIONS

This application is a continuation-in-part of U.S. patent application Ser. No. 07/458,894 filed Dec. 29, 1989, application Ser. No. 07/439,868 filed Nov. 20, 1989, abandoned, and application Ser. No. 07/303,714 filed Jan. 27, 1989, abandoned.

TECHNICAL FIELD

The invention relates in general to the high-quality low bit-rate digital signal processing of audio signals, such as music signals. More particularly, the invention relates to transform encoders and decoders for such signals, wherein the encoders and decoders have a short signal-propagation delay. Short delays are important in applications such as broadcast audio where a speaker must monitor his own voice. A delay in voice feedback causes serious speech disruption unless the delay is very short.

BACKGROUND ART

INTRODUCTION

Transform coding of high-quality signals in the prior art have used long signal sample block lengths to achieve low bit-rate coding without creating objectionable audible distortion. For example, a transform coder disclosed in EP 0 251 028 uses a block length of 1024 samples. Long block lengths have been necessary because shorter blocks degrade transform coder selectivity. Filter selectivity is critical because transform coders with sufficient filter bank selectivity can exploit psychoacoustic masking properties of human hearing to reduce bit-rate requirements without degrading the subjective quality of the coded signal.

Coders using long block lengths suffer from two problems: (1) audible distortion of signals with large transients caused by the temporal spreading of the transient's effects throughout the transform block, and (2) excessive propagation delay of the signal through the encoding and decoding process. In prior art coders, these processing delays are too great for applications such as broadcast audio where a speaker must monitor his own voice. A delay in voice feedback causes serious speech disruption unless the delay is kept very short.

The background art is discussed in more detail in the following Background Summary.

BACKGROUND SUMMARY

There is considerable interest among those in the field of signal processing to discover methods which minimize the amount of information required to represent adequately a given signal. By reducing required information, signals may be transmitted over communication channels with lower bandwidth, or stored in less space. With respect to digital techniques, minimal informational requirements are synonymous with minimal binary bit requirements.

Two factors limit the reduction of bit requirements:

(1) A signal of bandwidth W may be accurately represented by a series of samples taken at a frequency no less than $2 \cdot W$. This is the Nyquist sampling rate. Therefore, a signal T seconds in length with a bandwidth W requires at least $2 \cdot W \cdot T$ number of samples for accurate representation.

(2) Quantization of signal samples which may assume any of a continuous range of values introduces inaccuracies in the representation of the signal which are proportional to the quantizing step size or resolution. These inaccuracies are called quantization errors. These errors are inversely proportional to the number of bits available to represent the signal sample quantization.

If coding techniques are applied to the full bandwidth, all quantizing errors, which manifest themselves as noise, are spread uniformly across the bandwidth. Techniques which may be applied to selected portions of the spectrum can limit the spectral spread of quantizing noise. Two such techniques are subband coding and transform coding. By using these techniques, quantizing errors can be reduced in particular frequency bands where quantizing noise is especially objectionable by quantizing that band with a smaller step size.

Subband coding may be implemented by a bank of digital bandpass filters. Transform coding may be implemented by any of several time-domain to frequency-domain transforms which simulate a bank of digital bandpass filters. Although transforms are easier to implement and require less computational power and hardware than digital filters, they have less design flexibility in the sense that each bandpass filter "frequency bin" represented by a transform coefficient has a uniform bandwidth. By contrast, a bank of digital bandpass filters can be designed to have different subband bandwidths. Transform coefficients can, however, be grouped together to define "subbands" having bandwidths which are multiples of a single transform coefficient bandwidth. The term "subband" is used hereinafter to refer to selected portions of the total signal bandwidth, whether implemented by a subband coder or a transform coder. A subband as implemented by transform coder is defined by a set of one or more adjacent transform coefficients or frequency bins. The bandwidth of a transform coder frequency bin depends upon the coder's sampling rate and the number of samples in each signal sample block (the transform length).

Two characteristics of subband bandpass filters are particularly critical to the performance of highquality music signal processing systems. The first is the bandwidth of the regions between the filter passband and stopbands (the transition bands). The second is the attenuation level in the stopbands. As used herein, the measure of filter "selectivity" is the steepness of the filter response curve within the transition bands (steepness of transition band rolloff), and the level of attenuation in the stopbands (depth of stopband rejection).

These two filter characteristics are critical because the human ear displays frequency-analysis properties resembling those of highly asymmetrical tuned filters having variable center frequencies. The frequency-resolving power of the human ear's tuned filters varies with frequency throughout the audio spectrum. The ear can discern signals closer together in frequency at frequencies below about 500 Hz, but widening as the frequency progresses upward to the limits of audibility. The effective bandwidth of such an auditory filter is referred to as a critical band. An important quality of the critical band is that psychoacoustic-masking effects are most strongly manifested within a critical band—a dominant signal within a critical band can suppress the audibility of other signals anywhere within that critical band. Signals at frequencies outside that critical band are not masked as strongly. See generally, the *Audio Engineering Handbook*, K. Blair Benson ed., McGraw-Hill, San Francisco, 1988, pages 1.40–1.42 and 4.8–4.10.

Psychoacoustic masking is more easily accomplished by subband and transform coders if the subband bandwidth throughout the audible spectrum is about half the critical bandwidth of the human ear in the same portions of the spectrum. This is because the critical bands of the human ear have variable center frequencies that adapt to auditory stimuli, whereas subband and transform coders typically have fixed subband center frequencies. To optimize the opportunity to utilize psychoacoustic-masking effects, any distortion artifacts resulting from the presence of a dominant signal should be limited to the subband containing the dominant signal. If the subband bandwidth is about half or less than half of the critical band (and if the transition band rolloff is sufficiently steep and the stopband rejection is sufficiently deep), the most effective masking of the undesired distortion products is likely to occur even for signals whose frequency is near the edge of the subband passband bandwidth. If the subband bandwidth is more than half a critical band, there is the possibility that the dominant signal will cause the ear's critical band to be offset from the coder's subband so that some of the undesired distortion products outside the ear's critical bandwidth are not masked. These effects are most objectionable at low frequencies where the ear's critical band is narrower.

Transform coding performance depends upon several factors, including the signal sample block length, transform coding errors, and aliasing cancellation.

BLOCK LENGTH

Inasmuch as the transform function must wait for the receipt of all signal samples in the entire block before performing the transform, the fastest theoretical time delay in an encode/decode system is twice the time period of the signal sample block. In practical systems, computation adds further delays such that the actual time delay is likely to be three or four times the time period of the signal sample block. If the encode/decode system must operate in an environment requiring a short propagation delay, a short block length is therefore required.

As block lengths become shorter, transform encoder and decoder performance is adversely affected not only by the consequential widening of the frequency bins, but also by degradation of the response characteristics of the bandpass filter frequency bins: (1) decreased rate of transition band rolloff, and (2) reduced level of stopband rejection. This degradation in filter performance results in the undesired creation of or contribution to transform coefficients in nearby frequency bins in response to a desired signal. These undesired contributions are called sidelobe leakage.

Thus, depending on the sampling rate, a short block length may result in a nominal filter bandwidth exceeding the ear's critical bandwidth at some or all frequencies, particularly low frequencies. Even if the nominal subband bandwidth is narrower than the ear's critical bandwidth, degraded filter characteristics manifested as a broad transition band and/or poor stopband rejection may result in significant signal components outside the ear's critical bandwidth. In such cases, greater constraints are ordinarily placed on other aspects of the system, particularly quantization accuracy.

Another disadvantage resulting from short sample block lengths is the exacerbation of transform coding errors, described in the next section.

TRANSFORM CODING ERRORS

Discrete transforms do not produce a perfectly accurate set of frequency coefficients because they work with only a finite segment of the signal. Strictly speaking, discrete transforms produce a time-frequency representation of the input time-domain signal rather than a true frequency-domain representation which would require infinite transform lengths. For convenience of discussion here, however, the output of discrete transforms will be referred to as a frequency-domain representation. In effect, the discrete transform assumes the sampled signal only has frequency components whose periods are a submultiple of the finite sample interval. This is equivalent to an assumption that the finite-length signal is periodic. The assumption in general is not true. The assumed periodicity creates discontinuities at the edges of the finite time interval which cause the transform to create phantom high-frequency components.

One technique which minimizes this effect is to reduce the discontinuity prior to the transformation by weighting the signal samples such that samples near the edges of the interval are close to zero. Samples at the center of the interval are generally passed unchanged, i.e., weighted by a factor of one. This weighting function is called an "analysis window" and may be of any shape, but certain windows contribute more favorably to subband filter performance.

As used herein, the term "analysis window" refers merely to the windowing function performed prior to application of the forward transform. As will be discussed below, the design of an analysis window used in the invention is constrained by synthesis window design considerations. Therefore, design and performance properties of an "analysis window" as that term is commonly used in the art may differ from such analysis windows as implemented in this invention.

While there is no single criteria which may be used to assess a window's quality, general criteria include steepness of transition band rolloff and depth of stopband rejection. In some applications, the ability to trade steeper rolloff for deeper rejection level is a useful quality.

The analysis window is a time-domain function. If no other compensation is provided, the recovered or "synthesized" signal will be distorted according to the shape of the analysis window. There are several compensation methods. For example:

(a) The recovered signal interval or block may be multiplied by an inverse window, one whose weighting factors are the reciprocal of those for the analysis window. A disadvantage of this technique is that it clearly requires that the analysis window not go to zero at the edges.

(b) Consecutive input signal blocks may be overlapped. By carefully designing the analysis window such that two adjacent windows add to unity across the overlap, the effects of the window will be exactly compensated. (But see the following paragraph.) When used with certain types of transforms such as the Discrete Fourier Transform (DFT), this technique increases the number of bits required to represent the signal since the portion of the signal in the overlap interval must be transformed and transmitted twice. For these types of transforms, it is desirable to design the window with an overlap interval as small as possible.

(c) The synthesized output from the inverse transform may also need to be windowed. Some transforms, including one used in the current invention, require it. Further, quantizing errors may cause the inverse transform to produce a time-domain signal which does not go to zero at the edges of the finite time interval. Left alone, these errors may distort the recovered time-domain signal most strongly within the window overlap interval. A synthesis window can be used to shape each synthesized signal block at its edges. In this case, the signal will be subjected to an analysis and a synthesis window, i.e., the signal will be weighted by the product of the two windows. Therefore, both windows must be designed such that the product of the two will sum to unity across the overlap. See the discussion in the previous paragraph. Short transform sample blocks impose greater compensation requirements on the analysis and synthesis windows. As the transform sample blocks become shorter there is more sidelobe leakage through the filter's transition band and stopband. A well shaped analysis window reduces this leakage.

Sidelobe leakage is undesirable because it causes the transform to create spectral coefficients which misrepresent the frequency of signal components outside the filter's passband. This misrepresentation is a distortion called aliasing.

ALIASING CANCELLATION

The Nyquist theorem holds that a signal may be accurately recovered from discrete samples when the interval between samples is no larger than one-half the period of the signal's highest frequency component. When the sampling rate is below this Nyquist rate, higher-frequency components are misrepresented as lower-frequency components. The lower-frequency component is an "alias" for the true component.

Subband filters and finite digital transforms are not perfect passband filters. The transition between the passband and stopband is not infinitely sharp, and the attenuation of signals in the stopband is not infinitely great. As a result, even if a passband-filtered input signal is sampled at the Nyquist rate suggested by the passband cut-off frequency, frequencies in the transition band above the cutoff frequency will not be faithfully represented.

It is possible to design the analysis and synthesis filters such that aliasing distortion is automatically cancelled by the inverse transform. Quadrature Mirror Filters in the time domain possess this characteristic. Some transform coder techniques, including one used in the present invention, also cancel alias distortion.

Suppressing the audible consequences of aliasing distortion in transform coders becomes more difficult as the sample block length is made shorter. As explained above, shorter sample blocks degrade filter performance: the passband bandwidth increases, the passband-stopband transition becomes less sharp, and the stopband rejection deteriorates. As a result, aliasing becomes more pronounced. If the alias components are coded and decoded with insufficient accuracy, these coding errors prevent the inverse transform from completely cancelling aliasing distortion. The residual aliasing distortion will be audible unless the distortion is psychoacoustically masked. With short sample blocks, however, some transform frequency bins may have a wider passband than the auditory critical bands, particularly at low frequencies where the ear's critical bands have the greatest resolution. Consequently, alias distortion may not be masked. One way to minimize the distortion is to increase quantization accuracy in the problem subbands, but that increases the required bit rate.

BIT-RATE REDUCTION TECHNIQUES

The two factors listed above (Nyquist sample rate and quantizing errors) should dictate the bit-rate requirements for a specified quality of signal transmission or storage. Techniques may be employed, however, to reduce the bit rate required for a given signal quality. These techniques exploit a signal's redundancy and irrelevancy. A signal component is redundant if it can be predicted or otherwise provided by the receiver. A signal component is irrelevant if it is not needed to achieve a specified quality of representation. Several techniques used in the art include:

(1) Prediction: a periodic or predictable characteristic of a signal permits a receiver to anticipate some component based upon current or previous signal characteristics.

(2) Entropy coding: components with a high probability of occurrence may be represented by abbreviated codes. Both the transmitter and receiver must have the same code book. Entropy coding and prediction have the disadvantages that they increase computational complexity and processing delay. Also, they inherently provide a variable rate output, thus requiring buffering if used in a constant bit-rate system.

(3) Nonuniform coding: representations by logarithms or nonuniform quantizing steps allow coding of large signal values with fewer bits at the expense of greater quantizing errors.

(4) Floating point: floating-point representation may reduce bit requirements at the expense of lost precision. Block-floating-point representation uses one scale factor or exponent for a block of floating-point mantissas, and is commonly used in coding time-domain signals. Floating point is a special case of nonuniform coding.

(5) Bit allocation: the receiver's demand for accuracy may vary with time, signal content, strength, or frequency. For example, lower frequency components of speech are usually more important for comprehension and speaker recognition, and therefore should be transmitted with greater accuracy than higher frequency components. Different criteria apply with respect to music signals. Some general bit-allocation criteria are:

(a) Component variance: more bits are allocated to transform coefficients with the greatest level of AC power.

(b) Component value: more bits are allocated to transform coefficients which represent frequency bands with the greatest amplitude or energy.

(c) Psychoacoustic masking: fewer bits are allocated to signal components whose quantizing errors are masked (rendered inaudible) by other signal components. This method is unique to those applications where audible signals are intended for human perception. Masking is understood best with respect to single-tone signals rather than multiple-tone signals and complex waveforms such as music signals.

DISCLOSURE OF INVENTION

It is an object of this invention to provide for the digital processing of wideband audio information, particularly music, using an encode/decode apparatus and method having a signal propagation delay short enough as to be usable for real-time aural feedback to a human operator.

It is a further object of this invention to provide such an encode/decode apparatus and method suitable for the high-quality transmission or storage and reproduction of music, wherein the quality of reproduction is suitable, for example, for broadcast audio links.

It is a further object of the invention to provide a quality of reproduction subjectively as good as that obtainable from Compact Discs.

It is yet a further object of the invention to provide such an encode/decode apparatus and method embodied in a digital processing system having a low bit rate.

It is a further object of the invention to provide such an encode/decode apparatus and method embodied in a digital processing system having a high degree of immunity against signal corruption by transmission paths.

It is yet a further object of the invention to provide such an encode/decode apparatus and method embodied in a digital processing system requiring a small amount of space to store the encoded signal.

Yet a further object of the invention is to provide an encode/decode apparatus and method embodied in a digital processing system employing transform coding having short transform blocks to achieve a short signal propagation delay but which provides the high quality reproduction of music while employing a low bit rate.

Yet another object of this invention is to compensate for the negative effects on transform coder performance resulting from the use of short transform blocks.

Another object of the invention is to provide improved psychoacoustic-masking techniques in a transform coder processing music signals.

It is still another object of the invention to provide techniques for psychoacoustically compensating for otherwise audible distortion artifacts in a transform coder.

Further details of the above objects and still other objects of the invention are set forth throughout this document, particularly in the section describing the Modes for Carrying Out the Invention, below.

In accordance with the teachings of the present invention, an encoder provides for the digital encoding of wideband audio information, the encoder having a short signal propagation delay. The wideband audio signals are sampled and quantized into time-domain sample blocks, the sample blocks having a time period resulting in a signal propagation delay short enough so that an encode/decode system employing the encoder is usable for real-time aural feedback to a human operator. Each sample block is then modulated by an analysis window. Frequency-domain spectral components are then generated in response to the analysis-window weighted time-domain sample block. A transform coder having adaptive bit allocation nonuniformly quantizes each transform coefficient, and those coefficients are assembled into a digital output having a format suitable for storage or transmission. Error correction codes may be used in applications where the transmitted signal is subject to noise or other corrupting effects of the communication path.

Also in accordance with the teachings of the present invention, a decoder provides for the high-quality reproduction of digitally encoded wideband audio signals encoded by the encoder of the invention. The decoder receives the digital output of the encoder via a storage device or transmission path. It derives the nonuniformly coded spectral components from the formatted digital signal and reconstructs the frequency-domain spectral components therefrom. Time-domain signal sample blocks are generated in response to frequency-domain spectral components by means having characteristics inverse to those of the means in the encoder which generated the frequency-domain spectral components. The sample blocks are modulated by a synthesis window. The synthesis window has characteristics such that the product of the synthesis-window response and the response of the analysis-window in the encoder produces a composite response which sums to unity for two adjacent overlapped sample blocks. Adjacent sample blocks are overlapped and added to cancel the weighting effects of the analysis and synthesis windows and recover a digitized representation of the time-domain signal which is then converted to a high-quality analog output.

Further in accordance with the teachings of the present invention, an encoder/decoder system provides for the digital encoding and high-quality reproduction of wideband audio information, the system having a short signal propagation delay. In the encoder portion of the system, the analog wideband audio signals are sampled and quantized into time-domain sample blocks, the sample blocks having a time period resulting in a signal propagation delay short enough so that an encode/decode system employing the encoder is usable for real-time aural feedback to a human operator. Each sample block is then modulated by an analysis window. Frequency-domain spectral components are then generated in response to the analysis-window weighted time-domain sample block. Nonuniform spectral coding, including adaptive bit allocation, quantizes each spectral component, and those components are assembled into a digital format suitable for storage or transmission over communication paths susceptible to signal corrupting noise. The decoder portion of the system receives the digital output of the encoder via a storage device or transmission path. It derives the nonuniformly coded spectral components from the formatted digital signal and reconstructs the frequency-domain spectral components therefrom. Time-domain signal sample blocks are generated in response to frequency-domain transform coefficients by means having characteristics inverse to those of the means in the encoder which generated the frequency-domain transform coefficients. The sample blocks are modulated by a synthesis window. The synthesis window has characteristics such that the product of the synthesis-window response and the response of the analysis-window in the encoder produces a composite response which sums to unity for two adjacent overlapped sample blocks. Adjacent sample blocks are overlapped and added to cancel the weighting effects of the analysis and synthesis windows and recover a digitized representation of the time-domain signal which is then converted to a high-quality analog output.

In an embodiment of the encoder of the present invention, a discrete transform generates frequency-domain spectral components in response to the analysis-window weighted time-domain sample blocks. Preferably, the discrete transform has a function equivalent to the alternate application of a modified Discrete Cosine Transform (DCT) and a modified Discrete Sine Transform (DST). In an alternative embodiment, the discrete transform is implemented by a Discrete Fourier Transform (DFT), however, virtually any time-domain to frequency-domain transform can be used.

In a preferred embodiment of the invention for a two-channel encoder, a single FFT is utilized to simultaneously calculate the forward transform for one signal sample block from each channel. In a preferred embodiment of the invention for a two-channel decoder, a single FFT is utilized to simultaneously calculate the inverse transform for two transform blocks, one from each of the two channels.

In the preferred embodiments of the encoder and decoder, the sampling rate is 44.1 kHz. While the sampling rate is not critical, 44.1 kHz is a suitable sampling rate and it is convenient because it is also the sampling rate used for Compact Discs. An alternative embodiment employs a 48 kHz sampling rate. In the preferred embodiment employing the 44.1 kHz sampling rate, the nominal frequency response extends to 15 kHz and the time-domain sample blocks have a length of 128 samples to provide an acceptably low signal-propagation delay so that the system is usable for providing real-time aural feedback to a human operator (such as for broadcast audio). When a person's own voice is returned to his ears after a delay, speech disturbances are created unless the delay is kept very short. See for example "Effects of Delayed Speech Feedback" by Bernard S. Lee, *Journal of the Acoustical Soc. of America*, vol. 22, no. 6, November 1950, pp. 824–826. The overall encode/decode system is assumed to have a delay of about three times the sample block period or about 10 milliseconds (msec) or less which is sufficiently short to overcome speech disturbance problems. In the preferred embodiment, the serial bit rate of the encoder output is in the order of 192 kBits per second (including overhead information such as error correction codes). Other bit rates yielding varying levels of signal quality may be used without departing from the basic spirit of the invention.

In a preferred embodiment of the encoder, the nonuniform transform coder computes a variable bit-length code word for each transform coefficient, which codeword bit length is the sum of a fixed number of bits and a variable number of bits determined by adaptive bit allocation based on whether, because of current signal content, noise in the subband is less subject to psychoacoustic masking than noise in other subbands. The fixed number of bits are assigned to each subband based on empirical observations regarding psychoacoustic-masking effects of a single-tone signal in the subband under consideration. The assignment of fixed bits takes into consideration the poorer subjective performance of the system at low frequencies due to the greater selectivity of the ear at low frequencies. Although masking performance in the presence of complex signals ordinarily is better than in the presence of single tone signals, masking effects in the presence of complex signals are not as well understood nor are they as predictable. The system is not aggressive in the sense that most of the bits are fixed bits and a relatively few bits are adaptively assigned. This approach has several advantages. First, the fixed bit assignment inherently compensates for the undesired distortion products generated by the inverse transform because the empirical procedure which established the required fixed bit assignments included the inverse transform process. Second, the adaptive bit allocation algorithm can be kept relatively simple. In addition, adaptively-assigned bits are more sensitive to signal transmission errors occurring between the encoder and decoder since such errors can result in incorrect assignment as well as incorrect values for these bits in the decoder.

The empirical technique for allocating bits in accordance with the invention may be better understood by reference to FIG. 13 which shows critical band spectra of the output noise and distortion (e.g., the noise and distortion shown is with respect to auditory critical bands) resulting from a 500 Hz tone (sine wave) for three different bit allocations compared to auditory masking. The Figure is intended to demonstrate an empirical approach rather than any particular data.

Allocation A (the solid line) is a reference, showing the noise and distortion products produced by the 500 Hz sine wave when an arbitrary number of bits are allocated to each of the transform coefficients. Allocation B (the short dashed line) shows the noise and distortion products for the same relative bit allocation as allocation A but with 2 fewer bits per transform coefficient. Allocation C (the long dashed line) is the same as allocation A for frequencies in the lower part of the audio band up to about 1500 Hz. Allocation C is then the same as allocation B for frequencies in the upper part of the audio band above about 1500 Hz. The dotted line shows the auditory masking curve for a 500 Hz tone.

It will be observed that audible noise is present at frequencies below the 500 Hz tone for all three cases of bit allocation due to the rapid fall off of the masking curve: the noise and distortion product curves are above the masking threshold from about 100 Hz to 300 or 400 Hz. The removal of two bits (allocation A to allocation B) exacerbates the audible noise and distortion; adding back the two bits over a portion of the spectrum including the region below the tone, as shown in allocation C, restores the original audible noise and distortion levels. Audible noise is also present at high frequencies, but does not change as substantially when bits are removed and added because at that extreme portion of the audio spectrum the noise and distortion products created by the 500 Hz tone are relatively low.

By observing the noise and distortion created in response to tones at various frequencies for various bit allocations, bit lengths for the various transform coefficients can be allocated that result in acceptable levels of noise and distortion with respect to auditory masking throughout the audio spectrum. With respect to the example in FIG. 13, in order to lower the level of the noise and distortion products below the masking threshold in the region from about 100 Hz to 300 or 400 Hz, additional bits could be added to the reference allocation for the transform coefficient containing the 500 Hz tone and nearby coefficients until the noise and distortion dropped below the masking threshold. Similar steps would be taken for other tones throughout the audio spectrum until the overall transform-coefficient bit-length allocation resulted in acceptably low audible noise in the presence of tones, taken one at a time, throughout the audio spectrum. This is most easily done by way of computer simulations. The fixed bit allocation assignment is then taken as somewhat less by removing one or more bits from each transform coefficient across the spectrum (such as allocation B). Adaptively allocated bits are added to reduce the audible noise to acceptable levels in the problem regions as required (such as allocation C). Thus, empirical observations regarding the increase and decrease of audible noise with respect to bit allocation such as in the example of FIG. 13 form the basis of the fixed and adaptive bit allocation scheme of the present invention.

In a preferred embodiment of the encoder, the nonuniformly quantized transform coefficients are expressed by a block-floating-point representation comprised of block exponents and variable-length code words. As described above, the variable-length code words are further comprised of a fixed bit-length portion and a variable length portion of adaptively assigned bits. For each signal sample block, the encoded signal is assembled into frames composed of exponents and the fixed-length portion of the code words followed by a string of all adaptively allocated bits. The exponents and fixed-length portion of code words are assembled separately from adaptively allocated bits to reduce vulnerability to noise burst errors.

Unlike many coders in the prior art, an encoder conforming to this invention need not transmit side information regarding the assignment of adaptively allocated bits in each frame. The decoder can deduce the correct assignment by applying the same allocation algorithm to the exponents as that used by the encoder.

In applications where frame synchronization is required, the encoder portion of the invention appends the formatted data to frame synchronization bits. The formatted data bits are first randomized to reduce the probability of long sequences of bits with values of all ones or zeroes. This is necessary in many environments such as T−1 carrier which will not tolerate such sequences beyond specified lengths. In asynchronous applications, randomization also reduces the probability that valid data within the frame will be mistaken for the block synchronization sequence. In the decoder portion of the invention, the formatted data bits are recovered by removing the frame synchronization bits and applying an inverse randomization process.

In applications where the encoded signal is subject to corruption, error correction codes are utilized to protect the most critical information, that is, the exponents and fixed portions of the lowest-frequency coefficient code words. Error codes and the protected data are scattered throughout the formatted frame to reduce sensitivity to noise burst errors, i.e., to increase the length of a noise burst required before critical data cannot be corrected.

The various features of the invention and its preferred embodiments are set forth in greater detail in a following section describing the Modes for Carrying Out the Invention and in the accompanying drawings.

BRIEF DESCRIPTION OF DRAWINGS

FIGS. 1a and 1b are functional block diagrams illustrating the basic structure of the invention, particularly for the TDAC transform version of the invention.

FIGS. 2a through 2e are block diagrams showing the hardware architecture for one embodiment of the invention, particularly for the TDAC transform version of the invention.

FIGS. 3a and 3b are block diagrams showing in greater detail the serial-communications interface of the processor for a two-channel embodiment of the invention.

FIG. 4 is a hypothetical graphical representation showing a time-domain signal sample block.

FIG. 5 is a further hypothetical graphical representation of a time-domain signal sample block showing discontinuities at the edges of the sample block caused by a discrete transform assuming the signal within the block is periodic.

FIG. 6a is a functional block diagram showing the modulation of a function X(t) by a function W(t) to provide the resulting function Y(t).

FIGS. 6b through 6d are further hypothetical graphical representations showing the modulation of a time-domain signal sample block by an analysis window.

FIG. 7 is a flow chart showing the high level logic for the nonuniform quantizer utilized in the invention.

FIG. 8 is a flow chart showing more detailed logic for the adaptive bit allocation process utilized in the invention.

FIG. 9 is a graphical representation showing a representative TDAC coder filter characteristic response curve and two psychoacoustic masking curves.

FIG. 10 is a graphical representation showing a TDAC coder filter characteristic response with respect to a 4 kHz psychoacoustic masking curve.

FIG. 11 is a graphical representation showing a TDAC coder filter characteristic response with respect to a 1 kHz psychoacoustic masking curve.

FIG. 12 is a graphical representation illustrating a composite masking curve derived from the psychoacoustic masking curves of several tones.

FIG. 13 is a graphical representation showing the spectral levels of coding noise and distortion of an encoded 500 Hz tone for three different bit allocation schemes with respect to the psychoacoustic masking curve for a 500 Hz tone.

FIGS. 14a through 14e are hypothetical graphical representations illustrating a time-domain signal grouped into a series of overlapped and windowed time-domain signal sample blocks.

FIGS. 15a through 15d are hypothetical graphical representations illustrating the time-domain aliasing distortion created by the TDAC transform.

FIGS. 16a through 16g are hypothetical graphical representations illustrating the cancellation of time-domain aliasing by overlap-add during TDAC transform signal synthesis.

FIG. 17 is a graphical representation comparing filter transition band rolloff and stopband rejection of a filter bank using an analysis-only window with that of a filter bank using the analysis window of an analysis-synthesis window pair designed for the preferred TDAC transform embodiment of the invention.

FIG. 18 is a hypothetical graphical representation showing the overlap-add property of adjacent windowed blocks.

FIG. 19 is a hypothetical graphical representation comparing the shape of several convolved Kaiser-Bessel analysis windows for a range of alpha values 4 to 7 with a sine-tapered window.

FIG. 20 is a schematic representation illustrating the format of a frame of two encoded transform blocks without error correction, particularly for the TDAC transform version of the invention.

FIG. 21 is a schematic representation illustrating the format of a frame of two encoded transform blocks with error correction codes, particularly for the TDAC transform version of the invention.

FIGS. 22a and 22b are functional block diagrams illustrating the basic structure of the invention, particularly for the DFT version of the invention.

FIG. 23 is a graphical representation comparing the shapes of two coder analysis windows for the TDAC transform and DFT coders.

FIG. 24 is a graphical representation comparing the characteristic filter response of a TDAC transform coder using windows with 100% overlap to the response of a DFT coder using windows with 25% overlap.

FIG. 25 is a schematic representation illustrating the format of a frame of two encoded transform blocks without error correction, particularly for the DFT version of the invention.

FIG. 26 is a schematic representation illustrating the format of a frame of two encoded transform blocks with error correction codes, particularly for the DFT version of the invention.

Table I shows master exponents, subband grouping, and coefficient bit lengths for the TDAC transform coder.

Table II shows subband grouping and coefficient bit lengths for the DFT coder.

MODES FOR CARRYING OUT THE INVENTION

I. PREFERRED IMPLEMENTATION OF INVENTION

FIGS. 1a and 1b show the basic structure of the invention. The coder portion of the invention shown in FIG. 1a comprises time-domain signal input 100, signal sampler and quantizer 101, signal sample buffer 102, analysis-window multiplier 103 which modulates each digitized time-domain signal block, digital filter bank 104 which transforms the quantized signal into frequency coefficients, block-floating-point encoder 105 which converts each integer-valued transform coefficient into a floating-point representation, adaptive bit allocator 106 which assigns bits to the representation of each transform coefficient according to the total signal's spectral composition, uniform quantizer 107 which rounds each transform coefficient to an assigned bit length, and formatter 109 which assembles the coded frequency coefficients into a bit stream for transmission or storage. FIG. 1a depicts a transmission path 110, however, it should be understood that the encoded signal may be stored immediately for later use.

The decoder portion of the invention shown in FIG. 1b comprises encoded bit-stream signal input 111, deformatter 112 which extracts each encoded frequency coefficient from the assembled bit stream, linearizer 113 which converts each encoded coefficient into an integer-valued transform coefficient, inverse digital filter bank 114 which transforms the transform coefficients into a time-domain signal block, synthesis-window multiplier 115 which modulates the time-domain signal block, signal block overlap-adder 116 which recovers a digitized representation of the time-domain signal, analog signal generator 117, and analog signal output 118.

Any one of several discrete digital transforms may be used to implement the forward and inverse filter banks. The transform used in the preferred embodiment of the invention was first described in Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153-1161. This technique is the time-domain equivalent of a critically sampled single-sideband analysis-synthesis system. This transform is referred to herein as Time-Domain Aliasing Cancellation (TDAC). The Discrete Fourier Transform (DFT) may be used in another embodiment of the invention. The preferred embodiment for the DFT version is discussed after the TDAC version has been fully described.

A. Processing Hardware

The basic hardware architecture for the TDAC transform version of the invention is illustrated in FIGS. 2a and 2b. Empirical studies have shown that, unless special measures are taken, transform computations must be performed to an accuracy of at least 20 significant bits to achieve stated performance objectives. One special measure permitting implementation of a coder utilizing 16-bit arithmetic is described later as part of the DFT embodiment.

A practical implementation of a preferred embodiment of a single-channel version of the invention, employing either a 44.1 kHz or a 48 kHz sample rate, utilizes a 16-bit analog-to-digital converter (ADC) with a cycle time of no more than 20 microseconds to quantize the input time-domain signal. Each 16-bit digitized sample is used to form the 16 most-significant bits of a 24-bit word which is used in subsequent computations. A Motorola DSP56001 24-bit digital-signal processor (DSP) operating at 20.5 MHz with no wait states is used to perform the required computations and to control the encode and decode processes. Static random access memory (RAM) provides program and data memory for the DSP. A 16-bit digital-to-analog converter (DAC) with a cycle time of no more than 20 microseconds is used to generate an analog signal from the decoded digital signal.

The encoder hardware architecture, shown in FIG. 2a, is comprised of analog signal input 200, low-pass filter (LPF) 200A, ADC 201, DSP 202, static RAM 203, erasable programmable read-only memory (EPROM) 204, programmable array logic (PAL) 205, and encoded serial-signal output 206. LPF 200A (a low-pass filter which is not shown in FIG. 1a) insures the input signal is bandwidth limited. ADC 201 digitizes (samples and quantizes) the incoming signal into a serial stream of 16-bit words. DSP 202 receives and buffers the serial stream of digitized samples, groups the samples into blocks, performs the calculations required to transform the blocks into the frequency domain, encodes the transform coefficients, formats the code words into a data stream, and transmits the encoded signal through serial data path 206. The programming and data work areas for the DSP are stored in one 24 kilobyte (KB) bank of static RAM 203 which is organized into 8,192 24-bit words. The DSP requires fast-access-time program memory which can be implemented more cheaply in RAM than it can be in programmable ROM. Consequently, EPROM 204 stores programming and static data in a compressed format which the DSP unpacks into a usable form into RAM 203 when the encoder is first powered on. PAL 205 allows the encoder to store program and data into a single 24 KB bank of RAM by translating program and data addresses generated by DSP 202 into specific address segments of RAM bank 203.

FIGS. 2b and 2c provide more detail on two DSP interfaces. FIG. 2b shows the serial-communication interface for DSP 202, ADC 201, and serial data path 206. Timing generator 202A generates the receive clock, frame-synchronization, and transmit clock signals for the encoder. Line SC0 clocks a serial-bit stream of digitized input signal samples along line SRD from ADC 201 into DSP 202. Line SC1 provides the frame-synchronization signal to the ADC and the DSP which marks the beginning of each 16-bit word. Line SCK clocks a serial-bit stream of the encoded signal along line STD from the DSP to serial data path 206.

FIG. 2c shows the memory addressing interface. PAL 205 translates addresses put on address bus 205A by DSP 202, and passes the translated addresses to bus 205B which connects to RAM 203 and EPROM 204. Memory for the Motorola DSP56001 is divided into three segments: program, X data, and Y data. The memory translation provided by PAL 205 permits these three segments to be mapped into one 24 KB bank of RAM. The actual addresses for each of these segments is determined by size and design of the encoder/decoder software. In one embodiment, 4 K words (4096 or $1000_{16}$ 24-bit words) of program memory are mapped into addresses $0000\text{-}0FFF_{16}$, 2 K words ($800_{16}$ of 24-bit words) of X data memory are mapped into addresses $1000_{16}\text{-}17FF_{16}$, and 2 K words of Y data memory are mapped into addresses $1800_{16}\text{-}1FFF_{16}$.

RAM 203 and EPROM 204 are mapped into separate address spaces. Inverter 205C allows DSP 202 to select either RAM or EPROM according the state of address line A15. When DSP 202 sets A15 high, inverter 205C sets the chip-select (CS) lines of RAM 203 and EPROM 204 low. Only EPROM 204 is selected when CS is low. When DSP 202 sets A15 low, inverter 205C sets the CS lines of RAM 203 and EPROM 204 high. Only static RAM 203 is selected when CS is high.

The decoder hardware architecture, shown in FIG. 2d, is comprised of encoded serial-signal input path 207, DSP 208, static RAM 209, EPROM 210, PAL 211, DAC 212, LPF 213A, and analog signal output 213. DSP 208 receives and buffers the encoded signal, deformats the signal into the encoded transform coefficients, performs the calculations required to transform the coefficients into the time domain, groups the coefficients into time-domain blocks, overlap-adds the blocks into a time-domain sequence of digital samples, and transmits the digital samples in a serial-bit stream to DAC 212. The programming and data work areas for the DSP are stored in one 24 KB bank of static RAM 209 which is organized into 8,192,24-bit words. EPROM 210 stores in a compressed format programming and static data which the DSP unpacks into usable form into RAM 209 when the decoder is first powered on. PAL 211 allows the decoder to store program and data into a single 24 KB bank of RAM by translating program and data addresses generated by DSP 208 into specific address segments of RAM bank 209. DAC 212 generates an analog signal corresponding to the serial-data stream received from the DSP. LPF 213A (a low-pass filter which is not shown in FIG. 1b) insures signal output 213 is free of any spurious high-frequency components created by the encode/decode process.

FIG. 2e shows the serial-communication interface for DSP 208, serial-signal input path 207, and DAC 212. Timing generator 208A, using a phase-locked loop circuit to extract a timing reference from the encoded serial-bit input signal, generates the receive clock, frame-synchronization, and transmit clock signals for the decoder. Line SCO clocks the encoded serial-bit signal along line SRD into DSP 208. Line SCK clocks a serial-bit stream of the decoded digitized signal samples along line STD from DSP 208 to DAC 212. Line SC2 provides a frame-synchronization signal to the DAC and to the DSP which marks the beginning of each 16-bit word. The interface between DSP 208 and the memory-address bus is implemented in the same manner as that described above for the encoder. See FIG. 2c.

A two-channel encoder requires LPF 200A and 200B, and ADC 201A and 201B, connected as shown in FIG. 3a. The interface between the DSP and ADC components operates in a manner similar to that described above for a one-channel encoder. Timing generator 202A provides an additional signal to line SC2 of the DSP at one-half the rate of the frame-synchronization signal to control multiplexer 202B and indicate to the DSP which of the two ADC is currently sending digitized data.

A two-channel decoder requires DAC 212A and 212B, and LPF 213A and 213B, connected as shown in FIG. 3b. The interface between the DSP and DAC components operates in a manner similar to that described above for a one-channel decoder. Timing generator 208A provides an additional signal to line SC1 of the DSP at one-half the rate of the frame-synchronization signal to control demultiplexer 208B and indicate to the DSP which of the two DAC is currently receiving digital data.

The basic hardware architecture may be modified. For example, one Motorola DSP56001 operating at 27 MHz with no wait states can implement a two-channel encoder or decoder. Additional RAM is required. One 24 KB bank is utilized for program memory. A second 24 KB bank is utilized for X data and Y data memory. No PAL is required for address translation when two banks of RAM are used.

Further, specialized hardware may be used to perform certain functions such such as window modulation or the Fast Fourier Transform (FFT). The entire encoder/decoder may be implemented in a custom-designed integrated circuit. Many other possible implementations will be obvious to one skilled in the art.

B. Input Signal Sampling and Windowing

In the TDAC embodiment of the invention, signal sampler and quantizer 101 is an analog-to-digital converter which quantizes the input signal into 16 bits which are subsequently padded on the right with 8 zero bits to form a 24-bit integer representation. All subsequent transform calculations are performed in 24-bit integer arithmetic. The analog input signal should be limited in bandwidth to at most 15 kHz (20 kHz for a 20 kHz bandwidth coder). This may be accomplished by a low-pass filter not shown in FIG. 1a.

As discussed above, the length of the signal sample block created by signal sampling and quantizing means 101 is of critical importance. The length must be chosen to balance signal propagation delay with digital filter performance. The forward transform (digital filter bank 104) must wait for all of the block's samples before all transform coefficients may be calculated. A similar delay is experienced by the inverse transform (digital filter bank 114), waiting for all coefficients before the time-domain signal may be recovered. As a result, assuming both forward and inverse transforms may be performed in a period of time equal in magnitude to the block interval, the delay for a signal passing through the invention is three times the block length. Because the desired overall delay is no greater than approximately 10 milliseconds, the block length should not exceed 3.3 milliseconds.

It is desirable, however, to use as long a block as possible because shorter block lengths reduce the filter bandwidth and adversely affect the transition band rolloff and depth of stopband rejection. Therefore, the chosen block length should be as long as possible, subject to the 3.3 millisecond limitation discussed in the previous paragraph.

A music signal with at least Compact Disc (CD) quality has, in addition to other qualities, a bandwidth in excess of 15 kHz. From the Nyquist theorem, it is known that a 15 kHz bandwidth signal must be sampled at no less than 30 Khz. A sample rate of 44.1 Khz is chosen for the current embodiment of the invention because this rate is used in CD applications and such a choice simplifies the means necessary to use this invention in such applications. (This sample rate also supports an alternative 20 kHz bandwidth embodiment of the invention). Given this sampling rate, a 3.3 millisecond block comprises 147 samples. Digital filter transform calculations are simplified, however, if the number of samples is a power of two. Consequently, the number of samples per block is reduced to 128 which establishes the block length at 2.9 milliseconds.

Other sampling rates, such as 48 kHz which is a rate common to many professional audio applications, may be utilized. If an alternate rate is chosen, the frequency separation between adjacent transform coefficients will be altered and the number of coefficients required to represent the desired signal bandwidth will change. The full effect that a change in sampling rate will have upon the implementation of the invention will be apparent to one skilled in the art.

Assuming the input signal is not a complex one, i.e., all imaginary components are zero, a frequency-domain transform of a 128 sample block produces at most 64 unique nonzero transform coefficients. Hence, the invention shown in FIGS. 1a and 1b is comprised of 64 frequency bits. In this implementation, the bandwidth of each bin is equal to 344.5 Hz (or 44.1 kHz/128). (For some discrete transforms such as TDAC, bin 0, the DC or zero frequency component, has a bandwidth equal to half of this amount.) Only coefficients 0-45 are used to pass a 15.7 kHz signal. (Coefficients 0-62 are used in a 20 kHz version to pass a 21.5 kHz signal.) The additional high-frequency coefficients above the input signal bandwidth are used to minimize the adverse effects of quantizing errors upon aliasing cancellation within the design bandwidth. Note that it is assumed the input signal is band-limited to 15 kHz (or 20 kHz) and the final output signal is also band-limited to reject any aliasing passed in the highest coefficients.

Unless the sample block is modified, a discrete transform will erroneously create nonexistent spectral components because the transform assumes the signal in the block is periodic. See FIG. 4. These transform errors are caused by discontinuities at the edges of the block as shown in FIG. 5. These discontinuities may be smoothed to minimize this effect. FIGS. 6a through 6d illustrate how a block is modified or weighted such that the samples near the block edges are close to zero. The multiplier circuit shown in FIG. 6a modulates the sampled input signal x(t) shown in FIG. 6b by the weighting function shown in FIG. 6c. The resultant signal is shown in FIG. 6d. This process is represented by box 103 in FIG. 1a. This weighting function, called an analysis window, is a sample-by-sample multiplication of the signal sample block, and has been the subject of considerable study because its shape has profound affects upon digital filter performance. See, for example, Harris, "On the Use of Windows for Harmonic Analysis with the Discrete Fourier Transform," *Proc. IEEE*, vol. 66, 1978, pp. 51-83. Briefly, a good window increases the steepness of transition band rolloff for a given level of depth of stopband rejection, and permits correction of its modulation effects by overlapping and adding adjacent blocks. Window design is discussed below in more detail.

C. Analysis Filter Bank—Forward Transform

A discrete transform implements digital filter bank 104 shown in FIG. 1a. Filtering is performed by converting the time-domain signal sample blocks into a set of time varying spectral coefficients. The transform technique used in one embodiment of the invention is Time-Domain Aliasing Cancellation (TDAC).

TDAC utilizes a transform function which is equivalent to the alternate application of a modified Discrete Cosine Transform (DCT) with a modified Discrete Sine Transform (DST). The DCT, shown in equation 1, and the DST, shown in equation 2, are $$C(k) = \sum_{n=0}^{N-1} x(n) \cdot \cos\left[2\pi k \left(\frac{n+m}{N}\right)\right] \quad (1)$$

for $0 \leq k < N$ $$S(k) = \sum_{n=0}^{N-1} x(n) \cdot \sin\left[2\pi k \left(\frac{n+m}{N}\right)\right] \quad (2)$$

for $0 \leq k < N$ where
k = frequency coefficient number,
n = input signal sample number,
N = sample block length,
m = phase term for TDAC,
x(n) = quantized value of input signal x(t) at sample n,
C(k) = DCT coefficient k, and
S(k) = DST coefficient k.

The TDAC transform alternately produces one of two sets of spectral coefficients or transform blocks for each signal sample block. These transform blocks are of the form $$\{C(k)\}_i = \begin{bmatrix} C(k) & \text{for } 0 \leq k < N/2 \\ 0 & \text{for } k = N/2 \end{bmatrix} \quad (3)$$

$$\{S(k)\}_i = \begin{bmatrix} S(k) & \text{for } 1 \leq k < N/2 \\ 0 & \text{for } k = 0 \end{bmatrix} \quad (4)$$

where
i = signal sample block number,
C(k) = DCT coefficient (see equation 1), and
S(k) = DST coefficient (see equation 2).

The computation algorithm used is the Fast Fourier Transform (FFT). See Cooley and Turkey, "An Algorithm for the Machine Calculation of Complex Fourier Series," *Math. Comput.*, vol. 19, 1965, pp. 297-301. A single FFT can be used to perform the DCT and DST simultaneously by defining them respectively as the real and imaginary components of a single complex transform. This technique exploits the fact the FFT is a complex transform, yet both input signal sample blocks consist only of real-valued samples. By factoring these transforms into the product of one FFT and an array of complex constants, the DCT coefficients emerge from the transform as the set of real values and the DST coefficients are represented by the set of imaginary values. Therefore the DCT of one signal sample block can be concurrently calculated with the DST of another signal sample block by only one FFT followed by array multiplication and additions.

The basic technique of using one FFT to concurrently calculate two transforms is well known in the art and is described in Brigham, *The Fast Fourier Transform*, Englewood Cliffs, N.J.: Prentice-Hall, Inc., 1974. Additional information regarding the concurrent calculation of the modified DCT and DST for the TDAC transform may be found in Lookabaugh, "Variable Rate and Adaptive Frequency Domain Vector Quantization of Speech," Stanford, Calif.: Stanford University, PhD Thesis, June, 1988.

This concurrent process is especially useful in two-channel applications where a transform block is generated concurrently for each channel, a DCT block for one channel and a DST block for the other channel. The coded blocks for a given channel alternate between the DCT and DST (see expression 5), and are always of the opposite type from that of the other channel's blocks. A pair of blocks, one for each channel, are transformed and formatted together.

Princen showed that with the proper phase component m (see equation 6) and a carefully designed pair of analysis-synthesis windows, the TDAC technique can accurately recover an input signal from an alternating sequence of cosine and sine transform blocks of the form $$\{C(k)\}_0, \{S(k)\}_1, \{C(k)\}_2, \{S(k)\}_3, \quad (5)$$

where each transform block represents one time-domain signal sample block. This process is shown in FIGS. 14a–14e, 15a–15d, and 16a–16g.

Referring to FIG. 14a, it may be seen that quantized input signal x(t) is grouped into blocks. One set of blocks, modulated by the window function $W_c$ shown in FIG. 14b, produces signal $x_c(t)$ shown in FIG. 14d. Signal $x_c(t)$ is input to the DCT. Another set of blocks of the sampled input signal x(t), which overlap the first set by one-half block length, are windowed by window function $W_s$ shown in FIG. 14c (which window function is identical to $W_c$ but shifted in time by one-half block length) producing signal $x_s(t)$ shown in FIG. 14e and subsequently passed to the DST.

Using only the alternate DCT and DST transform blocks results in a loss of the information contained in the discarded half of the transform blocks. This loss produces a time-domain aliasing component, but the distortion may be cancelled by choosing the appropriate phase term m for equations 1 and 2, applying the forward transform to overlapped time-domain signal sample blocks, and by overlapping and adding adjacent time-domain signal sample blocks recovered by the inverse transform.

The phase term m in equations 1 and 2 controls the phase shift of the time-domain aliasing distortion. FIGS. 15a–15d and 16a–16g illustrate this distortion. Signal $y_c(t)$, recovered from the inverse DCT, is shown in FIG. 15a. FIG. 15b illustrates that the recovered signal is composed of two components: the original windowed signal (solid line), and time-domain aliasing distortion (dotted line). FIGS. 15c and 15d illustrate similar information for signal $y_s(t)$ recovered from the inverse DST. To cancel this alias distortion and accurately recover the original time-domain signal, TDAC requires the aliasing to be as follows. For the DCT, the time-domain alias component consists of the first half of the sampled signal reversed in time about the one-quarter point of the sample block, and the second half of the sampled signal reversed in time about the three-quarter point of the sample block. For the DST, the alias component is similar to that for the DCT except its amplitude is inverted in sign. See FIGS. 15b and 15d. The phase term required for alias cancellation is $$m = \frac{(N/2 + 1)}{2} \quad (6)$$

where
N=sample block length.

TDAC also requires application of a pair of carefully designed analysis-synthesis windows to overlapped signal sample blocks. The signal sample blocks must have a 100% overlap, i.e., 50% of a given block is overlapped by the previous block, and 50% of the same block is overlapped by the following block. FIGS. 16a–16g illustrate the overlapping of signal sample blocks and the resulting cancellation of alias distortion. Signals $y_c(t)$ and $y_s(t)$ shown in FIG. 16a and 16d, recovered from the inverse DCT and DST, are modulated by window functions $W_c(t)$ and $W_s(t)$ respectively, shown in FIGS. 16b and 16e, to produce signals $y_c(t)$ and $y_s(t)$ shown in FIGS. 16c and 16f. When the overlapped blocks of these windowed signals are added, the alias components are cancelled and the resulting signal y(t) shown in FIG. 16g is an accurate reconstruction of the original input signal x(t).

Window design and overlap-add used during the synthesis process is discussed below in more detail. It is sufficient at this point to notice that omitting half the transform blocks halves the required bit rate, but the 100% window overlap required for TDAC during signal synthesis doubles the required bit rate. Consequently, TDAC has a neutral effect upon the required bit rate.

D. Nonuniform Quantization

Each transform coefficient derived from filter bank 104 is encoded and grouped into subbands by nonuniform quantizer 108. (Table I shows the assignment of transform coefficients to subbands.) The nonuniform quantizer is composed of block-floating-point encoder 105, adaptive bit allocator 106, and uniform quantizer 107 shown in FIG. 1a. As depicted in FIG. 7, nonuniform quantization is comprised of five major sections: (1) calculating subband exponents, (2) determining the master exponents, (3) initially setting the bit length of each coefficient code word as a function of the coefficient's frequency, (4) adaptively allocating additional bits to specific code words, and (5) rounding and truncating the code word according to the bit length computed from the sum of the adaptive bit allocations and the minimum bit length based on the coefficient's frequency.

Floating-point representation of numerical quantities is well known in the art of digital data processing and is used to represent a wider range of values with fewer bits than is possible with integer representation. A floating-point number is composed of a mantissa and an exponent. In a preferred embodiment of the invention, the mantissa is a signed integer-valued expression expressed in two's complement form. The corresponding exponent is an unsigned value equal to the power of two of the multiplier required to convert the mantissa (either normalized or unnormalized) into the true value of the represented numerical quantity. This representation can be expressed as $$F = M \cdot 2^{-E} \qquad (7)$$

where
F = the value of the floating-point number,
M = the signed integer-valued mantissa, and
E = unsigned integer-valued exponent.

For example, an exponent of three indicates the true value of the floating-point number is obtained by multiplying the integer-valued mantissa by $2^{-3}$. This is equivalent to shifting a binary representation of the mantissa three places to the right.

A positive nonzero mantissa is said to be normalized when its most significant data bit is nonzero. A negative-valued mantissa is normalized when its most significant data bit is zero. A normalized mantissa insures the greatest number of significant bits for the numerical quantity is contained within the mantissa's limited bit length.

Block-floating-point representation is also well known in the art and is used to represent a set of floating-point numbers with fewer bits than is possible with conventional floating-point representation. This technique uses one exponent for a group of mantissas. Some mantissas in the group may not be normalized. The mantissa for the quantity with the largest magnitude in the group will be normalized provided it is not too small, i.e., the exponent is incapable of expressing the multiplier required for normalization. Whether the mantissas are normalized or not, however, the exponent always represents the number of times each integer-valued mantissa in the group must be shifted to the right to obtain the true value of the floating-point quantity.

1. Subband Exponents

The block-floating-point encoder comprises sections one and two of the nonuniform quantizer. The functions performed by the first section are shown in box 701 of FIG. 7. This section calculates the subband exponents for each of several subband frequency coefficients. The subbands are shown in Table I. The procedure is comprised of three steps. The first step finds the largest transform coefficient in each subband. The second step determines the number of left shifts required to normalize these largest 24-bit coefficients. The third step saves these quantities as the exponent for the corresponding subband.

2. Master Exponent

The second section of the nonuniform quantizer determines the value of a one-bit master exponent for each of two subband groups. The master exponent is used to expand the dynamic range of the coder. Referring to Table I, it may be seen that master exponent MEXP0 represents the low frequency subbands zero through six. Master exponent MEXP1 represents high frequency subbands seven through eighteen. (For a 20 kHz coder, two additional subbands are required as shown in Table I.) If all subband exponents in a group are three or greater, the master exponent for that group is set to one and all subband exponents in that group are reduced by three. When a master exponent is set to one, it indicates that all coded coefficients within all subbands in the group are shifted to the left three more times than is indicated by the subband exponent values. When a master exponent is zero, each subband exponent in the group correctly represents the total left shifts for each transform coefficient in the subband. These master exponents permit using shorter subband exponents while allowing for a sufficient dynamic range. This step in the process is shown in boxes 702a and 702b of FIG. 7.

An additional step can be taken which may reduce the total bits required to represent the coded signal. In all subbands where an exponent represents a single coefficient, the sign bit of a normalized mantissa is superfluous. As discussed above, the sign bit and the most significant data bit in a normalized mantissa are always of opposite value. The sign bit can therefore be dropped by the encoder and restored by the decoder. The dropped sign bit is referred to herein as a "hidden bit."

Whether a mantissa is normalized can be determined by examining the exponent. If the exponent is less than its maximum value (which is 15 after adjusting for the master exponent in the floating point scheme used in the preferred embodiment of the invention), the mantissa is normalized. If the exponent is equal to its maximum value, no conclusion can be drawn, therefore it is assumed the mantissa is not normalized and there is no hidden bit.

This technique can be used only for those mantissa representing transform coefficients in subbands containing only one coefficient. Assuming such coefficients will usually be normalized, the reduction in bit requirements is realized by reducing the fixed or minimum bit length for the coefficients, as shown in Table I. If a transform coefficient happens to be unnormalized, the reduced bit length is not likely to created audible quantization noise because the frequency component will be of very low amplitude.

3. Fixed-Bit Length

The third section of the nonuniform quantizer sets an initial minimum bit length for the representation of each left-shifted transform coefficient. This length is set according to the coefficient's frequency. Box 703 in FIG. 7 represents this section of the process and Table I shows the minimum number of bits fixed for each coefficient's code word. The minimum bit length was derived by comparing a representative filter bank response curve to a psychoacoustic masking threshold curve. Because filter performance is a function only of the difference in frequency between a signal and the coefficient's frequency, any frequency coefficient may be used to represent the filter bank's response. The response curve shown in FIG. 9 is obtained from the root mean square average of the filter's response to a range of frequencies within the filter passband. As discussed above, filter selectivity is affected by the shape of the analysis window and the number of samples in each time-domain signal block. It may be noted here that the overall coder characteristic response is not as good as that shown in FIG. 9 because an additional selectivity loss occurs during the signal synthesis process. This effect is discussed below and is also shown in FIG. 17.

Two psychoacoustic masking curves are shown in FIG. 9. These curves were derived from Fielder, "Evaluation of the Audible Distortion and Noise Produced by Digital-Audio Converters," *J. Audio Eng. Soc.*, vol. 35, 1988, pp. 517-534. Auditory selectivity of the human ear varies greatly with frequency, however, the 1 kHz curve is representative of ear characteristics for frequencies between 500 Hz and 2 kHz, and the 4 kHz curve is representative of the ear's response to higher frequencies. The rate of transition band rolloff and depth of stopband rejection for a transform coder must be as great as that for the psychoacoustic masking curve to achieve the lowest bit rates. In particular, note that ear selectivity for frequencies below a 1 kHz masking tone is very high. Other transform coders in the art have achieved the required subband bandwidth and selectivity by using time-domain block lengths of at least 512 samples. For example, see Brandenburg, "OCF—A New Coding Algorithm for High Quality Sound Signals," *IEEE Int. Conf. on Acoust., Speech, and Signal Proc.,* 1987, pp. 141–144.

Because of time delay constraints discussed above, this invention uses a 128 sample block and must overcome undesirably wide subband bandwidth and degraded filter selectivity in other ways. This is accomplished in part by reserving additional bits for all coded frequency coefficients below 4 kHz. FIG. 10 compares the filter response against the 4 kHz psychoacoustic masking curve. Because coder bandwidth and selectivity improve relative to the psychoacoustic masking curve as frequency increases, fewer bits are required to represent higher frequency transform coefficients above 4 kHz. This relationship is reflected in the minimum bit length values as shown in Table I.

FIG. 11 compares the 1 kHz masking curve against the filter response curve which is offset such that the psychoacoustic masking curve is always higher. The offset for the filter response is due to the increased accuracy afforded by additional bits reserved for the lower-frequency coefficients. Each additional bit improves the signal-to-noise ratio approximately 6 db. The graph in FIG. 11 indicates an offset of 42 db (or approximately 7 additional bits of accuracy) may be necessary to encode a low-frequency transform coefficient if no other tones are present to contribute to the masking effect.

The minimum lengths suggested by the masking curves shown in FIGS. 9, 10, and 11 are conservative, however, because the curves shown in these figures represent the psychoacoustic masking effect produced by a single tone or a very narrow band of noise. FIG. 12 shows a composite masking curve derived from a simple overlay of the individual masking curves of three tones. Empirical evidence indicates that even this composite curve is very conservative, understanding the actual masking effect of multiple tones. Furthermore, music is generally a more complex signal than a few discrete frequencies, and the resulting increase in masking levels permits a reduction in the required accuracy of transform coefficient code words. Consequently, the minimum bit lengths shown in Table I are obtained by deducting two bits from the bit length of each coefficient code word suggested by the masking curves in FIGS. 10 and 11. Adaptive-bit allocation provides additional bits where needed for increased accuracy of specific coefficients.

4. Adaptive Bit Allocation a. Overview

The fourth section of the nonuniform quantizer performs the adaptive bit allocation. Box 704 in FIG. 7 provides an overview of this allocation process. In general, for each transform block, bit allocation assigns a fixed number of additional bits to specific coefficients in four phases. The number of bits may be chosen to balance signal coding quality and transmission bit rate. The preferred embodiment of the present invention sets the allocation at thirty-four bits. This limit is referred to herein as the allocation maximum or as the number of allocatable bits.

The current implementation assigns a maximum of 4 bits per coefficient. This maximum represents a design compromise between coding accuracy and total bit rate. It will be realized by one skilled in the art that this maximum and the total number of adaptively allocatable bits may be altered without changing the concept or basic purpose of the invention.

Phase zero is an initialization process for the remaining phases. Phase one assigns bits, up to a maximum of four per transform coefficient, to the coefficients within the same critical band of those frequency components with the greatest spectral energy. If all allocatable bits are assigned during phase one, the allocation process stops. If not, phase two allocates additional bits to the transform coefficients which were allocated bits during phase one such that the total adaptively allocated bits for each coefficient is four. If all allocatable bits are assigned during phase two, the allocation process stops. If any bits remain, phase three allocates bits to those coefficients which are adjacent to coefficients that were allocated bits during phase one and two. A more detailed conceptual description of this procedure is provided in the following paragraphs. The actual logic implementation of the procedure is discussed later.

FIG. 8 is a diagram of the conceptual process used to adaptively allocate bits to specific transform coefficients. The initialization steps of phase zero are shown in box 800. The first step initializes the elements of an array A( ) to zero. The next step identifies the smallest subband exponent, which is the exponent for the subband with the largest spectral component, and saves the value as $X_{MIN}$. All subband exponents are subtracted from $X_{MIN}$ and the difference is stored in array M( ). Note that the smallest possible subband exponent is zero and the largest possible subband exponent is eighteen, which is the sum of a maximum value of fifteen for a 4-bit high frequency subband exponent plus the value of three for the master exponent MEXP1. See Table I. Therefore, the range of possible values in array M( ) is negative eighteen to zero. In the next step, four is added to each element of array M( ) and all elements below zero are set to zero. At the end of phase zero, array M( ) consists of a set of elements, one for each subband, whose values range from zero to four. The elements with a value of four represent those subbands where at least one of the coefficients in the subband has one of the largest spectral coefficients in the total signal.

Phase one constructs another array A( ), which represents the bits to be allocated to the coefficients in each subband, using the process shown in FIG. 8 box 801. Each element in A( ) corresponds to a subband. Recall from Table I that the higher subband exponents represent multiple transform coefficients, therefore each element of A( ) represents the number of bits assigned to all transform coefficients in the corresponding subband. For example, referring to Table I, subband 7 represents coefficients 7 and 8. If element A(7) has a value of one, this indicates that 2 bits are allocated, one each to transform coefficients 7 and 8. Continuing the example, if element A(18) has a value of two, then 14 bits are allocated, 2 bits each to coefficients 39–45. During the allocation process, as each element of A( ) is incremented, the number of allocated bits is deducted from the number of bits remaining for allocation.

When all of the allocatable bits are assigned during this or any following phase, that phase immediately terminates and all of the subsequent phases are skipped. During the final step in which the allocation limit is reached, the number of bits assigned to a subband during that step will not exceed the number of bits remaining for allocation. If the last of the allocatable bits are assigned while processing a subband with more than one coefficient, it is likely that not all of the coefficients in that subband will be allocated the same number of bits.

Starting with the M( ) array element representing the lowest-frequency coefficient (M(0) for DCT blocks, or element M(1) for DST blocks), each element of M( ) is examined in turn. As many as four passes are made through array M( ), or until all allocatable bits are allocated. On the first pass, each element in array A( ) is incremented by one if the corresponding element in array M( ) has a value equal to four. The second pass increments by one each element in A( ) which corresponds to each element in M( ) which has a value equal to three or four. On the third pass, array A( ) elements are incremented if the corresponding M( ) element has a value within the range of two to four. The final pass increments those elements in array A( ) corresponding to those M( ) elements which have a value in the range between one and four. It may be noted that if the elements in array M( ) sum to the allocation limit or less, the contents of arrays M( ) and A( ) at this point will be identical. If the number of bits assigned has reached the allocation limit, the bit-allocation process is complete at the end of phase one.

If any allocatable bits remain, allocation continues with phase two shown in box 802 of FIG. 8. This phase makes as many as three passes through array A( ), stopping earlier if and when the maximum allocatable bits are assigned. Each pass starts with the lowest frequency element (A(0) for DCT blocks, or A(1) for DST blocks) and works upward in frequency. On the first pass through array A( ), each element which has a value between one and three is incremented by one. On the second pass, elements with values of two or three are incremented. On the third pass, elements equal to three are incremented. If this phase completes without exceeding the allocation limit, every element in array A( ) will have a value of either four to zero.

If any allocatable bits remain, allocation continues with phase three shown in box 803 of FIG. 8. Like the previous phases, phase three allocation will terminate as soon as the allocation limit has been reached. This final phase assigns additional bits to transform coefficients with lower spectral energy which are adjacent to subbands of coefficients with higher energy. This assignment is accomplished in four steps. The first step scans array A( ) starting with the highest frequency element A(18) (element A(20) is the starting element in 20 kHz bandwidth coders) in search of a group of three adjacent elements which have the values {0,0,4}. If found, the center element is set to one such that the group values become {0,1,4}.

Two special cases comprise the second step. The bit allocation of the lowest frequency transform coefficient is set to one if the values of the two lowest-frequency elements (A(0) and A(1) for DCT blocks, or A(1) and A(2) for DST blocks) are {0,4}. Then elements A(17) and A(18) are tested to determine if their values are {4,0}. If so, the allocation for the highest frequency subband is set to one. (Elements A(19) and A(20) are tested in a 20 kHz coder.)

If the allocation limit has not been reached, step three of phase three begins by scanning array A( ) downward starting with the highest frequency subband in search of a group of three adjacent elements which have the values {4,0,0}. If found, the center element is set to one to produce values {4,1,0}.

The fourth and final step of phase three allocates additional bits to the coefficients in subbands assigned bits in steps one through three of this phase. Starting at the highest frequency element of array A( ), each element modified in step one is incremented. Any elements modified in step two are incremented next. Finally, elements modified in step three are incremented, starting with the highest frequency subbands. This fourth step reiteratively increments the array elements in the same order discussed above until all allocable bits are assigned, or until all of the elements modified in steps one through three are assigned a total of 4 bits each. If the latter condition is met and any allocable bits remain to be assigned, phase three repeats starting with step one.

b. Adaptive Bit Allocation Logic

The concept of the adaptive bit allocation algorithm is represented in FIG. 8 and described above. An understanding of the algorithm's concept is helpful in gaining an understanding of the actual logic of the adaptive bit allocation routine.

Phase zero begins by initializing all elements of array A( ) equal to zero, and constructing four tables $T_1$ through $T_4$. The construction of the tables is accomplished through the following steps: (1) identify the smallest subband exponent and save this value as $X_{MIN}$; (2) starting with the lowest frequency subband (subband 0 for DCT blocks, or subband 1 for DST blocks), subtract the subband exponent (see Table I) from $X_{MIN}$; (3) if the difference is zero, insert the subband number into tables $T_1$, $T_2$, $T_3$, and $T_4$; (4) if the difference is negative one, insert the subband number into tables $T_1$, $T_2$, and $T_3$; (5) if the difference is negative two, insert the subband number into tables $T_1$, and $T_2$; (6) if the difference is negative three, insert the subband number into table $T_1$; (7) continue steps three through six for each subband until all subbands have been processed. At the end of this step, table $T_1$ contains the numbers of all subbands that have exponents in the range $X_{MIN}$-3 to $X_{MIN}$, table $T_2$ contains subbands with exponents from $X_{MIN}$-2 to $X_{MIN}$, table $T_3$ contains subbands with exponents from $X_{MIN}$-1 to $X_{MIN}$, and table $T_4$ contains subbands with exponents equal to $X_{MIN}$. Of significance, subband entries in each table are in ascending order according to frequency.

Phase one allocates bits to transform coefficients in subbands with the largest subband exponents. Starting with the first (lowest frequency) entry in table $T_4$, one bit is allocated to each transform coefficient within each subband represented in the table. The allocation is repeated in turn for table $T_3$, $T_2$, and finally table $T_1$. This process continues until all allocable bits have been assigned or until all entries in tables $T_4$ to $T_1$ have been processed. As a bit is assigned to all coefficients in a subband, an entry in array A( ) corresponding to that subband is incremented by one such that the elements in A( ) reflect the total bits allocated to each transform coefficient in each subband.

As noted earlier, allocation terminates immediately when all of the allocable bits are assigned. Each table entry represents a subband which, in general, contains multiple transform coefficients. Therefore, if the last of the allocable bits are assigned to a table entry representing a subband with more than one coefficient, it is probable that not all of the coefficients in that subband can be allocated the same number of bits. In such situations, the allocation process notes which coefficients in the subband must have a bit deducted from the subband's allocation amount subsequently stored in array A( ).

Phase two constructs four new tables, $T_1$ through $T_4$, using a procedure similar to that used in phase zero: (1) $X_{MIN}$ still retains the smallest subband exponent; (2) for the lowest frequency subband (subband 0 for DCT blocks, or subband 1 for DST blocks), subtract the subband exponent from $X_{MIN}$; (3) if the difference is zero, insert the subband number into table $T_4$; (4) if the difference is negative one, insert the subband number into table $T_3$; (5) if the difference is negative two, insert the subband number into table $T_2$; (6) if the difference is negative three, insert the subband number into table $T_1$; (7) continue steps three through six for each subband until all subbands have been processed. At the end of this step, table $T_1$ contains the numbers of all subbands that have exponents equal to $X_{MIN}$-3, table $T_2$ contains subbands with exponents equal to $X_{MIN}$-2, table $T_3$ contains subbands with exponents equal $X_{MIN}$-1, and table $T_4$ contains subbands with exponents equal to $X_{MIN}$. The entries in all of the tables are in ascending order according to the frequency of the transform coefficient.

Phase two assigns bits to all coefficients represented by subbands in tables $T_3$ to $T_1$ until each coefficient has received a total of four additional bits, or until the allocation limit has been reached. Starting with the first (lowest frequency) entry in table $T_3$, one bit is assigned to each coefficient contained within each subband represented in the table. As each subband is processed, the entry is removed from table $T_3$ and inserted into table $T_4$. Next, coefficients associated with entries in table $T_2$ are allocated an additional bit, moving each entry from table $T_2$ to $T_3$ as the additional bit is assigned. Then entries in table $T_1$ are processed, moving the entries from table $T_1$ to $T_2$. If any allocable bits remain, allocation continues by repeating the process for table $T_3$, and then table $T_2$. If bits remain to assign, a final pass is made through the entries in table $T_3$. If phase two does not assign all remaining allocable bits, table $T_4$ contains all of the coefficients, each having received 4 bits, and tables $T_3$ through $T_1$ are empty. If all allocable bits have been assigned, array A( ) is rebuilt from the information contained in tables $T_1$ through $T_4$ to reflect the total bits allocated to each transform coefficient. Each element in array A( ) corresponding to an entry in table $T_4$ is assigned a value of four. Each A( ) element corresponding to an entry in table $T_3$ is assigned a value of three; for table $T_2$ a value of two; and for table $T_1$ a value of one. All other elements of A( ), i.e., those subbands which are not represented by entries in tables $T_1$ through $T_4$, are zero.

If any allocable bits remain, allocation continues with phase three. Table $T_4$ is sorted, ordering the subband numbers into descending frequency. The first step adds subbands to table $T_1$ which are not in table $T_4$ that are lower in frequency and adjacent to subbands which are in table $T_4$. Starting with the first (highest frequency) entry in table $T_4$, adjacent entries in the table are examined to determine if they are separated by two or more subbands. If they are, the number of the subband immediately below the higher subband is inserted into table $T_1$. For example, suppose two adjacent entries in table $T_4$ represent subbands 16 and 12. These two subbands are separated by three subbands. Therefore the number 15, representing the subband below subband 16, would be inserted into table $T_1$.

Two special cases for subbands 0 and 18 (subbands 0 and 20 in the 20 kHz version) are handled next. If subband 1 is the last entry in table $T_4$, the number for subband 0 is inserted into table $T_1$. If the first entry in table $T_4$ is subband 17 (subband 19 in the 20 kHz version), the number for subband 18 (subband 20) is inserted into table $T_1$.

The third step adds subbands to table $T_1$ which are not in table $T_4$ that are higher in frequency and adjacent to subbands which are in table $T_4$. Starting with the first (highest frequency) entry in table $T_4$, adjacent entries in the table are examined to determine if they are separated by two or more subbands. If they are, the number of the subband immediately above the lower subband is inserted into table $T_1$. For example, suppose two adjacent entries in table $T_4$ represent subbands 16 and 12. As discussed above, these two subbands are separated by 3 subbands. Therefore the number 13, representing the subband above subband 12, would be inserted into table $T_1$.

Starting with the first entry in table $T_1$, an additional bit is assigned to each transform coefficient associated with each subband represented by an entry in table $T_1$. As each subband entry is processed, it is moved from table $T_1$ into table $T_2$. If any allocable bits remain at the end of processing table $T_1$, a similar process repeats for the entries in table $T_2$, moving each entry from table $T_2$ into table $T_3$. Processing continues with table $T_3$ entries if any bits remain to allocate, moving entries from table $T_3$ into table $T_4$. If any bits remain after this step, phase three repeats from the beginning by sorting table $T_4$ entries into descending frequency order. When all allocable bits have been assigned, array A( ) is built from the four tables as described above for phase two.

After all bits have been allocated, each transform coefficient code word is rounded off to a bit length equal to the value of the element of array A( ) representing the subband in which the coefficient is grouped. Some coefficients in one subband, however, may have one bit deducted from their length as required to keep the total number of allocated bits equal to the allocation maximum.

5. Code Word Truncation

The fifth section of the nonuniform quantizer, shown in box 705 of FIG. 7, follows the adaptive bit allocation routine. Using the subband and master exponents determined in previous sections, each transform coefficient in a transform block is shifted to the left a number of times equal to the value of the exponent for the subband in which the coefficient is grouped, plus three more shifts if the associated master exponent is set to one. Each coefficient's total bit length is then calculated by adding its minimum bit length (see Table I) to the number of adaptively allocated bits assigned to coefficients in each subband, found in array A( ). Each transform coefficient code word is rounded off to this bit length.

As described above, each element of array A( ) represents the number of bits assigned to all coefficients within a subband. Some coefficients in one subband may have one bit deducted from their length as required to keep the total number of bits allocated to the transform block equal to the allocation maximum.

E. Formatting

The formatting process prepares the encoded transform blocks for transmission or storage. This process is represented by box 109 in FIG. 1a. The following description discusses the formatting of a two-channel signal such as that used in stereophonic applications. The basic scheme, however, can be utilized in single-channel or multiple-channel systems without departing from the basic invention.

A fixed length representation of each transform coefficient code word is formed by truncating the rounded code word to a length equal to the minimum bit length shown in Table I. Any additional bits allocated to the code word are formatted separately in an adaptive bit block. The master exponents, subband exponents, truncated coefficient code words, and adaptive bit blocks are then assembled according to the grouping shown in FIG. 20.

The formatted frame of transform blocks in FIG. 20 depicts a structure where channel A has encoded a DCT block and channel B has encoded a DST block. If the frame will be subject to bit errors such as those caused by noise during transmission, error correction codes are intermixed with the data as shown in FIG. 21. Additional overhead bits may be required, such as frame synchronization bits if the digital signal is intended for transmission, or database pointers or record keys if the frames are intended for storage. If frame synchronization bits are required, the formatted frame is randomized using a technique described in Smith, *Digital Transmission Systems*, New York, N.Y.: Van Nostrand Reinhold Co., 1985, pp. 228–236. Randomization is performed to reduce the probability that valid data within the frame will be mistaken for the synchronization pattern. The randomized frame is then appended to the frame synchronization bits.

Note that each transform coefficient may be represented in as many as two distinct parts or segments. The first part represents the coefficient's minimum length and is composed of a fixed number of bits. See Table I. The second part of the representation, if present, is of varying length and is composed of the adaptively allocated bits. This two-part representation scheme is chosen over one which represents each coefficient as a variable length word because it is more immune to corruption by noise. If a noise burst occurs in a frame utilizing the preferred scheme, the effects of the noise will be confined to the value of the exponents, code words, or allocated bits directly affected by the noise. If a noise burst occurs in a frame utilizing variable length code words, the effects of the noise can be propagated through the remainder of the frame. This propagation may occur because the noise burst will alter not only the value of the exponents and code words hit directly by the noise, but also the information needed to determine the length of each variable length code word. If the length of one code word is in error, the remainder of the frame will be misinterpreted.

Table I shows that an encoded DCT block is composed of two master exponent bits, nineteen subband exponents for 69 bits, and forty-six coefficient code words for 163 bits. An additional 34 adaptively allocated bits bring the total DCT block length to 268 bits. (For the 20 kHz version of the invention, an encoded DCT block is composed of two master exponents, twenty-one subband exponents of 77 bits, sixty-three coefficient code words of 197 bits, and 34 adaptively allocated bits, for a total of 310 bits.) As noted in Table I and shown in expression 4, the code word for DST coefficient S(0) is always zero, therefore the code word and its exponent need not be transmitted or stored. This reduces an encoded DST block by a total of 8 bits (three exponent bits and 5 coefficient code word bits) to a length of 260 bits (302 bits for the 20 kHz version). The total length for an encoded frame of a DCT-DST block pair is 528 bits.

No side-information is required to indicate the coefficients to which additional bits have been allocated. The deformatting process is able to determine the proper allocation from the transmitted subband exponents by performing the same allocation algorithm as that used in the encoding process.

When data corruption is not a problem, a preferred structure for formatting a frame of transform blocks is one which places the exponents first, coefficient code words second, and finally the adaptively allocated bits. This reduces processing delays because, after all subband exponents have been received, the deformatting process is able to determine bit allocations made to each transform coefficient while the adaptive bit blocks are being received. The formatting structure used in the preferred embodiment of the invention is shown in FIG. 20. The bit stream is formatted with the master and subband exponents for one channel assembled in ascending frequency order, followed by the master and subband exponents of the other channel. Next, the fixed length portion of the transform coefficient code words for the first channel are assembled in ascending frequency order, followed by the coefficient code words of the other channel. Finally, the adaptive bit blocks for the first channel are appended to the bit stream, followed by the adaptive bit blocks for the other channel.

In applications where potential data corruption is of concern, an error correction scheme is necessary. Errors in subband exponents, and to the lesser extent, errors in the lower-frequency coefficient code words generally produce the greatest audible distortion. This information is the most critical data to protect. A preferred scheme protects these values with error detection and correction codes, and separates these values as much as possible to improve their immunity to noise burst errors. Such a scheme is shown in FIG. 21.

It will be obvious to one skilled in the art that other frame formats and correction codes may be utilized without departing from the basic invention.

The total length for one frame of a DCT/DST block pair is 528 bits (612 bits for the 20 kHz version). Of this length, 139 bits are subband and master exponents (155 bits for the 20 kHz version). Three (15,13) Reed-Solomon error correction codes are added to the bit stream. Each of these codes provide single-symbol error detection/correction for as many as thirteen 4-bit symbols (nibbles), or 52 bits. See, for example, Peterson and Weldon, *Error-Correcting Codes*, Cambridge, Mass: The M.I.T. Press, 1986, pp. 269–309, 361–362. Three of these error correction codes are inserted into each frame to protect up to 39 nibbles (156 bits) of data, bringing the total frame length to 552 bits (636 bits for the 20 kHz version).

Because the three codes may protect up to 156 bits, yet there are only 139 subband exponent bits in the 15 kHz version, protection may also be provided to the three lowest-frequency coefficient code words in the block-pair frame (coefficients C(0) and C(1) for the DCT block, and coefficient S(1) for DST block). The remaining error correction capacity is utilized by providing redundant protection for the two low frequency master exponents (MEXP0 shown in Table I) of each transform block. Assignment of the three error codes to specific data elements is somewhat arbitrary, however, the DCT master exponents should be assigned to one code, the DST master exponents should be assigned to another code, and the two low frequency master exponents from each transform block should be assigned to the third code.

The Reed-Solomon codes process data in nibbles, therefore the error codes, protected data, and unprotected data are grouped into 4-bit nibbles for ease of processing. The ratio of protected data to unprotected data in each block-pair frame is approximately two-to-one. This permits scattering protected data throughout the formatted frame, each 4-bit nibble of protected data separated by two nibbles of unprotected data. In addition, because each error code itself can sustain a single-symbol error, protected nibbles are assigned to each of the three codes in sequence. For example, the first five protected nibbles are assigned to error codes 1, 2, 3, 1, and 2, respectively. See FIG. 21. With this technique, a single burst error of as many as 33 bits may occur anywhere in the frame without corrupting more than a single nibble from each error code. Therefore, protected data can be recovered from any single noise burst no longer than 33 bits in length.

Subject to the constraints discussed above, exponents and transform coefficient code words are assembled in ascending frequency order, and are followed by the adaptive bit blocks.

F. Transmission or Storage

The formatted frame is now ready for transmission or for storage. FIG. 1a illustrates transmission means 110. Transmission media include public dissemination such as broadcasting, internal use such as studio monitoring or signal mixing, and interfacility or telephone use via terrestrial or satellite links. Storage media include magnetic tape and magnetic or optical disks.

G. Deformatting

A deformatting process takes place when the digitized and coded signal is received from transmission means 111 either by receipt of a transmitted signal or retrieved from storage. The process is represented by box 112 in FIG. 1b. If the formatted frame of code words was randomized prior to transmission, the formatted frame is recovered by an inverse randomizing process. Then the frame is split into the component parts of each transform block: the master exponents, subband exponents, fixed length portion of transform coefficient code words, and adaptively assigned bits. Error correction codes, if present, may be used to rectify errors introduced during transmission or storage.

Each of the master exponent bits are checked with its corresponding redundant bit to verify accuracy. If this check fails, i.e., a master exponent and its redundant counterpart are not equal, the value of the master exponent is assumed to be one. If the correct value of the master exponent is actually zero, this assumption will reduce the amplitude of all transform coefficients within the subbands grouped under the errant master exponent. This assumption produces less objectionable distortion than erroneously setting a master exponent to zero (when it should be one) which would increase the amplitude of all affected coefficients.

The exponent for all single coefficient subbands are also checked to determine if any hidden bit adjustments are necessary.

The adaptive bit allocation routine discussed above is used to process the exponents extracted from the received signal, and the results of this process are used to determine the proper allocation of the adaptive bit blocks to the transform coefficients. The portion of each transform coefficient whose length equals the minimum bit length plus any adaptively allocated bits are loaded into a 24-bit word and then shifted to the right a number of times equal to the value of the appropriate subband exponent plus three additional shifts if the associated master exponent is set to one. This process is represented by box 113 in FIG. 1b.

H. Synthesis Filter Bank—Inverse Transform

Box 114 in FIG. 1b represents a bank of synthesis filters which transform each set of frequency-domain coefficients recovered from the deformatting and linearization procedures into a block of time-domain signal samples. An inverse transform from that used in analysis filter bank 104 in FIG. 1a implements synthesis filter bank 114. The inverse transforms for the TDAC technique used in this embodiment of the invention are alternating applications of a modified inverse DCT and an inverse DST. Because half of the transform blocks are omitted from transmission or storage (see expression 5), those blocks must be recreated for the inverse transforms. The missing DCT blocks may be recreated from the available DCT blocks as shown in equation 8. The missing DST blocks may be recreated as shown in equation 9. The inverse DCT is expressed in equation 10, and the inverse DST is expressed in equation 11.

$$\hat{C}(k) = -\hat{C}(N - k) \tag{8}$$

for $N/2 \leq k < N$ $$\hat{S}(k) = \hat{S}(N - k) \tag{9}$$

for $N/2 < k \leq N$ $$\hat{x}(n) = \frac{1}{K} \sum_{k=0}^{K-1} \hat{C}(k) \cdot \cos\left[2\pi k \left(\frac{n + m}{K}\right)\right] \tag{10}$$

for $0 \leq n < N$ $$\hat{x}(n) = \frac{1}{K} \sum_{k=0}^{K-1} \hat{S}(k) \cdot \sin\left[2\pi k \left(\frac{n + m}{K}\right)\right] \tag{11}$$

for $0 \leq n < N$ where
k = transform coefficient number,
n = signal sample number,
K = number of transform coefficients,
N = sample block length,
m = phase term for TDAC (see equation 6),
$\hat{C}(k)$ = quantized DCT coefficient k,
$\hat{S}(k)$ = quantized DST coefficient k, and
$\hat{x}(n)$ = recovered quantized signal x(n).

Calculations are performed using an FFT algorithm. The same techniques as those employed in the forward transform are used in the inverse transform to permit concurrent calculation of both the DCT and DST using a single FFT.

FIGS. 14a–14e and 16a–16g illustrate the transform process of the analysis-synthesis filter banks. The analysis filter bank tranforms the time-domain signal into an alternating sequence of DCT and DST blocks. The inverse transform applies the inverse DCT to every other block, and applies the inverse DST to the other half of the blocks. As shown in FIGS. 15a–15d, the recovered signal contains aliasing distortion. This distortion is cancelled during a subsequent time-domain block overlap-add process represented by box 116 in FIG. 1b. The overlap-add process is discussed below.

I. Synthesis Window

FIGS. 16a-16g illustrate cancellation of time-domain aliasing by the overlap-add of adjacent time-domain signal sample blocks. As derived by Princen, to cancel time-domain aliasing distortion, the TDAC transform requires the application of a synthesis window identical to the analysis window and an overlap-add of adjacent blocks. Each block is overlapped 100%; 50% by the previous block and 50% by the following block. Synthesis-window modulation is represented by box 115 in FIG. 1b.

Analysis-synthesis window design must consider filter bank performance. Because both windows are used to modulate the time-domain signal, the total effect upon filter performance is similar to the effect caused by a single window formed from the product of the two windows. Design of the analysis-synthesis window pair, therefore, is accomplished by designing a suitable product-window representing a point-by-point multiplication of the analysis and synthesis windows. This design is highly constrained, reducing flexibility in trading off the steepness of transition band rolloff and the depth of stopband rejection. As a result, filter performance is degraded to a greater extent than it is by an analysis-only window designed without this constraint. For example, see FIG. 17.

While analysis windows have received much attention, the prior art teaches little about analysis-synthesis window pairs. The technique described below derives a good analysis-synthesis window pair from a known good analysis-window design. A window pair derived by this technique is substantially the same as a window pair derived from a computer-based optimization technique discussed in more detail later. While any analysis window may be used as a starting point, several windows permit design of a filter bank with good selectivity, and they offer a means to trade off steepness of transition band rolloff against depth of stopband rejection. Three examples are the Kaiser-Bessel window, the Dolph-Chebyshev window, and a window derived from finite impulse filter coefficients using the Parks-McClellan method. See Parks and McClellan, "Chebyshev Approximation for Nonrecursive Digital Filters with Linear Phase," *IEEE Trans. Circuit Theory*, vol. CT-19, March 1972pp. 189-94. Only the Kaiser-Bessel window is discussed here. This window allows the trade off mentioned above through the choice of a single parametric alpha value. As a general rule, low alpha values improve transition band rolloff, and high alpha values increase the depth of stopband rejection. See Harris, cited above.

An alpha value in the range of 4 through 7 is usable in the preferred embodiment of the invention. This range provides a good compromise between steepness of transition band rolloff at mid-frequencies (1-2 kHz), and depth of stopband rejection for low frequencies (below 500 Hz) and high frequencies (above 7 kHz). The range of acceptable alpha values was determined using computer simulations by identifying the lowest alpha values which have sufficient stopband rejection to keep quantizing noise below the psychoacoustic masking threshold.

The Kaiser-Bessel window function is $$W(n) = \frac{I_0\left[\pi\alpha\sqrt{1 - \left(\frac{n}{N/2}\right)^2}\right]}{I_0[\pi\alpha]} \quad (12)$$

for $0 \leq n < N$ where
$\alpha$ = Kaiser-Bessel alpha factor,
n = window sample number,
N = window length in number of samples, and $$I_0[x] = \sum_{k=0}^{\infty} \frac{(x/2)^k}{k!}.$$

To satisfy the overlap-add criteria, an analysis-synthesis product-window WP(n) of length N is derived by convolving window W(n) of length v+1 with a rectangular window of length N−v. The value v is the window overlap-add interval. The overlap-add process cancels alias distortion and the modulation effects of the analysis and synthesis windows. The convolution which derives the product window is shown in equation 13, where the denominator of the expression scales the window such that its maximum value approaches but does not exceed unity. This expression may be simplified to that shown in equation 14.

$$WP(n) = \frac{\sum_{k=0}^{N-1} s(k) \cdot W(n-k)}{\sum_{k=0}^{v} W(k)} \quad (13)$$

for $0 \leq n < N$ $$WP(n) = \frac{\sum_{k=0}^{N-v-1} W(n-k)}{\sum_{k=0}^{v} W(k)} \quad (14)$$

for $0 \leq n < N$ where
n = product-window sample number,
v = number of samples within window overlap interval,
N = desired length of the product-window,
W(n) = beginning window function of length v+1,
WP(n) = derived product-window of length N, and $$s(k) = \begin{cases} 1 \text{ for } 0 \leq k < N - v \\ 0 \text{ otherwise.} \end{cases}$$

The analysis and synthesis windows shown in equations 15 and 16 are obtained by taking the derived product-window WP(n) to the A and S powers respectively.

$$WA(n) = WP(n)^A \quad \text{for } 0 \leq n < N \quad (15)$$

$$WS(n) = WP(n)^S \quad \text{for } 0 \leq n < N \quad (16)$$

where
WP(n) = derived product-window (see equations 13 and 14),
WA(n) = analysis window, WS(n) = synthesis window,
N = length of the product-window, and
A + S = 1.

In the current embodiment of the invention, the analysis and synthesis windows have a length of 128 samples with a 100% window overlap, or an overlap interval of 64 samples. The values of A and S are each set to one-half which produces a pair of identical analysis and synthesis windows as required by the TDAC transform. Substituting these values into equation 14, the resulting analysis window is seen to be $$WA(n) = \sqrt{\left\{ \frac{\sum_{k=0}^{63} W(n-k)}{\sum_{k=0}^{64} W(k)} \right\}} \quad \text{for } 0 \leq n < N \quad (17)$$

where
W(n) = Kaiser-Bessel function of length 65, and the alpha factor is in the range 4 to 7.

J. Overlap-Add

An additional requirement is placed upon window design: the analysis and synthesis windows must be designed such that the analysis-synthesis product-window always sums to unity when two adjacent product-windows are overlapped. This requirement is imposed because an overlap-add process is used to cancel the time-domain effects of the analysis- and synthesis-window modulation. This process is represented by box 116 in FIG. 1b, and illustrated in FIGS. 16a–16g. Signals $y_c(t)$ and $y_s(t)$, recovered from the inverse DCT and DST respectively, are shown in FIGS. 16a and 16d. Each signal is grouped into a series of blocks. Each signal block is modulated by the synthesis-window functions shown in FIGS. 16b and 16e. The resulting blocks of signals $y_c(t)$ and $y_s(t)$ are shown in FIGS. 16c and 16f. The two signals, overlapped by one-half block length, are added to produce signal y(t), shown in FIG. 16g. Signal y(t) is in accurate reconstruction of the original input signal.

As shown in FIG. 18, a signal sample at some time $n_0t$ within the overlap interval between block k and block k+1 is represented by a sample in each of the two blocks. Following an overlap-add of the two windowed blocks, the recovered signal sample at time $n_0t$ is seen to be the sum of the samples from windowed blocks k and k+1, which may be expressed as $$x(n_0t) = WP_k(n_0t) \cdot x(n_0t) + WP_{k+1}(n_0t) \cdot x(n_0t) \quad (18)$$

where
$WP_k(n_0t) = WA_k(n_0t) \cdot WS_k(n_0t) = \{WA_k(n_0t)\}^2$,
$WA_k(n_0t)$ = analysis window in block k at time $n_0t$,
$WS_k(n_0t)$ = synthesis window in block k at time $n_0t$, and
$WA_k(n_0t) = WS_k(n_0t)$ as required by the TDAC transform.

The product-window modulation effects are cancelled if the sum of the two adjacent product-windows across the window overlap interval equals unity. Therefore, signal x(nt) may be accurately recovered if $$WP_k(nt) + WP_{k+1}(nt) = 1 \quad \text{for } 0 \leq n < N \quad (19)$$

for all time samples nt within the overlap interval between block k and block k+1.

It is difficult to work with the product-window as a function of time, so it is desirable to translate the requirement as expressed in equation 19 into a function of window sample number n. Equations 20 through 23 express this requirement for a product-window created from the product of a pair of 128 sample analysis and synthesis windows with 100% overlap. Equation 20 represents the overlap of the first half of window $WP_k$ and the last half of the previous window $WP_{k-1}$. Equation 21 represents the overlap of the last half of window $WP_k$ and the first half of the following window $WP_{k+1}$. Equations 22 and 23 show the equivalent expressions in terms of the analysis window. Note that the analysis and synthesis windows must be identical for the TDAC transform.

$$WP_{k-1}(n+64) + WP_k(n) = 1 \quad (20)$$

for $0 \leq n < 64$ $$WP_k(n) + WP_{k+1}(n-64) = 1 \quad (21)$$

for $64 \leq n < 128$ $$\{WA_{k-1}(n+64)\}^2 + \{WA_k(n)\}^2 = 1 \quad (22)$$

for $0 \leq n < 64$ $$\{WA_k(n)\}^2 + \{WA_{k+1}(n-64)\}^2 = 1 \quad (23)$$

for $64 \leq n < 128$ where
$WP_k(n) = WA_k(n) \cdot WS_k(n) = \{WA_k(n)\}^2$,
$WA_k(n)$ = analysis window value for sample n in block k,
$WS_k(n)$ = synthesis window value for sample n in block k, and
$WA_k(n) = WS_k(n)$ as required by the TDAC transform.

K. Signal Output

Box 117 in FIG. 1b represents a conventional digital-to-analog converter which generates a varying voltage analog signal in response to a digital input. The digital input is obtained from the 16 most significant bits of the 24-bit integer words produced by the overlap-add process. The analog output should be filtered by a low-pass filter with a passband bandwidth of 15 kHz (20 kHz for the 20 kHz coder) to remove spurious high-frequency components. This filter is not shown in FIG. 1b.

II. ALTERNATIVE DFT IMPLEMENTATION OF INVENTION

The TDAC transform is preferred for most applications, however, the signal processing resources required for a TDAC coder are greater than that required for Discrete Fourier Transform (DFT) based coders. Using a DFT, a coder may be implemented which requires less memory, processing speed, and arithmetic accuracy to only 16 significant bits. The design objectives for the DFT coder are the same as that for the TDAC version; CD quality signal, minimal bit rates, and low time delay through the coder. The following discussion assumes a sample rate of 48 kHz although other rates such as the 44.1 kHz sample rate discussed above for the TDAC version may also be used.

FIGS. 22a and 22b show the basic structure of the DFT embodiment of the invention. This structure is similar to that of the TDAC version. Four differences are required to compensate for the lower accuracy of 16-bit arithmetic: (1) a preemphasis gain is applied to the analog input signal by a network represented by box 2219, (2) block-floating-point encoder represented by box 2220 operates prior to analysis-window modulation represented by box 2203, (3) block-floating-point decoder represented by box 2222 operates to recover the time-domain signal samples into 16-bit integer form, and (4) a complementary postemphasis boost represented by box 2224 is applied to the analog output signal.

The signal samples are converted to block-floating-point form to increase the number of significant bits because otherwise the DFT calculations, performed with only 16 significant bits of accuracy, produce audible levels of noise due to cumulative round-off errors and an inability to represent the required dynamic range. For further information on round-off noise accumulation in FFT algorithms, see Prakash and Rao, "Fixed-Point Error Analysis of Radix-4 FFT," Signal Processing 3 North-Holland Publishing Co., 1981, pp. 123-133. By expressing each signal sample in block-floating-point form with a 4-bit exponent, the effective dynamic range of each transform coefficient is increased.

The block-floating-point encoder represented by box 2220 in FIG. 22a first finds the magnitude of the largest sample in the digitized signal block. The number of left shifts required to normalize this value is determined. The number of shifts, which will be in the range 0-15, establishes the value of the master exponent MEXP. See Table II. Finally, all samples in the block are shifted to the left an amount equal to the value of the master exponent. During decode, block-floating-point linearizer 2222 shown in FIG. 22b shifts each sample to the right an amount equal to the master exponent and the sample block is derived from its block-floating-point representation.

The use of block-floating-point representation provides a lower noise floor for low level signals because all samples are left shifted on encode and right shifted on decode, reducing the effects of arithmetic round-off errors. Unfortunately, modulation of the arithmetic noise floor occurs with high signal levels similar to that created by a broadband audio signal compander. But empirical evidence shows that the major audible effects of this modulation occur at frequencies below 300 Hz. Because 16-bit transform coder distortion and round-off noise below 300 Hz are inaudible, the input signal (and consequently the noise floor) may be reduced by a special preemphasis attenuation before ADC quantizing, and compensated by a postemphasis boost after digital-to-analog conversion. The preemphasis attenuation represented by box 2219 in FIG. 22a and the postemphasis boost represented by box 2224 in FIG. 22b provide a large reduction in audible modulation noise for low frequency signals. The preemphasis characteristic is complementary to the postemphasis characteristic so that the frequency response of the coder remains flat. The preemphasis gain characteristic is a low frequency attenuation given by $$G(s) = \frac{s^2 + 2\pi \cdot 100s + (2\pi \cdot 100)^2}{s^2 + 2\pi \cdot 300s + (2\pi \cdot 300)^2} \quad (24)$$

where
G(s) = preemphasis gain
s = j·f,
j = $\sqrt{-1}$, and
f = input frequency in radians/sec.

This preemphasis gain is a second order shelf with 19 dB attenuation at DC (0 Hz) and unity gain at high frequencies. The upper cutoff frequency is 300 Hz and the lower cutoff frequency is 100 Hz. For further details on the use of pre- and postemphasis, see Fielder, "Pre- and Postemphasis Techniques as Applied to Audio Recording Systems," *J. Audio Eng. Soc.*, vol. 33, September 1985, pp. 649-657.

The following description discusses the differences between the DFT and TDAC transform versions of the invention.

A. Processing Hardware

The basic hardware architecture of the DFT version of the invention is the same as that for the TDAC transform version of the invention, illustrated in FIGS. 2a and 2d. A practical implementation of a preferred embodiment of a single-channel DFT version of the invention, employing either a 44.1 kHz or a 48 kHz sample rate, utilizes a 16-bit ADC with a cycle time of no more than 20 microseconds to quantize the input time-domain signal. Any of several 16-bit digital signal processors such as the AT&T DSP-16 or Texas Instruments TMS32020 may be used to perform the required computations and to control the encode and decode processes. Static RAM provides program and data memory for the DSP. A 16-bit DAC with a cycle time of no more than 20 microseconds is used to generate an analog signal from the decoded digital signal.

Design of the coder hardware and configuration of the DSP serial ports is not unlike that described above for the TDAC transform version of the invention, and will be obvious to one skilled in the art.

B. Input Signal Sampling and Windowing

As discussed above, the input signal is attenuated by preemphasis gain prior to sampling and quantization. The sampling in the DFT embodiment under discussion here occurs at 48 kHz. The quantized values from the ADC are 16 bits in length and are buffered into blocks 128 samples in length. One block is received every 2.67 milliseconds, which provides for a short propagation delay through the coder.

The buffered block of samples is then converted into a block-floating-point representation using one 4-bit master exponent. The block of 128 samples, left shifted by an amount equal to the value of the master exponent, is then modulated by an analysis window.

This analysis window is different from that used by the TDAC coder because of differences between the TDAC transform and the DFT. Unlike the TDAC transform, the DFT creates a sequence of one type of transform block. Each transform block is comprised of a pair of values for each of 41 transform coefficients; a real value component and an imaginary value component. (Coefficient 0 is an exception, represented by a single real value component.) See Table II. It is important to choose a window design which reduces the amount of input signal sample block overlap because the transmission rate or data storage requirements is doubled for the signal samples in the overlap interval. The DFT coder using an analysis window with 100% overlap requires approximately two times the bit rate as that required by the TDAC coder.

Unlike the TDAC window, the DFT window exhibits a gain of unity over a large interval, thereby reducing the block overlap length from 64 to 16 samples. See FIG. 23. This reduction degrades the digital filter stopband rejection, but it incurs an increase in data rate of only 14.3% (128/(128−16)) over that of the TDAC coder.

The DFT window is generated in a manner similar to that of the TDAC embodiment except that the kernel Kaiser-Bessel function is 17 samples in length and has an alpha factor within the range of 1.5 to 3. See equation 12. The range of acceptable alpha values was determined in the same manner as that discussed above for the TDAC transform windows. Substituting these values into equations 13 through 16, the analysis and synthesis windows are obtained from the square root of the convolution product of the Kaiser-Bessel window and a rectangular window of a length 112 (the block length of 128 minus the overlap length of 16). The DFT analysis window is $$WA(n) = \sqrt{\left\{\frac{\sum_{k=0}^{111} W(n - k)}{\sum_{k=0}^{16} W(k)}\right\}} \quad \text{for } 0 \leq n < N \quad (25)$$

where

W(n) = Kaiser-Bessel function of length 17, and the alpha factor is in the range 1.5 to 3.

The DFT and TDAC analysis windows are shown in FIG. 23. As shown in FIG. 24, the DFT window has poorer frequency selectivity than the TDAC window because of the reduced amount of overlap.

C. Analysis Filter Bank—Forward Transform

The DFT implements the filter bank and is expressed as $$C(k) = \sum_{n=0}^{N-1} x(n) \cdot \cos\left[2\pi k\left(\frac{n}{N}\right)\right] \quad \text{for } 0 \leq n < N \quad (26)$$

$$S(k) = \sum_{n=0}^{N-1} x(n) \cdot \sin\left[2\pi k\left(\frac{n}{N}\right)\right] \quad \text{for } 0 \leq n < N \quad (27)$$

where k = frequency coefficient number,
n = input signal sample number,
N = sample block length,
x(n) = quantized value of input signal x(t) at sample n,
C(k) = real value or cosine coefficient k, and
S(k) = imaginary value or sine coefficient k.

D. Nonuniform Quantization

The first three sections of the nonuniform quantizer are similar to the corresponding sections of the nonuniform quantizer for the TDAC coder. The major difference is that the master exponent is determined by block-floating-point encoder 2220 prior to analysis windowing and frequency-domain transformation, and not by section two of the nonuniform quantizer as is done in the TDAC coder. Other minor differences are attributable to the differences in the structure of the block-floating-point representation, i.e., subband exponent lengths, number and length of coefficients. Compare Tables I and II. The evaluation of subband exponents in the DFT coder is based on pairs of transform coefficient values except for coefficient 0 (DC or 0 Hz) whose imaginary term is always zero and is ignored. Each subband exponent value is determined from the largest component, real or imaginary, for any coefficient within the subband. The minimum bit lengths for the DFT coder are greater than that for the TDAC coder because the DFT filter frequency selectivity is poorer in this embodiment. As for the TDAC coder, the minimum bit lengths for the DFT coder were determined empirically using sinewave input and comparing filter selectivity to auditory masking characteristics.

E. Adaptive Bit Allocation

The adaptive-bit allocation for the DFT coder differs from that used in the TDAC coder, but most of the differences stem from the structure of the transform block. Only 32 bits (rather than 34) are available for allocation. Allocation is made to both components of the real-imaginary pair for each coefficient. To simplify the allocation scheme, no dynamic bit allocations are made to coefficient 0. Its length is fixed equal to its minimum bit length as shown in Table II. Therefore, 32 bits are assigned to 40 coefficients pairs.

In contrast to the TDAC coder, roughly the same number of bits are available to assign to approximately twice as many code words. Consequently, the maximum number of bits that may be assigned to any code word is limited to 2 bits. Whereas the TDAC allocation scheme assigns as many as 4 bits to a coefficient using four tables or arrays, the DFT assignment scheme utilizes only two tiers.

F. Formatting

The structure of the formatted data is similar to that used for the TDAC coder, and is shown in FIGS. 25 and 26. The principle differences between the DFT format and the TDAC transform format arise from differences in the block-floating-point structure and the number of bits assigned to exponents and transform coefficients.

Referring to Table II, it may be seen that DFT nonuniform quantizer 2208 shown in FIG. 22a produces 65 subband exponent bits, 331 transform coefficient bits, and 32 bits for adaptive-bit allocation. Block-floating-point encoder 2220 passes a 4-bit master exponent directly to formatter 2209 along path 2221. The total length of all encoded data for a single channel is 432 bits. In two-channel applications where data corruption is not a problem, the preferred formatting structure is that shown in FIG. 25.

For two-channel applications in which data corruption is of concern, an error correction scheme is necessary. A preferred structure is shown in FIG. 26. The most critical data to protect are the master exponents and coefficient exponents which comprise 138 bits (69 bits per channel). Three Reed-Solomon codes are sufficient to protect these bits, providing the capacity to protect an additional 18 bits. This extra capacity is split equally between the two channels to provide redundant protection for the master exponent (4 bits), protection for the three most-significant bits of transform coefficient 0, and protection for the most-significant bit of the real and imaginary components of coefficient 1. Protection of the lowest frequency coefficients is desirable because the low frequency boost provided by postemphasis (see equation 24) makes any errors in code words below 300 Hz more audible.

III. COMPUTER OPTIMIZED WINDOW DESIGN

An "optimum" window permits a transform-based digital filter to have the steepest transition band rolloff for a given level of ultimate rejection. This relationship between a window and the resultant filter frequency response is referred to in a shorthand manner as simply the window frequency response. As discussed above, these filter characteristics permit a transform coder to achieve lower bit rates for a given subjective level of encoded signal quality. For purposes of this invention, window optimization must consider the analysis-synthesis window pair rather than just an analysis-only window.

Analysis-only window design has received considerable attention but the prior art teaches little about the design of analysis-synthesis window pairs. The convolution technique described above derives a window pair from a known analysis-only window, however, it remains to be shown whether the technique can derive an optimum window pair from an optimum analysis-only window. A numerical optimization method described below, when constrained to design a window pair for use with the TDAC transform that has a specified level of ultimate rejection, creates a pair of windows in which each window has a shape substantially the same as an identically constrained window pair produced by the convolution technique. The optimization method establishes two facts: (1) it is possible to design an "optimum" window for a specified level of ultimate rejection, and (2) the convolution technique is much more computationally efficient and yet derives a window pair which is substantially optimum.

This result is very useful because it converts the problem of designing analysis-synthesis window pairs into the better understood problem of designing analysis-only windows. If an optimum analysis-only window is used as the starting point, the convolution technique will derive a window pair which is substantially optimum.

In general, the optimization process identifies an N-point analysis window whose corresponding frequency response curve best fits a target selectivity curve, subject to the constraints imposed by the TDAC transform. As discussed above, these constraints require that the square of the analysis window (the analysis-synthesis product-window), shifted by one-half block length and overlapped with itself, must add to unity within the overlap interval. Implemented as a digital computer program, the optimization process consists of the following steps: (1) initialize, (2) generate a set of points which define an analysis window, (3) construct a trial analysis window from the generated set of points, (4) determine the trial window frequency response, (5) calculate an error value for the trial window response, and (6) decide whether to continue the process.

The initialization step reads data from files which define the target or desired selectivity frequency response curve and specify a starting window shape. The target selectivity curve is derived empirically from listening tests, but its rate of transition band rolloff generally follows the lower slope of the human ear's psychoacoustic masking curve within a critical band.

The second step generates a set of points which define a trial analysis window. When the optimization process begins, the first trial window is constructed from the values specified by initialization data. As the process continues, successive trial windows are constructed by an optimization routine.

The optimization routine maintains a list of the best $N/4+1$ trial windows. The best window is that trial window whose frequency response curve conforms most closely to the target response curve. A Newton-Raphson technique has been used although most any multidimensional optimization method could be used. The basic strategy of the Newtonian method is to use the $N/4+1$ best windows to calculate the slope of a surface in an N/4 dimensional space and extrapolate the slope of the surface to its zero crossing. See, for example, Press, *Numerical Recipes: The Art of Scientific Computing*, New York: Cambridge University Press, 1986, pp. 254–59.

The third step constructs a trial analysis window N points in length from the set points generated in the second step. Each trial window is defined by only $N/4$ points. Because the window is symmetric and must add to unity with an adjacent window shifted by one-half block length, only the first $N/4$ points are independent. This relationship is expressed as:

$$W[N/2 - (i + 1)] = \sqrt{1 - W[i]^2} \quad \text{for } 0 \leq i < N/4 \quad (28)$$

$$W[i] = W[N - i - 1] \quad \text{for } N/2 \leq i < N \quad (29)$$

where
  $W[i]$ = the analysis window function value for point i, and
  $N$ = the window length.

The fourth step determines the trial window's frequency response curve. The response curve may be determined in any of several ways, however, the method used here is analogous to a swept-frequency FFT spectrum analyzer. Each point of the response curve is calculated from the average of the root-mean-square (RMS) of the corresponding transform coefficients obtained from the FFT of 100 overlapped sample blocks of a digitized input signal. The input signal is a sinusoid which sweeps through a band of frequencies one transform coefficient in width, centered about the frequency equal to one-half the Nyquist frequency. The amount of overlap between sample blocks is 50%.

For example, one embodiment of the coder samples the input signal at a 44.1 kHz rate into 128 point sample blocks. The bandwidth of one transform coefficient is 344.5 Hz (44.1 kHz/128), and half of this bandwidth is 172.27 Hz. The Nyquist frequency is 22.05 kHz (44.1 kHz/2), therefore one-half the Nyquist frequency is 11.025 kHz. The frequency response of a trial window is constructed from the RMS average of responses to a digitized sinusoidal signal which sweeps from a frequency of 10.85 kHz (11,025 − 172.26 Hz) to a frequency of 11.20 kHz (11,025 + 172.26 Hz). The length of the digitized signal is one hundred blocks of 128 points with a 50% overlap, or 6464 points.

The fifth step calculates an error value for the trial window response. The error value is calculated as a modified RMS of the point-by-point difference between the trial window response and the target response curve. The modified RMS error calculation may be expressed as:

$$E = \sqrt{\left( \frac{\sum_{i=0}^{N} e_i^2}{N} \right)} \quad (30)$$

where
  $E$ = the modified RMS error value,
  $N$ = the window length, $$e_i = \begin{bmatrix} (C_i - T_i) & \text{for } C_i > T_i \\ 0 & \text{otherwise.} \end{bmatrix}$$

$C_i$ = calculated response at point i for the trial window (in dB), and $T_i$ = response at point i of the target response curve (in dB).

The modified RMS error value is a logarithmically scaled measure because the response values are expressed in dB. A logarithmic measure is used because the number of bits required to represent a transform coefficient is proportional to the logarithm of the desired signal-to-noise ratio.

The sixth step decides whether to continue the optimization process. The process continues until it has converged upon a solution or until the rate of convergence is sufficiently low.

Entries in Table III show the characteristics of several analysis windows derived by the convolution technique, starting from Kaiser-Bessel windows with alpha values within a range between 4 and 7. See equations 12 through 17 above. The Table illustrates the trade off between the rate of transition band rolloff and the depth of stopband rejection. The rate of transition band rolloff, expressed in Hertz per dB, is a linear approximation to the frequency response curve in the middle of the transition region. Lower figures represent steeper rolloff. The level of ultimate rejection expressed in dB represents the response of the filter within the stopband relative to the frequency response at the center of the passband.

TABLE I

| Frequency Coefficients for TDAC Coder | | | | |
|---|---|---|---|---|
| Master Exp | Subband | | Coefficient Numbers | Minimum Bit Ln |
| | Exp | Exp Ln | | |
| MEXP0 | EXP0 | 3 bits* | 0 | 5 bits* |
| | EXP1 | | 1 | |
| | EXP2 | | 2 | |
| | EXP3 | | 3 | |
| | EXP4 | | 4 | |
| | EXP5 | | 5 | |
| | EXP6 | | 6 | |
| MEXP1 | EXP7 | 4 bits | 7-8 | 5 bits |
| | EXP8 | | 9-10 | |
| | EXP9 | | 11-12 | |
| | EXP10 | | 13-14 | 4 bits |
| | EXP11 | | 15-16 | |
| | EXP12 | | 17-18 | |
| | EXP13 | | 19-22 | 3 bits |
| | EXP14 | | 23-26 | |
| | EXP15 | | 27-30 | |
| | EXP16 | | 31-34 | |
| | EXP17 | | 35-38 | |
| | EXP18 | | 39-45 | 2 bits |
| 20 kHz Only | EXP19 | | 46-54 | |
| | EXP20 | | 55-62 | |

*The TDAC Discrete Sine Transform produces a coefficient S(0) value of zero for every block. This is known a priori by the transform decoder, therefore the DST exponent and code word for coefficient S(0) need not be transmitted or stored.

TABLE II

| Frequency Coefficients for DFT Coder | | | | |
|---|---|---|---|---|
| Master Exp | Subband | | Coefficient Numbers | Minimum Bit Ln* |
| | Exp | Exp Ln | | |
| MEXP | | 4 bits | | |
| | EXP0 | 3 bits | 0 | 11 bits** |
| | EXP1 | | 1 | 9 bits |
| | EXP2 | | 2 | |

TABLE II-continued

| Frequency Coefficients for DFT Coder | | | | |
|---|---|---|---|---|
| Master Exp | Subband | | Coefficient Numbers | Minimum Bit Ln* |
| | Exp | Exp Ln | | |
| | EXP3 | | 3 | |
| | EXP4 | | 4 | |
| | EXP5 | | 5 | 8 bits |
| | EXP6 | | 6 | |
| | EXP7 | 4 bits | 7-8 | 6 bits |
| | EXP8 | | 9-10 | |
| | EXP9 | | 11-12 | |
| | EXP10 | | 13-14 | 4 bits |
| | EXP11 | | 15-16 | |
| | EXP12 | | 17-18 | |
| | EXP13 | | 19-20 | |
| | | | 21-22 | 2 bits |
| | EXP14 | | 23-26 | |
| | EXP15 | | 27-30 | |
| | EXP16 | | 31-34 | |
| | EXP17 | | 35-40 | |

*Each transform coefficient is a complex number with a real and an imaginary component. The minimum bit length values shown are for each component.
**The imaginary component of coefficient 0 is always zero. This is known a priori by the transform decoder, therefore only the real component of coefficient 0 need be transmitted or stored.

TABLE III

| Frequency Response Characteristics for Derived Analysis Windows | | |
|---|---|---|
| Kaiser-Bessel Alpha Factor | Transition Band Rolloff (Hz/dB) | Stopband Ultimate Rejection (dB) |
| 4 | 25 | −89 |
| 5 | 27.5 | −99 |
| 6 | 31 | −111 |
| 7 | 33 | −122 |

I claim:

1. An encoder for the encoding of audio information comprising signal samples, said encoder comprising
means for receiving said signal samples,
subband means, including adaptive bit allocation means, for defining subbands and for generating subband information in response to said signal samples, said subband information for each of said subbands including one or more digital words, each of said digital words comprising an adaptive portion and a non-adaptive portion, wherein coding accuracy of said adaptive portion is established by said adaptive bit allocation means, and
formatting means for assembling digital information including said subband information into a digital output having a format suitable for transmission or storage.

2. An encoder according to claim 1 wherein the coding accuracy of said non-adaptive portion is less than the accuracy required to have no audible quantizing noise.

3. An encoder according to claim 1 wherein said subband means generates said subband information by applying a discrete transform function to blocks of said signal samples.

4. An encoder according to claim 1 wherein said subband means comprises filter bank means and means for storing coding information defining the coding accuracy for said non-adaptive portion, wherein said coding information is preestablished by comparing a representative frequency response for said filter bank means for each of said subbands to a corresponding psychoacoustic masking threshold representative of one or more of said subbands.

5. An encoder according to claim 4 wherein a psychoacoustic masking threshold having a relatively high selectivity for frequencies below a masking tone or narrow band of noise is taken as representative of the psychoacoustic masking threshold in lower frequency subbands and a psychoacoustic masking threshold having a relatively low selectivity for frequencies below a masking tone or narrow band of noise is taken as representative of the psychoacoustic masking threshold in higher frequency subbands.

6. An encoder according to claim 5 wherein a psychoacoustic masking threshold for a single tone or very narrow band of noise at about 1 kHz is taken as representative for subbands within the frequency range of about 500 Hz to 2 kHz and a psychoacoustic masking threshold for a single tone or very narrow band of noise at about 4 kHz is taken as representative for subbands above about 2 kHz.

7. An encoder according to claim 4 wherein said coding information defines said coding accuracy for said non-adaptive portion at a level less than the accuracy required to have no quantizing noise in excess of said corresponding psychoacoustic masking threshold.

8. An encoder according to claim 7 wherein said coding information defines said coding accuracy at a level two bits fewer than said accuracy required to have no quantizing noise in excess of said corresponding psychoacoustic masking threshold.

9. An encoder according to claim 1 or 4 wherein said subband means represents said subband information in block-floating-point form comprising one or more mantissas and one or more exponents, wherein said coding accuracy of said adaptive portion is based on an effective exponent value for each of said digital words, said effective exponent value derived from the value or values of said one or more exponents.

10. An encoder according to claim 9 wherein said subband information comprises one or more mantissas and a subband exponent for each of said subbands, each of said mantissas corresponding to a respective one of said digital words, said effective exponent value for each of said digital words equal to the value of the corresponding subband exponent.

11. An encoder according to claim 9 wherein said subband information comprises one or more mantissas and a subband exponent for each of said subbands, and one or more master exponents, each master exponent associated with a set of subbands, each of said mantissas corresponding to a respective one of said digital words, said effective exponent value for each of said digital words derived from a combination of the values of the corresponding subband exponent and the associated master exponent.

12. An encoder according to claim 9, wherein subband information generated in response to an interval of said signal samples constitutes a subband information block, said subband means further comprising means for estimating the relative energy level of each subband represented in a subband information block, wherein said adaptive bit allocation means assigns bits to at least some digital words, said adaptive bit allocation means comprising means for allocating at most a maximum number of bits to each of the digital words of a first group of subbands possessing the greatest energy levels and stopping when a certain number of bits has been allocated to each of the digital words of said first group of subbands, and means for allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

13. An encoder according to claim 12 wherein said certain number of bits is equal to said maximum number of bits.

14. An encoder according to claim 12 wherein said means for estimating the relative energy level estimates said relative energy level based upon the effective exponent value of each subband represented in a subband information block.

15. An encoder according to claim 14 wherein said means for estimating the relative energy level comprises means for ascertaining the effective exponent value of the subband which contains the maximum of the values represented by each mantissa in combination with its associated effective exponent value, and means for assigning a level number to each of all subbands represented in said subband information block, said level number equal to said maximum number of bits reduced by the absolute value of the difference between the ascertained effective exponent value and the effective exponent value corresponding to the subband for which a level is to be assigned, but in no case assigning a level number less than zero.

16. An encoder according to claim 12 wherein said means for allocating bits to the digital words constituting said second group of subbands allocates bits to the digital words of said adjacent subbands on the low-frequency side before bits are allocated to the digital words of said adjacent subbands on the high-frequency side.

17. An encoder according to claim 12 wherein said adaptive bit allocation means stops allocating bits when the number of bits allocated equals a limited number of adaptively allocatable bits.

18. An encoder according to claim 12 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

19. An encoder according to claim 9 wherein said formatting means assembles bits representing said non-adaptive portion of each of said digital words and bits representing said one or more exponents apart from bits representing said adaptive portion of each of said digital words.

20. An encoder according to claim 19 wherein said formatting means assembles said digital information into frames and inserts the bits representing said non-adaptive portion of each of said digital words and the bits representing said one or more exponents into preestablished positions within a respective one of said frames.

21. An encoder according to claim 20 wherein said formatting means inserts into a respective one of said frames the bits representing said non-adaptive portion of each of said digital words and the bits representing said one or more exponents ahead of the bits representing said adaptive portion of each of said digital words.

22. An encoder according to claim 1 or 4, wherein subband information generated in response to an interval of said signal samples constitutes a subband information block, said subband means further comprising means for estimating the relative energy level of each subband represented in a subband information block, wherein said adaptive bit allocation means assigns bits to at least some digital words, said adaptive bit allocation means comprising
  means for allocating at most a maximum number of bits to each of the digital words of a first group of subbands possessing the greatest energy levels and stopping when a certain number of bits has been allocated to each of the digital words of said first group of subbands, and
  means for allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

23. An encoder according to claim 22 wherein said certain number of bits is equal to said maximum number of bits.

24. An encoder according to claim 22 wherein said means for allocating bits to the digital words constituting said second group of subbands allocates bits to the digital words of said adjacent subbands on the low-frequency side before bits are allocated to the digital words of said adjacent subbands on the high-frequency side.

25. An encoder according to claim 22 wherein said adaptive bit allocation means stops allocating bits when the number of bits allocated equals a limited number of adaptively allocatable bits.

26. An encoder according to claim 22 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

27. An encoder according to claim 1 or 4 wherein said adaptive bit allocation means stops allocating bits when the number of bits allocated equals a limited number of adaptively allocatable bits.

28. An encoder according to claim 1 or 4 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

29. An encoder according to claim 1 or 4 wherein said formatting means assembles bits representing said non-adaptive portion of each of said digital words apart from bits representing said adaptive portion of each of said digital words.

30. An encoder according to claim 29 wherein said formatting means assembles said digital information into frames and inserts the bits representing said non-adaptive portion of each of said digital words into pre-established positions within a respective one of said frames.

31. An encoder according to claim 30 wherein said formatting means inserts into a respective one of said frames the bits representing said non-adaptive portion of each of said digital words ahead of the bits representing said adaptive portion of each of said digital words.

32. An encoder for the encoding of audio information comprising signal samples, said encoder having a short signal propagation delay, comprising
  means for receiving and grouping said signal samples into overlapping signal sample blocks, the length of the overlap constituting an overlap interval, said signal sample blocks having a time period resulting in a signal propagation delay short enough so that an encoding/decoding system employing the encoder is usable for real-time aural feedback to a human operator,
  analysis-window means for weighting each signal sample block by an analysis window, wherein said analysis window constitutes one window of an analysis-synthesis window pair, wherein the product of both windows in said window pair is equal to a product window prederived from an analysis-only window permitting the design of a filter bank in which transform-based digital filters have the ability to trade off steepness of transition band rolloff against depth of stopband rejection in the filter characteristics, and wherein said product window overlapped with itself sums to a constant value across the overlap interval,
  means for generating transform coefficients by applying a discrete transform function to each of said analysis-window weighted signal sample blocks,
  means for quantizing each of said transform coefficients, and
  formatting means for assembling the quantized transform coefficients into a digital output having a format suitable for transmission or storage.

33. An encoder according to claim 32 wherein said product window is derived from an analysis-only window selected from the set of the Kaiser-Bessel window, the Dolph-Chebyshev window, and windows derived from finite impulse filter coefficients using the Parks-McClellan method.

34. An encoder according to claim 32 wherein said means for generating transform coefficients alternately applies a modified Discrete Cosine Transform and a modified Discrete Sine Transform in accordance with the Time-Domain Aliasing Cancellation technique and wherein said product window is derived from a Kaiser-Bessel window having an alpha value in the range of four through seven.

35. An encoder according to claim 32 wherein said means for generating transform coefficients applies a Discrete Fourier Transform and wherein said product window is derived from a Kaiser-Bessel window having an alpha value in the range of one and one-half through three.

36. An encoder according to claim 32 wherein said product window is prederived by
  (1) defining an initial window comprising substantially any window in said class of analysis windows having a length equal to one plus the number of samples in the overlap interval,
  (2) defining a first unit pulse function, the duration of which is equal to the length of said signal blocks less the overlap interval, (3) obtaining an interim window by convolving said initial window with said first unit pulse function, (4) defining a scaling factor by convolving said initial window with a second unit pulse function of duration equal to one, and (5) obtaining said product window by dividing each element of said interim window by said scaling factor.

37. An encoder according to claim 32 wherein said steepness of transition band rolloff is maximized for a desired depth of stopband rejection.

38. An encoder according to claim 37 wherein the desired depth of stopband rejection is determined empirically by listening tests.

39. An encoder according to claim 37 wherein said transition band rolloff generally follows the lower slope of the human ear's psychoacoustic masking curve within a critical band.

40. A decoder for the reproduction of audio information comprising signal samples from a coded signal including digital information, said decoder comprising deformatting means, including adaptive bit allocation means, for defining subbands and for deriving subband information in response to said coded signal, and for reconstructing digital words using said derived subband information, said digital words comprising an adaptive portion and a non-adaptive portion, wherein coding accuracy of said adaptive portion is established by said adaptive bit allocation means, inverse subband means for generating signal samples in response to said subband information, and means for generating said reproduction of audio information in response to said signal samples.

41. A decoder according to claim 40 wherein the coding accuracy of said non-adaptive portion is less than the accuracy required to have no audible quantizing noise.

42. A decoder according to claim 40 wherein said inverse subband means generates said signal samples by applying an inverse discrete transform function to blocks of said subband information.

43. A decoder according to claim 40 wherein said inverse subband means comprises inverse filter bank means and means for storing coding information defining the coding accuracy for said non-adaptive portion, wherein said coding information is preestablished by comparing a representative frequency response for said inverse filter bank means for each of said subbands to a corresponding psychoacoustic masking threshold representative of one or more of said subbands.

44. A decoder according to claim 43 wherein a psychoacoustic masking threshold having a relatively high selectivity for frequencies below a masking tone or narrow band of noise is taken as representative of the psychoacoustic masking threshold in lower frequency subbands and a psychoacoustic masking threshold having a relatively low selectivity for frequencies below a masking tone or narrow band of noise is taken as representative of the psychoacoustic masking threshold in higher frequency subbands.

45. A decoder according to claim 44 wherein a psychoacoustic masking threshold for a single tone or very narrow band of noise at about 1 kHz is taken as representative for subbands within the frequency range of about 500 Hz to 2 kHz and a psychoacoustic masking threshold for a single tone or very narrow band of noise at about 4 kHz is taken as representative for subbands above about 2 kHz.

46. A decoder according to claim 43 wherein said coding information defines said coding accuracy for said non-adaptive portion at a level less than the accuracy required to have no quantizing noise in excess of said corresponding psychoacoustic masking threshold.

47. A decoder according to claim 46 wherein said coding information defines said coding accuracy at a level two bits fewer than said accuracy required to have no quantizing noise in excess of said corresponding psychoacoustic masking threshold.

48. A decoder according to claim 40 or 43 wherein said subband information is expressed in block-floating-point form comprising one or more mantissas and one or more exponents, wherein said coding accuracy of said adaptive portion is based on an effective exponent value for each of said digital words, said effective exponent value derived from the value or values of said one or more exponents.

49. A decoder according to claim 48 wherein said subband information comprises one or more mantissas and a subband exponent for each of said subbands, each of said mantissas corresponding to a respective one of said digital words, said effective exponent value for each of said digital words equal to the value of the corresponding subband exponent.

50. A decoder according to claim 48 wherein said subband information comprises one or more mantissas and a subband exponent for each of said subbands, and one or more master exponents, each master exponent associated with a set of subbands, each of said mantissas corresponding to a respective one of said digital words, said effective exponent value for each of said digital words derived from a combination of the values of the corresponding subband exponent and the associated master exponent.

51. A decoder according to claim 48 wherein said derived subband information generated in response to an interval of said coded signal constitutes a subband information block, said decoder further comprising means for estimating the relative energy level of each subband represented in a subband information block, and wherein said adaptive bit allocation means assigns bits to at least some digital words, said adaptive bit allocation means comprising means for allocating at most a maximum number of bits to each of the digital words of a first group of subbands possessing the greatest energy levels and stopping when a certain number of bits has been allocated to each of the digital words of said first group of subbands, and means for allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

52. A decoder according to claim 51 wherein said certain number of bits is equal to said maximum number of bits.

53. A decoder according to claim 51 wherein said means for estimating the relative energy level estimates said relative energy level based upon the effective exponent value.

54. A decoder according to claim 53 wherein said means for estimating the relative energy level comprises
means for ascertaining the effective exponent value of the subband which contains the maximum of the values represented by each mantissa in combination with its associated effective exponent value, and
means for assigning a level number to each of all subbands represented in said subband information block, said level number equal to said maximum number of bits reduced by the absolute value of the difference between the ascertained effective exponent value and the effective exponent value corresponding to the subband for which a level is to be assigned, but in no case assigning a level number less than zero.

55. A decoder according to claim 51 wherein said means for allocating bits to the digital words constituting said second group of subbands allocates bits to the digital words of said adjacent subbands on the low-frequency side before bits are allocated to the digital words of said adjacent subbands on the high-frequency side.

56. A decoder according to claim 51 wherein said adaptive bit allocation means stops allocating bits when the number of bits allocated equals a limited number of adaptively allocatable bits.

57. A decoder according to claim 51 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

58. A decoder according to claim 48 wherein said deformatting means reconstructs each digital word from bits representing said non-adaptive portion and bits representing said one or more exponents assembled in said coded signal apart from bits representing said adaptive portion.

59. A decoder according to claim 58 wherein said deformatting means reconstructs each digital words from bits representing said non-adaptive portion and bits representing said one or more exponents which occupy pre-established positions within said subband information block.

60. A decoder according to 59 wherein said deformatting means reconstructs each digital word from bits representing said non-adaptive portion and bits representing said one or more exponents which occupy positions in said subband information block ahead of bits representing said adaptive portion.

61. A decoder according to claim 40 or 43 wherein said derived subband information generated in response to an interval of said coded signal constitutes a subband information block, said decoder further comprising means for estimating the relative energy level of each subband represented in a subband information block, and wherein said adaptive bit allocation means assigns bits to at least some digital words, said adaptive bit allocation means comprising
means for allocating at most a maximum number of bits to each of the digital words of a first group of subbands possessing the greatest energy levels and stopping when a certain number of bits has been allocated to each of the digital words of said first group of subbands, and
means for allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

62. A decoder according to claim 61 wherein said certain number of bits is equal to said maximum number of bits.

63. A decoder according to claim 61 wherein said means for allocating bits to the digital words constituting said second group of subbands allocates bits to the digital words of said adjacent subbands on the low-frequency side before bits are allocated to the digital words of said adjacent subbands on the high-frequency side.

64. A decoder according to claim 61 wherein said adaptive bit allocation means stops allocating bits when the number of bits allocated equals a limited number of adaptively allocatable bits.

65. A decoder according to claim 61 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

66. A decoder according to claim 40 or 43 wherein said adaptive bit allocation means stops allocating bits when the number of bits allocated equals a limited number of adaptively allocatable bits.

67. A decoder according to claim 40 or 43 wherein said adaptive bit allocation means stops allocating bits when the number of bits allocated equals or exceeds a limited number of adaptively allocatable bits, said means further comprising a means for reducing the number of bits adaptively allocated to selected digital words until the number of bits adaptively allocated equals said limited number of adaptively allocatable bits.

68. A decoder according to claim 40 or 43 wherein said deformatting means reconstructs each digital word from bits representing said non-adaptive portion assembled in said coded signal apart from bits representing said adaptive portion.

69. A decoder according to claim 68 wherein said deformatting means reconstructs each digital word from bits representing said non-adaptive portion which occupy pre-established positions within said subband information block.

70. A decoder according to 69 wherein said deformatting means reconstructs each digital word from bits representing said non-adaptive portion which occupy positions in said subband information block ahead of bits representing said adaptive portion.

71. A decoder for the reproduction of audio information comprising signal samples from a coded signal generated by an encoder that groups said signal samples into overlapping signal sample blocks, the length of the overlap constituting an overlap interval, weights each sample block with an analysis window, generates transform coefficients by applying a discrete transform to the analysis-window weighted signal sample blocks, quantizes each transform coefficient and assembles the quantized transform coefficients into a digital output having a format suitable for transmission or storage, said decoder comprising means for receiving said digital output for deriving said quantized transform coefficients therefrom, means for reconstructing decoded transform coefficients from the deformatted quantized transform coefficients, means for generating signal sample blocks by applying an inverse discrete transform function to said decoded transform coefficients, said inverse discrete transform having characteristics inverse to those of said discrete transform in the encoder, said signal sample blocks having a time period resulting in a signal propagation delay short enough so that an encoding/decoding system employing the decoder is usable for real-time aural feedback to a human operator, synthesis window means for weighting the signal sample blocks by a synthesis window, wherein a product window equal to the product of said synthesis window and said analysis window is prederived from an analysis-only window permitting the design of a filter bank in which transform-based digital filters have the ability to trade off steepness of transition band rolloff against depth of stopband rejection in the filter characteristics, and wherein said product window overlapped with itself sums to a constant value across the overlap interval, and means for cancelling the weighting effects of the analysis window means and the synthesis window means to recover said signal samples by adding overlapped signal sample blocks across said overlap interval.

72. A decoder according to claim 71 wherein said product window is derived from an analysis-only window selected from the set of the Kaiser-Bessel window, the Dolph-Chebyshev window, and windows derived from finite impulse filter coefficients using the Parks-McClellan method.

73. A decoder according to claim 71 wherein said means for generating transform coefficients alternately applies an inverse modified Discrete Cosine Transform and an inverse modified Discrete Sine Transform in accordance with the Time-Domain Aliasing Cancellation technique and wherein said product window is derived from a Kaiser-Bessel window having an alpha value in the range of four through seven.

74. A decoder according to claim 71 wherein said means for generating transform coefficients applies an inverse Discrete Fourier Transform and wherein said product window is derived from a Kaiser-Bessel window having an alpha value in the range of one and onehalf through three.

75. A decoder according to claim 71 wherein said product window is prederived by (1) defining an initial window comprising substantially any window in said class of analysis windows having a length equal to one plus the number of samples in the overlap interval, (2) defining a first unit pulse function the duration of which is equal to the length of said signal blocks less the overlap interval, (3) obtaining an interim window by convolving said initial window with said first unit pulse function, (4) defining a scaling factor by convolving said initial window with a second unit pulse function of duration equal to one, and (5) obtaining said product window by dividing each element of said interim window by said scaling factor.

76. A decoder according to claim 71 wherein said steepness of transition band rolloff is maximized for a desired depth of stopband rejection.

77. A decoder according to claim 76 wherein the desired depth of stopband rejection is determined empirically by listening tests.

78. A decoder according to claim 76 wherein said transition band rolloff generally follows the lower slope of the human ear's psychoacoustic masking curve within a critical band.

79. An encoding method for the encoding of audio information comprising signal samples, said encoding method comprising receiving said signal samples, defining subbands and generating subband information in response to said signal samples, said subband information for each of said subbands including one or more digital words, each of said digital words comprising an adaptive portion and a non-adaptive portion, wherein coding accuracy of said adaptive portion is established by adaptive bit allocating, and assembling digital information including said subband information into a digital output having a format suitable for transmission or storage.

80. An encoding method according to claim 79 wherein the coding accuracy of said non-adaptive portion is less than the accuracy required to have no audible quantizing noise.

81. An encoding method according to claim 79 wherein said generating subband information applies a discrete transform function to blocks of said signal samples.

82. An encoding method according to claim 79 wherein said generating subband information comprises filtering and storing coding information defining the coding accuracy for said non-adaptive portion, wherein said coding information is preestablished by comparing a representative frequency response for said filtering for each of said subbands to a corresponding psychoacoustic masking threshold representative of one or more of said subbands.

83. An encoding method according to claim 82 wherein a psychoacoustic masking threshold having a relatively high selectivity for frequencies below a masking tone or narrow band of noise is taken as representative of the psychoacoustic masking threshold in lower frequency subbands and a psychoacoustic masking threshold having a relatively low selectivity for frequencies below a masking tone or narrow band of noise is taken as representative of the psychoacoustic masking threshold in higher frequency subbands.

84. An encoding method according to claim 83 wherein a psychoacoustic masking threshold for a single tone or very narrow band of noise at about 1 kHz is taken as representative for subbands within the frequency range of about 500 Hz to 2 kHz and a psychoacoustic masking threshold for a single tone or very narrow band of noise at about 4 kHz is taken as representative for subbands above about 2 kHz.

85. An encoding method according to claim 82 wherein said coding information defines said coding accuracy for said non-adaptive portion at a level less than the accuracy required to have no quantizing noise in excess of said corresponding psychoacoustic masking threshold.

86. An encoding method according to claim 85 wherein said coding information defines said coding accuracy at a level two bits fewer than said accuracy required to have no quantizing noise in excess of said corresponding psychoacoustic masking threshold.

87. An encoding method according to claim 79 or 82 wherein said generating subband information represents said subband information in block-floating-point form comprising one or more mantissas and one or more exponents, wherein said coding accuracy of said adaptive portion is based on an effective exponent value for each of said digital words, said effective exponent value derived from the value or values of said one or more exponents.

88. An encoding method according to claim 87 wherein said subband information comprises one or more mantissas and a subband exponent for each of said subbands, each of said mantissas corresponding to a respective one of said digital words, said effective exponent value for each of said digital words equal to the value of the corresponding subband exponent.

89. An encoding method according to claim 87 wherein said subband information comprises one or more mantissas and a subband exponent for each of said subbands, and one or more master exponents, each master exponent associated with a set of subbands, each of said mantissas corresponding to a respective one of said digital words, said effective exponent value for each of said digital words derived from a combination of the values of the corresponding subband exponent and the associated master exponent.

90. An encoding method according to claim 87, wherein subband information generated in response to an interval of said signal samples constitutes a subband information block, said generating subband information further comprising estimating the relative energy level of each subband represented in a subband information block, wherein said adaptive bit allocating assigns bits to at least some digital words, said adaptive bit allocating comprising
   allocating at most a maximum number of bits to each of the digital words of a first group of subbands possessing the greatest energy levels and stopping when a certain number of bits has been allocated to each of the digital words of said first group of subbands, and
   allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

91. An encoding method according to claim 90 wherein said certain number of bits is equal to said maximum number of bits.

92. An encoding method according to claim 90 wherein said estimating the relative energy level estimates said relative energy level based upon the effective exponent value of each subband represented in a subband information block.

93. An encoding method according to claim 92 wherein said estimating the relative energy level comprises
   ascertaining the effective exponent value of the subband which contains the maximum of the values represented by each mantissa in combination with its associated effective exponent value, and
   assigning a level number to each of all subbands represented in said subband information block, said level number equal to said maximum number of bits reduced by the absolute value of the difference between the ascertained effective exponent value and the effective exponent value corresponding to the subband for which a level is to be assigned, but in no case assigning a level number less than zero.

94. An encoding method according to claim 90 wherein said allocating bits to the digital words constituting said second group of subbands allocates bits to the digital words of said adjacent subbands on the low-frequency side before bits are allocated to the digital words of said adjacent subbands on the high-frequency side.

95. An encoding method according to claim 90 wherein said adaptive bit allocating stops allocating bits when the number of bits allocated equals a limited number of adaptively allocatable bits.

96. An encoding method according to claim 90 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

97. An encoding method according to claim 87 wherein said assembling digital information assembles bits representing said non-adaptive portion of each of said digital words and bits representing said one or more exponents apart from bits representing said adaptive portion of each of said digital words.

98. An encoding method according to claim 97 wherein said assembling digital information assembles said digital information into frames and inserts the bits representing said non-adaptive portion of each of said digital words and the bits representing said one or more exponents into pre-established positions within a respective one of said frames.

99. An encoding method according to claim 98 wherein said assembling digital information inserts into a respective one of said frames the bits representing said non-adaptive portion of each of said digital words and the bits representing said one or more exponents ahead of the bits representing said adaptive portion of each of said digital words.

100. An encoding method according to claim 79 or 82, wherein subband information generated in response to an interval of said signal samples constitutes a subband information block, said generating subband information further comprising estimating the relative energy level of each subband represented in a subband information block, wherein said adaptive bit allocating assigns bits to at least some digital words, said adaptive bit allocating comprising
   allocating at most a maximum number of bits to each of the digital words of a first group of subbands possessing the greatest energy levels and stopping when a certain number of bits has been allocated to each of the digital words of said first group of subbands, and allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

101. An encoding method according to claim 100 wherein said certain number of bits is equal to said maximum number of bits.

102. An encoding method according to claim 100 wherein said allocating bits to the digital words constituting said second group of subbands allocates bits to the digital words of said adjacent subbands on the low-frequency side before bits are allocated to the digital words of said adjacent subbands on the high-frequency side.

103. An encoding method according to claim 100 wherein said adaptive bit allocating stops allocating bits when the number of bits allocated equals a limited number of adaptively allocatable bits.

104. An encoding method according to claim 100 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

105. An encoding method according to claim 79 or 82 wherein said adaptive bit allocating stops allocating bits when the number of bits allocated equals a limited number of adaptively allocatable bits.

106. An encoding method according to claim 79 or 82 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

107. An encoding method according to claim 79 or 82 wherein said assembling digital information assembles bits representing said non-adaptive portion of each of said digital words apart from bits representing said adaptive portion of each of said digital words.

108. An encoding method according to claim 107 wherein said assembling digital information assembles said digital information into frames and inserts the bits representing said non-adaptive portion of each of said digital words into pre-established positions within a respective one of said frames.

109. An encoding method according to claim 108 wherein said assembling digital information inserts into a respective one of said frames the bits representing said non-adaptive portion of each of said digital words ahead of the bits representing said adaptive portion of each of said digital words.

110. An encoding method for the encoding of audio information comprising signal samples, said encoding method having a short signal propagation delay, comprising
 receiving and grouping said signal samples into overlapping signal sample blocks, the length of the overlap constituting an overlap interval, said signal sample blocks having a time period resulting in a signal propagation delay short enough so that an encoding/decoding method employing the encoding method is usable for real-time aural feedback to a human operator,
 weighting each signal sample block by an analysis window, wherein said analysis window constitutes one window of an analysis-synthesis window pair, wherein the product of both windows in said window pair is equal to a product window prederived from an analysis-only window permitting the design of a filter bank in which transform-based digital filters have the ability to trade off steepness of transition band rolloff against depth of stopband rejection in the filter characteristics, and wherein said product window overlapped with itself sums to a constant value across the overlap interval,
 generating transform coefficients by applying a discrete transform function to each of said analysis-window weighted signal sample blocks,
 quantizing each of said transform coefficients, and
 assembling the quantized transform coefficients into a digital output having a format suitable for transmission or storage.

111. An encoding method according to claim 110 wherein said product window is derived from an analysis-only window selected from the set of the Kaiser-Bessel window, the Dolph-Chebyshev window, and windows derived from finite impulse filter coefficients using the Parks-McClellan method.

112. An encoding method according to claim 110 wherein said generating transform coefficients alternately applies a modified Discrete Cosine Transform and a modified Discrete Sine Transform in accordance with the Time-Domain Aliasing Cancellation technique and wherein said product window is derived from a Kaiser-Bessel window having an alpha value in the range of four through seven.

113. An encoding method according to claim 110 wherein said generating transform coefficients applies a Discrete Fourier Transform and wherein said product window is derived from a Kaiser-Bessel window having an alpha value in the range of one and one-half through three.

114. An encoding method according to claim 110 wherein said product window is prederived by
 (1) defining an initial window comprising substantially any window in said class of analysis windows having a length equal to one plus the number of samples in the overlap interval,
 (2) defining a first unit pulse function, the duration of which is equal to the length of said signal blocks less the overlap interval,
 (3) obtaining an interim window by convolving said initial window with said first unit pulse function,
 (4) defining a scaling factor by convolving said initial window with a second unit pulse function of duration equal to one, and
 (5) obtaining said product window by dividing each element of said interim window by said scaling factor.

115. An encoding method according to claim 110 wherein said steepness of transition band rolloff is maximized for a desired depth of stopband rejection.

116. An encoding method according to claim 115 wherein the desired depth of stopband rejection is determined empirically by listening tests.

117. An encoding method according to claim 115 wherein said transition band rolloff generally follows the lower slope of the human ear's psychoacoustic masking curve within a critical band.

118. A decoding method for the reproduction of audio information comprising signal samples from a coded signal including digital information, said decoding method comprising defining subbands and deriving subband information in response to said coded signal, and reconstructing digital words using said derived subband information, said digital words comprising an adaptive portion and a non-adaptive portion, wherein coding accuracy of said adaptive portion is established by adaptive bit allocating, generating signal samples in response to said subband information, and generating said reproduction of audio information in response to said signal samples.

119. A decoding method according to claim 118 wherein the coding accuracy of said non-adaptive portion is less than the accuracy required to have no audible quantizing noise.

120. A decoding method according to claim 118 wherein said generating signal samples applies an inverse discrete transform function to blocks of said subband information.

121. A decoding method according to claim 118 wherein said generating signal sample blocks comprises inverse filtering and storing coding information defining the coding accuracy for said non-adaptive portion, wherein said coding information is preestablished by comparing a representative frequency response for said inverse filter bank for each of said subbands to a corresponding psychoacoustic masking threshold representative of one or more of said subbands.

122. A decoding method according to claim 121 wherein a psychoacoustic masking threshold having a relatively high selectivity for frequencies below a masking tone or narrow band of noise is taken as representative of the psychoacoustic masking threshold in lower frequency subbands and a psychoacoustic masking threshold having a relatively low selectively for frequencies below a masking tone or narrow band of noise is taken as representative of the pyschoacoustic masking threshold in higher frequency subbands.

123. A decoding method according to claim 122 wherein a psychoacoustic masking threshold for a single tone or very narrow band of noise of about 1 kHz is taken as representative for subbands within the frequency range of about 500 Hz to 2 kHz and a psychoacoustic masking threshold for a single tone or very narrow band of noise at about 4 kHz is taken as representative for subbands above about 2 kHz.

124. A decoding method according to claim 121 wherein said coding information defines said coding accuracy for said non-adaptive portion at a level less than the accuracy required to have no quantizing noise in excess of said corresponding psychoacoustic masking threshold.

125. A decoding method according to claim 124 wherein said coding information defines said coding accuracy at a level two bits fewer than said accuracy required to have no quantizing noise in excess of said corresponding psychoacoustic masking threshold.

126. A decoding method according to claim 118 or 121 wherein said subband information is expressed in block-floating-point form comprising one or more mantissas and one or more exponents, wherein said coding accuracy of said adaptive portion is based on an effective exponent value for each of said digital words, said effective exponent value derived from the value or values of said one or more exponents.

127. A decoding method according to claim 126 wherein said subband information comprises one or more mantissas and a subband exponent for each of said subbands, each of said mantissas corresponding to a respective one of said digital words, said effective exponent value for each of said digital words equal to the value of the corresponding subband exponent.

128. A decoding method according to claim 126 wherein said subband information comprises one or more mantissas and a subband exponent for each of said subbands, and one or more master exponents, each master exponent associated with a set of subbands, each of said mantissas corresponding to a respective one of said digital words, said effective exponent value for each of said digital words derived from a combination of the values of the corresponding subband exponent and the associated master exponent.

129. A decoding method according to claim 126 wherein said derived subband information generated in response to an interval of said coded signal constitutes a subband information block, said decoding method further comprising estimating the relative energy level of each subband represented in a subband information block, and wherein said adaptive bit allocating assigns bits to at least some digital words, said adaptive bit allocating comprising allocating at most a maximum number of bits to each of the digital words of a first group of subbands possessing the greatest energy levels and stopping when a certain number of bits has been allocated to each of the digital words of said first group of subbands, and allocating bits to the digital words of a second group of subbands adjoining subbands in which each of the digital words have been allocated said certain number of bits, each of the subbands of said second group of subbands constituting one subbands of a pair of subbands immediately adjacent to said subbands in which digital words have been allocated said certain number of bits.

130. A decoding method according to claim 129 wherein said certain number of bits is equal to said maximum number of bits.

131. A decoding method according to claim 129 wherein said estimating the relative energy level estimates said relative energy level based upon the effective exponent value.

132. A decoding method according to claim 131 wherein said estimating the relative energy level comprises ascertaining the effective exponent value of the subband which contains the maximum of the values represented by each mantissa in combination with its associated effective exponent value, and assigning a level number to each of all subbands represented in said subband information block, said level number equal to said maximum number of bits reduced by the absolute value of the difference between the ascertained effective exponent value and the effective exponent value corresponding to the subband for which a level is to be assigned, but in no case assigning a level number less than zero.

133. A decoding method according to claim 129 wherein said allocating bits to the digital words constituting said second group of subbands allocates bits to the digital words of said adjacent subbands on the low-frequency side before bits are allocated to the digital words of said adjacent subbands on the high-frequency side.

134. A decoding method according to claim 129 wherein said adaptive bit allocating stops allocating bits when the number of bits allocated equals a limited number of adaptively allocatable bits.

135. A decoding method according to claim 129 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

136. A decoding method according to claim 126 wherein said reconstructing digital words reconstructs each digital word from bits representing said non-adaptive portion and bits representing said one or more exponents assembled in said coded signal apart from bits representing said adaptive portion.

137. A decoding method according to claim 136 wherein said reconstructing digital words reconstructs each digital words from bits representing said non-adaptive portion and bits representing said one or more exponents which occupy pre-established positions within said subband information block.

138. A decoding method according to 137 wherein said reconstructing digital words reconstructs each digital word from bits representing said non-adaptive portion and bits representing said one or more exponents which occupy positions in said subband information block ahead of bits representing said adaptive portion.

139. A decoding method according to claim 118 or 121 wherein said derived subband information generated in response to an interval of said coded signal constitutes a subband information block, said decoding method further comprising estimating the relative energy level of each subband represented in a subband information block, and wherein said adaptive bit allocating assigns bits to at least some digital words, said adaptive bit allocating comprising allocating at most a maximum number of bits to each of the digital words of a first group of subbands possessing the greatest energy levels and stopping when a certain number of bits has been allocated to each of the digital words of said first group of subbands, and allocating bits to the digital words of a second group of subbands adjoining subbands in which each of the digital words have been allocated said certain number of bits, each of the subbands of said second group of subbands constituting one subband of a pair of subbands immediately adjacent to said subbands in which digital words have been allocated said certain number of bits.

140. A decoding method according to claim 139 wherein said certain number of bits is equal to said maximum number of bits.

141. A decoding method according to claim 139 wherein said allocating bits to the digital words constituting said second group of subbands allocates bits to the digital words of said adjacent subbands on the low-frequency side before bits are allocated to the digital words of said adjacent subbands on the high-frequency side.

142. A decoding method according to claim 139 wherein said adaptive bit allocating stops allocating bits when the number of bits allocated equals a limited number of adaptively allocatable bits.

143. A decoding method according to claim 139 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

144. A decoding method according to claim 118 or 121 wherein said adaptive bit allocating stops allocating bits when the number of bits allocated equals a limited number of adaptively allocatable bits.

145. A decoding method according to claim 118 or 121 wherein said adaptive bit allocating stops allocating bits when the number of bits allocated equals or exceeds a limited number of adaptively allocatable bits, said adaptive bit allocating further comprising reducing the number of bits adaptively allocated to selected digital words until the number of bits adaptively allocated equals said limited number of adaptively allocatable bits.

146. A decoding method according to claim 118 or 121 wherein said reconstructing digital words reconstructs each digital word from bits representing said non-adaptive portion assembled in said coded signal apart from bits representing said adaptive portion.

147. A decoding method according to claim 146 wherein said reconstructing digital words reconstructs each digital word from bits representing said non-adaptive portion which occupy pre-established positions within said subband information block.

148. A decoding method according to 147 wherein said reconstructing digital words reconstructs each digital word from bits representing said non-adaptive portion which occupy positions in said subband information block ahead of bits representing said adaptive portion.

149. A decoding method for the reproduction of audio information comprising signal samples from a coded signal generated by an encoding method that groups said signal samples into overlapping signal sample blocks, the length of the overlap constituting an overlap interval, weights each sample block with an analysis window, generates transform coefficients by applying a discrete transform to the analysis-window weighted signal sample blocks, quantizes each transform coefficient and assembles the quantized transform coefficients into a digital output having a format suitable for transmission or storage, said decoding method comprising receiving said digital output for deriving said quantized transform coefficients therefrom, reconstructing decoded transform coefficients from the deformatted quantized transform coefficients, generating signal sample blocks by applying an inverse discrete transform function to said decoded transform coefficients, said inverse discrete transform having characteristics inverse to those of said discrete transform in the encoding method, said signal sample blocks having a time period resulting in a signal propagation delay short enough so that an encoding/decoding method employing the decoding method is usable for real-time aural feedback to a human operator, weighting the signal sample blocks by a synthesis window, wherein a product window equal to the product of said synthesis window and said analysis window is prederived from an analysis-only window permitting the design of a filter bank in which transform-based digital filters have the ability to trade off steepness of transition band rolloff against depth of stopband rejection in the filter characteristics, and wherein said product window overlapped with itself sums to a constant value across the overlap interval, and cancelling the weighting effects of the analysis window and the synthesis window to recover said signal samples by adding overlapped signal sample blocks across said overlap interval.

150. A decoding method according to claim 149 wherein said product window is derived from an analysis-only window selected from the set of the Kaiser-Bessel window, the Dolph-Chebyshev window, and windows derived from finite impulse filter coefficients using the Parks-McClellan method.

151. A decoding method according to claim 149 wherein said generating transform coefficients alternately applies an inverse modified Discrete Cosine Transform and an inverse modified Discrete Sine Transform in accordance with the Time-Domain Aliasing Cancellation technique and wherein said product window is derived from a Kaiser-Bessel window having an alpha value in the range of four through seven.

152. A decoding method according to claim 151 wherein said generating transform coefficients applies an inverse Discrete Fourier Transform and wherein said product window is derived from a Kaiser-Bessel window having an alpha value in the range of one and one-half through three.

153. A decoding method according to claim 149 wherein said product window is prederived by
(1) defining an initial window comprising substantially any window in said class of analysis windows having a length equal to one plus the number of samples in the overlap interval,
(2) defining a first unit pulse function the duration of which is equal to the length of said signal blocks less the overlap interval,
(3) obtaining an interim window by convolving said initial window with said first unit pulse function,
(4) defining a scaling factor by convolving said initial window with a second unit pulse function of duration equal to one, and
(5) obtaining said product window by dividing each element of said interim window by said scaling factor.

154. A decoding method according to claim 149 wherein said steepness of transition band rolloff is maximized for a desired depth of stopband rejection.

155. A decoding method according to claim 154 wherein the desired depth of stopband rejection is determined empirically by listening tests.

156. A decoding method according to claim 154 wherein said transition band rolloff generally follows the lower slope of the human ear's psychoacoustic masking curve within a critical band.

157. A method for defining coding information which defines the coding accuracy of digital words representing spectral information in a plurality of frequency subbands, said digital words generated in response to an input signal by a split-band encoder comprising a filter bank, wherein said coding information comprises a nonadaptive coding accuracy, said method comprising
(1) obtaining a predicted quantizing noise spectrum of said split-band encoder for a frequency subband based upon a representative frequency response of said filter bank for said frequency subband,
(2) generating a subband value equal to the number of bits required to quantize spectral energy within said frequency subband such that said predicted quantizing noise spectrum does not exceed a representative psychoacoustic masking threshold for spectral energy within said frequency subband,
(3) setting said nonadaptive coding accuracy for said frequency subband equal to or less than said subband value, and
(4) reiterating the previous steps for each of said plurality of frequency subbands.

158. A method according to claim 157 wherein said nonadaptive coding accuracy for at least one of said plurality of frequency subbands is set equal to a value less than the respective subband value.

* * * * *

UNITED STATES PATENT AND TRADEMARK OFFICE
CERTIFICATE OF CORRECTION

PATENT NO. : 5,222,189

DATED : June 22, 1993

INVENTOR(S) : Fielder

It is certified that error appears in the above-indentified patent and that said Letters Patent is hereby corrected as shown below:

Column 02
Line 44: "highquality" should be --high-quality--

Column 13
Line 63: "Alisasing" should be --aliasing--

Column 15
Line 17: "0000-OFFF$_{16}$" should be --0000-0FFF$_{16}$--

Column 15
Line 62: "SCO" should be --SC0--

Column 16
Line 33: Delete second "such"

Column 17
Line 09: "Khz" should be --kHz-- in both occurrences

Column 18
Line 50: "1 ≤ k < N/2" should be --1 ≤ k ≤ N/2--

Column 18
Line 58: "Turkey" should be --Tukey--

Column 19
Line 46: "$x_x(t)$ should be --$x_s(t)$--

Column 23
Line 44: "understanding" should be --understating--

Column 31
Line 33: "telephone" should be --telephonic--

Column 33
Line 49: "March 1972pp. 189-94." should be --March 1972, pp. 189-94."

Column 36
Line 11: "$WP_k$-1" should be --$\overline{WP}_{k-1}$--

Column 52
Line 54: insert --claim-- before "69"

Column 53
Line 54: "onehalf" should be --one-half--

UNITED STATES PATENT AND TRADEMARK OFFICE
CERTIFICATE OF CORRECTION

PATENT NO. : 5,222,189

DATED : June 22, 1993

INVENTOR(S) : Fielder

It is certified that error appears in the above-indentified patent and that said Letters Patent is hereby corrected as shown below:

```
Column 59
   Line 49:   second "of" should be --at--
Column 60
   Line 43:   second "subbands" should be --subband--
Column 62
   Line 41:   insert --claim-- before "147"
Column 63
   Line 36:   "151" should be --149--
```

Signed and Sealed this

Fourth Day of October, 1994

Attest:

Attesting Officer

BRUCE LEHMAN

Commissioner of Patents and Trademarks